(12) United States Patent
Yoo

(10) Patent No.: US 12,541,262 B2
(45) Date of Patent: Feb. 3, 2026

(54) DISPLAY DEVICE AND ELECTRONIC APPARATUS

(71) Applicant: SAMSUNG DISPLAY CO., LTD., Yongin-si (KR)

(72) Inventor: Gi-Na Yoo, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/944,071

(22) Filed: Nov. 12, 2024

(65) Prior Publication Data

US 2025/0173011 A1 May 29, 2025

(30) Foreign Application Priority Data

Nov. 24, 2023 (KR) .................. 10-2023-0165019

(51) Int. Cl.
*G06F 3/041* (2006.01)
*G06F 3/044* (2006.01)
*H10K 59/40* (2023.01)
*H10K 59/88* (2023.01)

(52) U.S. Cl.
CPC .......... *G06F 3/0412* (2013.01); *G06F 3/0443* (2019.05); *G06F 3/0446* (2019.05); *H10K 59/40* (2023.02); *H10K 59/88* (2023.02)

(58) Field of Classification Search
CPC .... G06F 3/0412; G06F 3/0446; G06F 3/0443; H10K 59/40; H10K 59/88
See application file for complete search history.

(56) References Cited

U.S. PATENT DOCUMENTS

| 10,126,864 | B2 | 11/2018 | Jeong et al. |
| 10,761,665 | B2 | 9/2020 | Park |
| 11,314,359 | B2 | 4/2022 | Choi et al. |
| 2012/0325639 | A1 | 12/2012 | Scuderi et al. |
| 2017/0344141 | A1* | 11/2017 | Lee .................. G06F 3/0446 |
| 2021/0373705 | A1 | 12/2021 | Lee et al. |
| 2025/0173029 | A1* | 5/2025 | Lee .................. G06F 3/0412 |

FOREIGN PATENT DOCUMENTS

| KR | 10-1455287 B1 | 11/2014 |
| KR | 10-1929281 B1 | 3/2019 |
| KR | 10-2019-0101517 A | 9/2019 |
| KR | 10-2310733 B1 | 10/2021 |

\* cited by examiner

*Primary Examiner* — Peter D McLoone
(74) *Attorney, Agent, or Firm* — F. CHAU & ASSOCIATES, LLC

(57) ABSTRACT

A display device includes a display panel and an input sensor including a first sensing unit and a second sensing unit which are alternately arranged in a first direction, and a plurality of bridge groups. Each of the first sensing unit and second sensing unit includes a first sensing pattern, a second sensing pattern having a shape extending in the first direction, and a plurality of third sensing patterns spaced apart from each other in a second direction crossing the first direction with the second sensing pattern therebetween. Each of the bridge groups includes at least one first bridge pattern having a first shape extending longitudinally in the first direction and at least one second bridge pattern having a second shape extending longitudinally in the second direction.

31 Claims, 28 Drawing Sheets

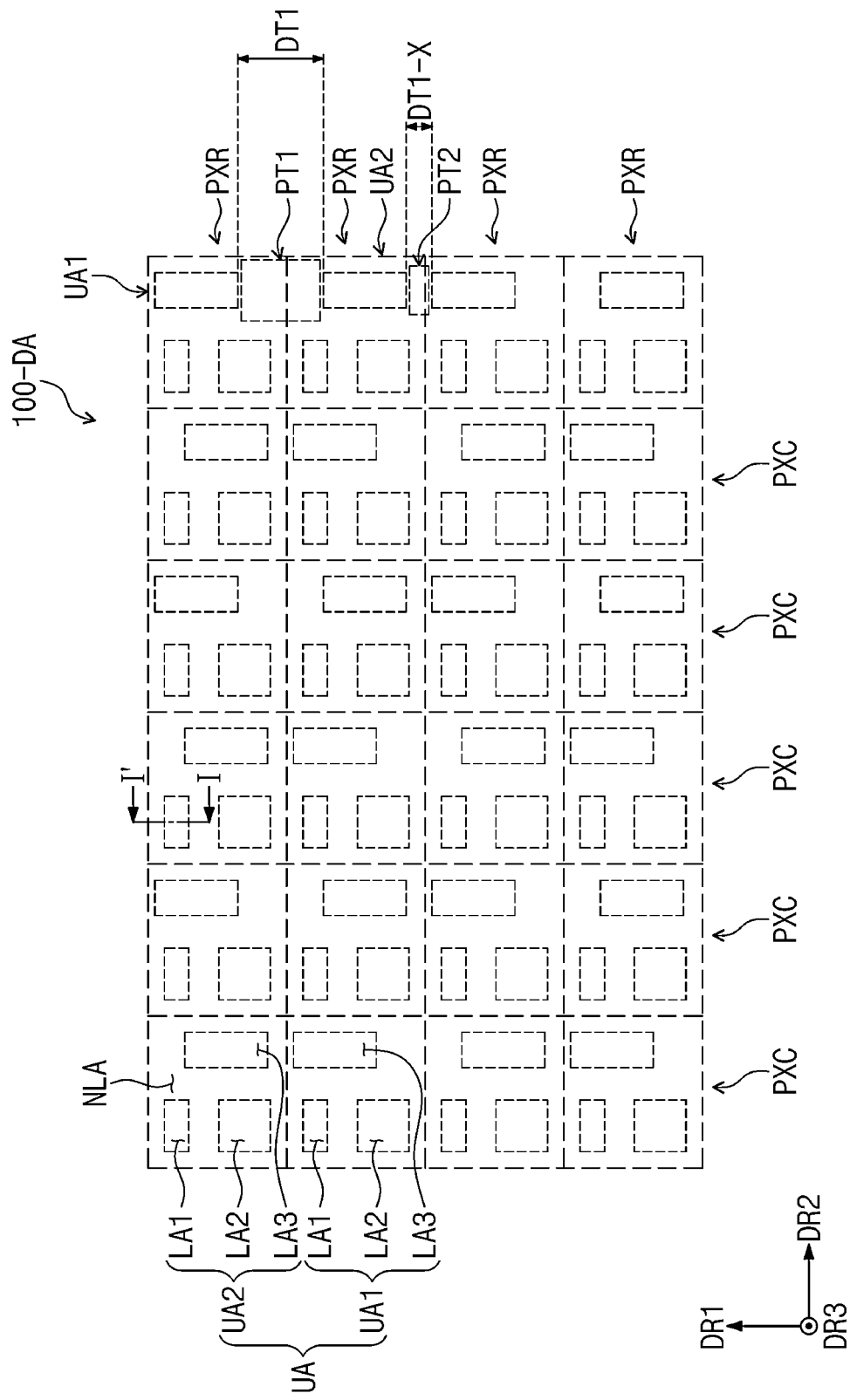

DISPLAY DEVICE AND ELECTRONIC APPARATUS

CROSS-REFERENCE TO RELATED APPLICATIONS

This application claims priority under 35 U.S.C. § 119 to Korean Patent Application No. 10-2023-0165019, filed on Nov. 24, 2023 in the Korean Intellectual Property Office, the disclosure of which is incorporated by reference in its entirety herein.

1. TECHNICAL FIELD

The present disclosure herein relates to a display device and an electronic apparatus, and more particularly, to a display device including an input sensor and an electronic apparatus including the same.

2. DISCUSSION OF RELATED ART

Various multimedia devices, such as televisions, mobile phones, tablets, navigation devices, game consoles, etc. include display devices. The display devices generate images for display to a user through a display screen. Such a display device may include a display panel that generates an image and an input sensor that detects the touch of a user.

The input sensor may include a conductive layer. The conductive layer of the input sensor is disposed on the display panel. Therefore, the conductive layer may affect external light reflection of the display device, external visibility of a specific pattern, etc. which leads to a decrease in the display quality.

SUMMARY

The present disclosure provides a display device in which a limitation of a specific pattern being visible from the outside due to a conductive layer is reduced or eliminated.

The present disclosure also provides an electronic apparatus in which a limitation of a specific pattern being visible from the outside is reduced or eliminated.

According to an embodiment of the present inventive concept, a display device includes a display panel. An input sensor is disposed on the display panel. The input sensor comprises a first sensing unit and a second sensing unit that are alternately arranged in a first direction, and a plurality of bridge groups. Each of the first sensing unit and second sensing unit comprises a first sensing pattern. A second sensing pattern has a shape extending from a center of the first sensing pattern in the first direction. A plurality of third sensing patterns is spaced apart from each other in a second direction crossing the first direction with the second sensing pattern therebetween. Each of the plurality of bridge groups comprises at least one first bridge pattern having a first shape extending longitudinally in the first direction and at least one second bridge pattern having a second shape extending longitudinally in the second direction. The first bridge pattern comprises a first portion of a first bridge electrically connecting the first sensing pattern to the second sensing pattern or a first dummy bridge electrically insulated from the first to third sensing patterns. The second bridge pattern comprises a second bridge electrically connecting the plurality of third sensing patterns to each other, a second portion of the first bridge directly connected to the first portion, or a second dummy bridge electrically insulated from the plurality of first to third sensing patterns.

In an embodiment, the display panel may include a display area including a plurality of emission areas and a non-display area disposed outside the display area. The input sensor may include a sensing area overlapping the display area and a non-sensing area disposed outside the sensing area. The plurality of bridge groups may be uniformly arranged throughout the sensing area.

In an embodiment, each of the first to third sensing patterns may include a plurality of mesh lines having a plurality of opening areas that respectively overlap the plurality of emission areas.

In an embodiment, each of the first bridge pattern and the second bridge pattern may overlap the plurality of mesh lines.

In an embodiment, the first bridge may electrically connect the first sensing pattern of the first sensing unit to the second sensing pattern of the second sensing unit or electrically connect the first sensing pattern of the second sensing unit to the second sensing pattern of the first sensing unit.

In an embodiment, the first portion of the first bridge may overlap the first sensing pattern, and the second portion of the first bridge may extend from the first portion and is integral with the first portion, and the second portion may be disposed to connect the first sensing unit to the second sensing unit.

In an embodiment, the first bridge may overlap the second bridge in the first direction.

In an embodiment, each of the plurality of bridge groups may include a plurality of first bridge patterns, and at least one second bridge pattern connecting adjacent first bridge patterns of the plurality of first bridge patterns to each other.

In an embodiment, each of the plurality of bridge groups may include a plurality of first bridge patterns, and at least one of the plurality of first bridge patterns in each of the plurality of bridge groups may have a length different from that of another first bridge pattern in the first direction.

In an embodiment, each of the plurality of bridge groups may include a plurality of second bridge patterns, and at least one of the plurality of second bridge patterns in each of the plurality of bridge groups may have a length different from that of another second bridge pattern in the second direction.

In an embodiment, the second dummy bridge may include an edge dummy pattern extending from an edge of the second portion of the first bridge in the second direction and electrically insulated from the first to third sensing patterns.

In an embodiment, the second sensing pattern of the first sensing unit and the first sensing pattern of the second sensing unit may be directly connected to each other and are integral with each other, or the first sensing pattern of the first sensing unit and the second sensing pattern of the second sensing unit may be directly connected to each other and are integral with each other.

In an embodiment, in each of the first sensing unit and the second sensing unit, the second sensing pattern may include a plurality of second sensing patterns, and the plurality of second sensing patterns may be disposed to be spaced apart from each other in the second direction, and a plurality of first bridges may be disposed between the first sensing unit and the second sensing unit adjacent to each other in the first direction, and each of the plurality of first bridges may overlap the second sensing patterns on a plane in the first direction.

In an embodiment, in each of the first sensing unit and the second sensing unit, each of the plurality of third sensing patterns may include a first pattern group and a second pattern group that are divided by the second sensing pattern, and the plurality of third sensing patterns in the first pattern group and the second pattern group may be spaced apart from each other in the first direction.

In an embodiment, in each of the first sensing unit and the second sensing unit, the second bridge includes a plurality of second bridges, and each of the plurality of second bridges may electrically connect each of the plurality of third sensing patterns in the first pattern group to each of the plurality of third sensing patterns in the second pattern group in the second direction.

In an embodiment, the first bridge may include a plurality of first bridges. Each of the plurality of first bridges may be disposed between the first sensing unit and the second sensing unit that are alternately arranged in the first direction, and the plurality of second bridges may be disposed between adjacent first bridges of the plurality of first bridges overlapping each other in the first direction.

In an embodiment, in each of the first sensing unit and the second sensing unit, the second sensing pattern may include a first sub-pattern and a second sub-pattern that are spaced apart from each other in the first direction, and each of the first sensing unit and the second sensing unit may further include a fourth sensing pattern disposed between the first sub-pattern and the second sub-pattern and extending longitudinally in the second direction.

In an embodiment, the plurality of bridge groups may further include at least one of a third bridge electrically connecting the first sub-pattern to the second sub-pattern or a third dummy bridge having a same shape as the third bridge and electrically insulated from the first to third sensing patterns.

In an embodiment, the input sensor may be directly disposed on the display panel, the input sensor may include a first sensor conductive layer, a second sensor conductive layer disposed on the first sensor conductive layer, and an interlayer insulating layer disposed between the first sensor conductive layer and the second sensor conductive layer, the first bridge pattern and the second bridge pattern may be disposed on a same layer as the first sensor conductive layer, and the first sensing pattern, the second sensing pattern, and the plurality of third sensing patterns may be disposed on a same layer as the second sensor conductive layer.

According to an embodiment of the present inventive concept, a display device includes a display panel. An input sensor is disposed on the display panel. The input sensor comprises a plurality of first sensing electrodes arranged in a first direction, a plurality of second sensing electrodes arranged in the first direction, a plurality of third sensing electrodes arranged in a second direction crossing the first direction, and a plurality of dummy bridges electrically insulated from the plurality of first to third sensing electrodes. Each of the plurality of first sensing electrodes comprises a first-1 sensing pattern, a first-2 sensing pattern having a shape different from that of the first-1 sensing pattern, and a first-1 bridge electrically connecting the first-1 sensing pattern to the first-2 sensing pattern. Each of the plurality of second sensing electrodes comprises a second-1 sensing pattern, a second-2 sensing pattern having a shape different from that of the second-1 sensing pattern, and a second-1 bridge electrically connecting the second-1 sensing pattern to the second-2 sensing pattern. Each of the plurality of third sensing electrodes comprises a third sensing pattern extending longitudinally in the second direction, and a second bridge extending longitudinally in the second direction and electrically connected to the third sensing pattern. The plurality of dummy bridges comprises a first dummy bridge pattern having a same shape as the first-1 bridge or the second-1 bridge, and a second dummy bridge pattern having a same shape as the second bridge. In the input sensor, at least one of the first-1 bridge, the second-1 bridge, the second bridge, the first dummy bridge pattern, or the second dummy bridge pattern constitutes a plurality of bridge groups having a specific one pattern shape. On a plane, the plurality of bridge groups are arranged to be spaced apart from each other in the input sensor.

In an embodiment, the specific one pattern shape of the plurality of bridge groups may include at least one first bridge pattern having a bar shape extending longitudinally in the first direction, and at least one second bridge pattern having a bar shape extending longitudinally in the second direction.

In an embodiment, the first bridge pattern may include a first portion extending longitudinally from the first-1 bridge, the second-1 bridge, or the first dummy bridge pattern in the first direction, and the second bridge pattern may include a second portion extending longitudinally from the first-1 bridge, the second-1 bridge, or the first dummy bridge pattern in the second direction.

In an embodiment, the plurality of dummy bridges may further include a third dummy bridge having a bar shape extending longitudinally in the first direction and a fourth dummy bridge having a bar shape extending longitudinally in the second direction. The third dummy bridge may correspond to the first bridge pattern, and the fourth dummy bridge may correspond to the second bridge pattern.

In an embodiment, the first-1 sensing pattern and the second-1 sensing pattern may be alternately arranged in the first direction, and the first-2 sensing pattern and the second-2 sensing pattern may be alternately arranged in the first direction, and the first-1 sensing pattern and the second-2 sensing pattern may overlap each other in the second direction, and the second-1 sensing pattern and the first-2 sensing pattern may overlap each other in the second direction.

In an embodiment, on the plane, the first-1 sensing pattern and the second-1 sensing pattern may have a same shape as each other, and the first-2 sensing pattern and the second-2 sensing pattern may have a same shape as each other.

According to an embodiment of the present inventive concept, an electronic apparatus includes a display panel comprising a base layer, a circuit element layer disposed on the base layer, a display element layer disposed on the circuit element layer and comprising a light emitting element, and an encapsulation layer disposed on the display element layer. An input sensor is disposed on the display panel. The input sensor comprises a plurality of first sensing electrodes arranged in a first direction, a plurality of second sensing electrodes arranged in the first direction, a plurality of third sensing electrodes arranged in a second direction crossing the first direction, and a plurality of dummy bridges electrically insulated from the plurality of first to third sensing electrodes. Each of the plurality of first sensing electrodes comprises a first-1 sensing pattern, a first-2 sensing pattern having a shape different from that of the first-1 sensing pattern, and a first-1 bridge electrically connecting the first-1 sensing pattern to the first-2 sensing pattern. Each of the plurality of second sensing electrodes comprises a second-1 sensing pattern, a second-2 sensing pattern having a shape different from that of the second-1 sensing pattern, and a second-1 bridge electrically connecting the second-1 sensing pattern to the second-2 sensing pattern. Each of the plurality of third sensing electrodes comprises a third sensing pattern extending longitudinally in the second direction, and a second bridge extending longitudinally in the second direction and electrically connected to the third sensing pattern. The plurality of dummy bridges comprises a first dummy bridge pattern having a same shape as the first-1 bridge or the second-1 bridge, and a second dummy bridge pattern having a same shape as the second bridge. In the input sensor, at least one of the first-1 bridge, the second-1 bridge, the second bridge, the first dummy bridge pattern, or the second dummy bridge pattern constitutes a plurality of bridge groups having a specific one pattern shape. On a plane, the plurality of bridge groups are arranged to be spaced apart from each other in the input sensor.

In an embodiment, the specific one pattern shape of the plurality of bridge groups may include at least one first bridge pattern having a bar shape extending longitudinally in the first direction, and at least one second bridge pattern having a bar shape extending longitudinally in the second direction.

In an embodiment, the first bridge pattern may include a first portion extending longitudinally from the first-1 bridge, the second-1 bridge, or the first dummy bridge pattern in the first direction, and the second bridge pattern may include a second portion extending longitudinally from the first-1 bridge, the second-1 bridge, or the first dummy bridge pattern in the second direction.

In an embodiment, the plurality of dummy bridges may further include a third dummy bridge having a bar shape extending longitudinally in the first direction and a fourth dummy bridge having a bar shape extending longitudinally in the second direction. The third dummy bridge may correspond to the first bridge pattern, and the fourth dummy bridge may correspond to the second bridge pattern.

In an embodiment, the first-1 sensing pattern and the second-1 sensing pattern may be alternately arranged in the first direction, and the first-2 sensing pattern and the second-2 sensing pattern may be alternately arranged in the first direction, and the first-1 sensing pattern and the second-2 sensing pattern may overlap each other in the second direction, and the second-1 sensing pattern and the first-2 sensing pattern may overlap each other in the second direction.

In an embodiment, on the plane, the first-1 sensing pattern and the second-1 sensing pattern may have a same shape as each other, and the first-2 sensing pattern and the second-2 sensing pattern may have a same shape as each other.

BRIEF DESCRIPTION OF THE DRAWINGS

The accompanying drawings are included to provide a further understanding of the present inventive concept, and are incorporated in and constitute a part of this specification. The drawings illustrate non-limiting embodiments of the present disclosure and, together with the description, serve to explain principles of the present inventive concept. In the drawings:

FIGS. 4A and 4B are enlarged plan views illustrating a portion of a display area according to embodiment of the present inventive concept;

DETAILED DESCRIPTION OF EMBODIMENTS

Figure 1:
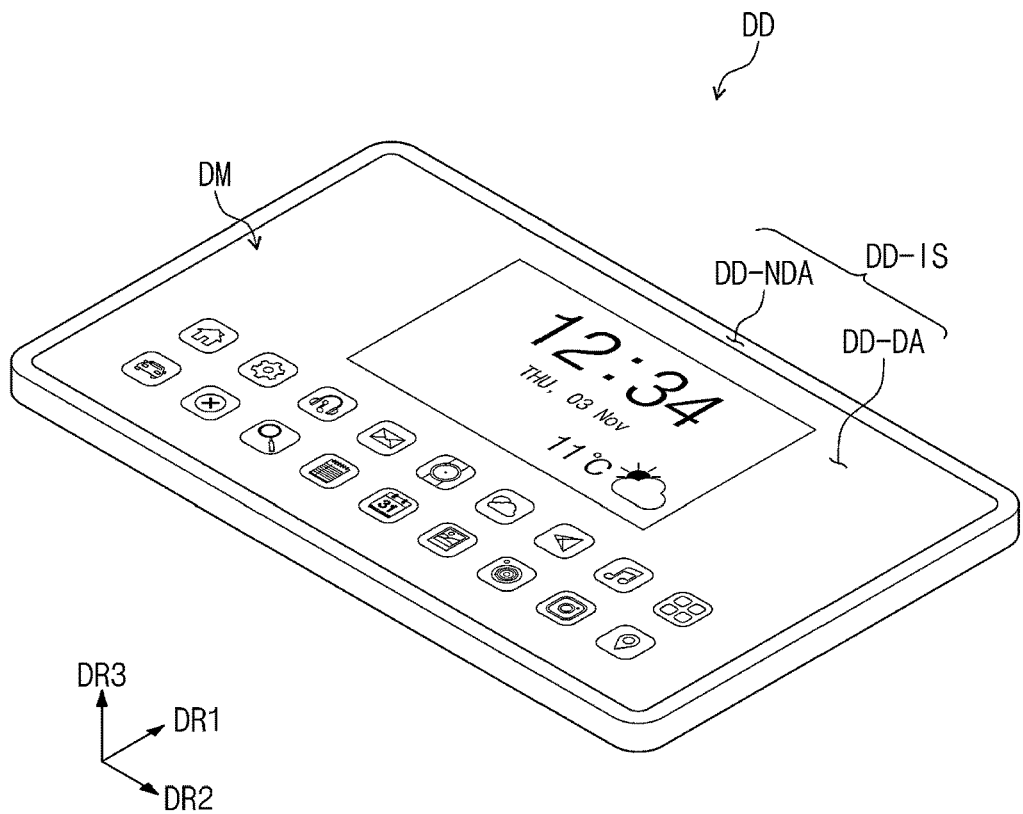
FIG. 1 is a perspective view of an electronic apparatus according to an embodiment of the present inventive concept.

Since the present inventive concept may have diverse modified embodiments, non-limiting embodiments are illustrated in the drawings and are described in the detailed description. However, this does not limit embodiments of the present inventive concept and it should be understood that the present inventive concept covers all the modifications, equivalents, and replacements within the idea and technical scope of the present inventive concept.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration. The term "and/or" includes any and all combinations of one or more of the associated components.

It will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the scope of the appended claims. The terms of a singular form may include plural forms unless referred to the contrary.

Also, ""under", "below", "above', "upper", and the like are used for explaining relation association of the elements illustrated in the drawings. The terms may be a relative concept and described based on directions expressed in the drawings.

The meaning of 'include' or 'comprise' specifies a property, a fixed number, a process, an operation, an element, a component or a combination thereof, but does not exclude other properties, fixed numbers, processes, operations, elements, components or combinations thereof.

In this specification, "being directly disposed" may mean that there is no layer, film, area, plate, or the like between a portion of the layer, the film, the area, the plate, or the like and the other portion. For example, "directly disposed" may mean being disposed without using an additional member such and an adhesion member or other intervening element between two layers or two members.

Unless otherwise defined, all terms (including technical and scientific terms) used herein have the same meaning as commonly understood by a person of ordinary skill in the art to which the present inventive concept belongs. In addition, terms such as terms defined in commonly used dictionaries should be interpreted as having a meaning consistent with the meaning in the context of the related technology, and unless explicitly defined here, they are interpreted as too ideal or too formal sense.

Hereinafter, a display device according to an embodiment and an electronic apparatus according to an embodiment will be described with reference to the drawings.

FIG. 1 is a perspective view of an electronic apparatus DD according to an embodiment of the present inventive concept. As illustrated in FIG. 1, the electronic apparatus DD may include a display device DM that displays an image through a display surface DD-IS. In an embodiment, the display surface DD-IS may have a rectangular shape having relatively short sides extending in a first direction DR1 and relatively long sides extending in a second direction DR2 crossing the first direction DR1 on a plane. However, embodiments of the present inventive concept are not necessarily limited thereto. For example, the display surface DD-IS may have various shapes such as a circular shape, a polygonal shape, etc.

In this embodiment, the third direction DR3 may be defined as a direction that is substantially perpendicular to a plane defined by the first direction DR1 and the second direction DR2. A front surface (e.g., a top surface) and a rear surface (e.g., a bottom surface) of each of members constituting the electronic apparatus DD may be opposed to each other in the third direction DR3, and a normal direction of each of the front and rear surfaces may be substantially parallel to the third direction DR3. A spaced distance between the front surface and the rear surface defined along the third direction DR3 may correspond to a thickness of a member.

In this specification, the term "on the plane" may be defined as a state when viewed in the third direction DR3. For example, "on the plane" may be explained based on the plane defined together by the first direction DR1 and the second direction DR2. In this specification, "on the cross-section" may be defined as a state when viewed from the first direction DR1 or the second direction DR2. The directions indicated as the first to third directions DR1, DR2, and DR3 may be a relative concept and thus changed into different directions. For example, while the first to third directions DR1 to DR3 are shown in FIG. 1 as being perpendicular to each other, embodiments of the present inventive concept are not necessarily limited thereto and the first to third directions DR1 to DR3 may cross each other at various different angles.

Although the electronic apparatus DD including the display device DM having a planar display surface is illustrated, embodiments of the present inventive concept are not necessarily limited thereto. The electronic apparatus DD may include a curved display surface or a solid display surface. For example, a solid display surface may include a plurality of display areas indicated in different directions and may also include at least one bent display surface. The electronic apparatus DD according to this embodiment may be a flexible electronic apparatus DD. For example, in an embodiment the flexible electronic apparatus DD may be a foldable electronic apparatus that is capable of being folded, a rollable electronic apparatus that is capable of being rolled, etc.

In FIG. 1, a tablet terminal is illustrated as an example of the electronic apparatus DD. In an embodiment, electronic modules, a camera module, a power module, and the like, which are mounted on a main board, may be disposed on a bracket/case together with the display device DM to constitute the tablet terminal. However, embodiments of the present inventive concept are not necessarily limited thereto, and the display device DM may be applied to large-sized electronic apparatuses such as televisions and monitors and small and medium-sized electronic apparatuses such as mobile phones, vehicle navigation systems, game consoles, and smart watches.

As illustrated in FIG. 1, the display surface DD-IS includes an active area DD-DA on which at least one moving and/or still image is displayed and a bezel area DD-NDA adjacent to the active area DD-DA (e.g., in the first and/or second directions DR1, DR2). The bezel area DD-NDA may be an area on which an image is not displayed. FIG. 1 illustrates software application icons and a clock, temperature and calendar window as examples of the image. However embodiments of the present inventive concept are not necessarily limited thereto and the image may be various different subject matter.

As illustrated in FIG. 1, the active area DD-DA may have a substantially rectangular shape. The "substantially rectangular shape" includes not only a rectangular shape in a mathematical sense but also a rectangular shape in which a vertex is not defined in a vertex area (e.g., a corner area) but a boundary of a curve is defined. For example, the "substantially rectangular shape" may include a shape which includes rounded corners.

The bezel area DD-NDA may surround the active area DD-DA (e.g., in the first and/or second directions DR1, DR2). However, the shape is not necessarily limited thereto, and the shape of the bezel area DD-NDA may be modified. For example, the bezel area DD-NDA may not surround at least one side of the active area DD-DA. For example, in an embodiment the bezel area DD-NDA may be disposed at only one side of the active area DD-DA.

Figure 2:
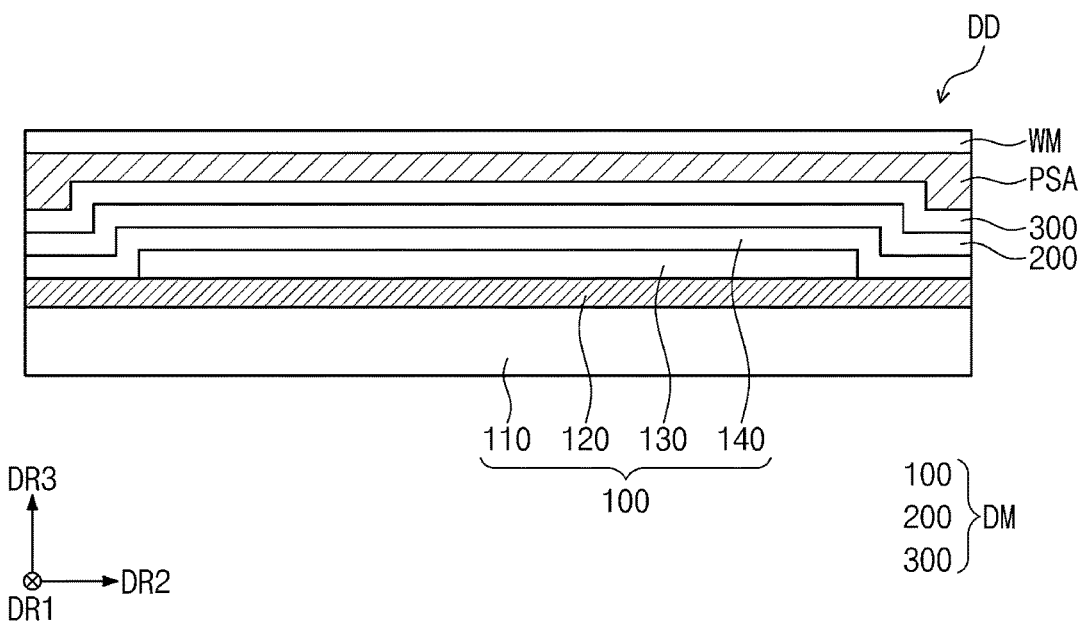
FIG. 2 is a cross-sectional view of the electronic apparatus according to an embodiment of the present inventive concept.

FIG. 2 is a cross-sectional view of the electronic apparatus DD according to an embodiment.

The electronic apparatus DD may include a display device DM and a window WM disposed on the display device DM. In an embodiment, the display device DM and the window WM may be coupled to each other by an adhesive layer PSA. However, embodiments of the present inventive concept are not necessarily limited thereto, and in an embodiment, the adhesive layer PSA may be omitted. In an embodiment, the window WM may be formed using a coating method, and the window WM may be directly disposed on the display device DM (e.g., in the third direction DR3).

In an embodiment, the display device DM may include a display panel 100, an input sensor 200, and a light control member 300. The display panel 100 may include a base layer 110, a circuit element layer 120, a display element layer 130, and an encapsulation layer 140.

In an embodiment, the base layer 110 may be a flexible substrate capable of being bent, folded, or rolled. The base layer 110 may be a glass substrate, a metal substrate, or a polymer substrate. However, embodiments of the present inventive concept are not necessarily limited thereto. For example, the base layer 110 may be an inorganic layer, an organic layer, or a composite layer. The base layer 110 may have substantially the same shape as the display panel 100.

The base layer 110 may have a multi-layered structure. For example, in an embodiment the base layer 110 may include a first synthetic resin layer, a second synthetic resin layer, and inorganic layers disposed between the first and second synthetic resin layers (e.g., in the third direction DR3). In an embodiment, each of the first and second synthetic resin layers may include a polyimide-based resin. However, embodiments of the present inventive concept are not necessarily limited thereto.

The circuit element layer 120 may be disposed on the base layer 110 (e.g., disposed directly thereon in the third direction DR3). The circuit element layer 120 may include a plurality of insulating layers, a plurality of semiconductor patterns, a plurality of conductive patterns, and signal lines. The circuit element layer 120 may include a driving circuit of a pixel.

The display element layer 130 may be disposed on the circuit element layer 120 (e.g., disposed directly thereon in the third direction DR3). The display element layer 130 may include a light emitting element. For example, in an embodiment the light emitting element may include an organic light emitting material, an inorganic light emitting material, an organic-inorganic light emitting material, a quantum dot, a quantum rod, a micro LED, or a nano LED.

An encapsulation layer 140 may be disposed on the display element layer 130 (e.g., disposed directly thereon). The encapsulation layer 140 may protect the display element layer 130, such as a light emitting element, against foreign substances such as moisture, oxygen, and dust particles. The encapsulation layer 140 may include at least one inorganic encapsulation layer. For example, in an embodiment the encapsulation layer 140 may include a laminated structure of a first inorganic encapsulation layer/an organic encapsulation layer/a second inorganic encapsulation layer.

In an embodiment, the input sensor 200 may be directly disposed on the display panel 100. The input sensor 200 may detect a user's input using, for example, an electromagnetic induction method and/or a capacitance method. In an embodiment, the display panel 100 and the input sensor 200 may be formed through a continuous process. For example, a third component is not disposed between the input sensor 200 and the display panel 100 (e.g., in the third direction DR3). For example, a separate adhesive layer may not be disposed between the input sensor 200 and the display panel 100.

In an embodiment, the light control member 300 may be a reflection reduction layer that reduces external light reflectance caused by light incident from the outside of the electronic apparatus DD. However, embodiments of the present inventive concept are not necessarily limited thereto, and the light control member 300 may include various light control layers to increase display quality of the electronic apparatus DD. For example, the light control member 300 according to an embodiment may include a polarizing layer, a phase retarder, a destructive interference structure, or a plurality of color filters. The light control member 300 may be omitted in the electronic apparatus DD according to an embodiment.

The window WM according to an embodiment may include a base material and a light blocking pattern. The base material may include a glass substrate and/or a synthetic resin film. The light blocking pattern may partially overlap the base material (e.g., in the third direction DR3). The light blocking pattern may substantially correspond to the bezel area DD-NDA (see FIG. 1) of the electronic apparatus DD. An area on which the light blocking pattern is not disposed may correspond to the active area DD-DA (see FIG. 1) of the display device DM. In this specification, that "area/portion and area/portion corresponds to each other" means "overlapping with each other", but is not necessarily limited to having the same area and/or the same shape.

Figure 3:
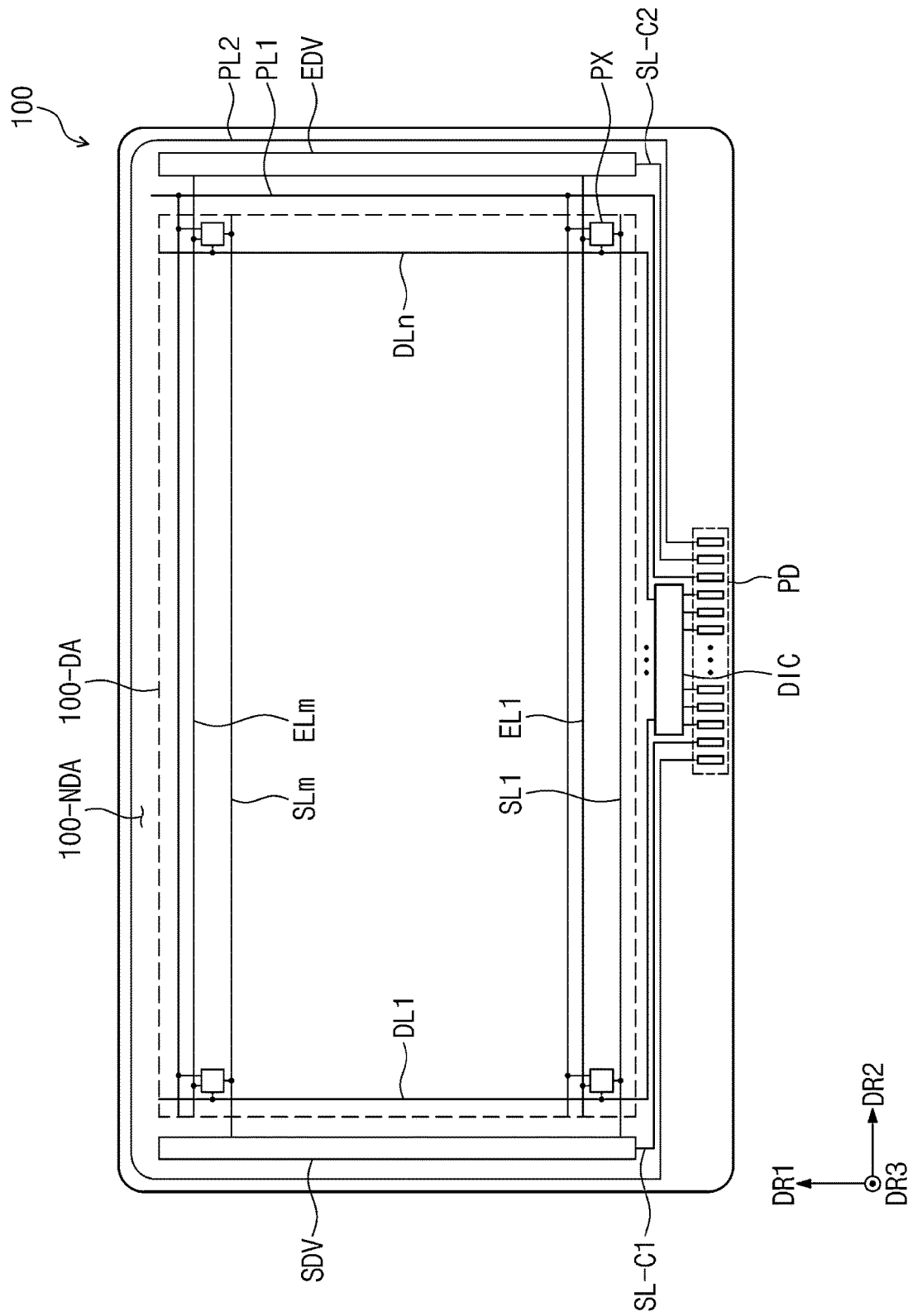
FIG. 3 is a plan view of a display panel according to an embodiment of the present inventive concept.

FIG. 3 is a plan view of the display panel 100 according to an embodiment.

Referring to FIG. 3, in an embodiment the display panel 100 may include a plurality of pixels PX, a scan driving circuit SDV, an emission driving circuit EDV, a plurality of signal lines, and a plurality of pads PD. The plurality of pixels PX are disposed on a display area 100-DA. A driving chip DIC mounted on a non-display area 100-NDA disposed outside of the display area 100-DA (e.g., in the first and/or second direction DR1, DR2) may include a data driving circuit. The display area 100-DA may correspond to the active area DD-DA (see FIG. 1) of the display device DM (see FIG. 1), and the non-display area 100-NDA may correspond to the bezel area DD-NDA (see FIG. 1). In addition, in an embodiment, the data driving circuit may also be integrated into the display panel 100, like a scan driving circuit SDV and an emission driving circuit EDV.

In an embodiment, the plurality of signal lines may include a plurality of scan lines SL1 to SLm, a plurality of data lines DL1 to DLn, a plurality of emission lines EL1 to ELm, and first and second control lines SL-C1 and SL-C2, and first and second power lines PL1 and PL2. Here, m and n are natural numbers greater than or equal to 2.

The scan lines SL1 to SLm may extend in the second direction DR2 and be electrically connected to the pixels PX and the scan driving circuit SDV. The data lines DL1 to DLn may extend in the first direction DR1 and be electrically connected to the pixels PX and the driving chip DIC. The emission lines EL1 to ELm may extend in the second direction DR2 and be electrically connected to the pixels PX and the emission driving circuit EDV.

The first power line PL1 may receive a first power voltage, and the second power line PL2 may receive a second power voltage at a lower level than the first power voltage. In an embodiment, a second electrode (e.g., cathode) of the light emitting element may be connected to the second power line PL2.

In an embodiment, the first control line SL-C1 may be connected to the scan driving circuit SDV and may extend towards a lower end of the display panel 100 (e.g., in the first direction DR1). The second control line SL-C2 may be connected to the emission driving circuit EDV and may extend towards the lower end of the display panel 100 (e.g., in the first direction DR1). In an embodiment, the pads PD may be disposed on the non-display area 100-NDA adjacent to the lower end of the display panel 100 (e.g., in the first direction DR1) and may be closer to the lower end of the display panel 100 than the driving chip DIC. The pads PD may be connected to the driving chip DIC and some signal lines.

The scan driving circuit SDV may generate a plurality of scan signals, and the scan signals may be applied to the pixels PX through the scan lines SL1 to SLm. The driving chip DIC may generate a plurality of data voltages, and the data voltages may be applied to the pixels PX through the data lines DL1 to DLn. The emission driving circuit EDV may generate a plurality of emission signals, and the emission signals may be applied to the pixels PX through the emission lines EL1 to ELm. The pixels PX may receive the data voltages in response to the scan signals. In an embodiment, the pixels PX may emit light having luminance corresponding the data voltages in response to the emission signals to display an image.

Figure 4B:
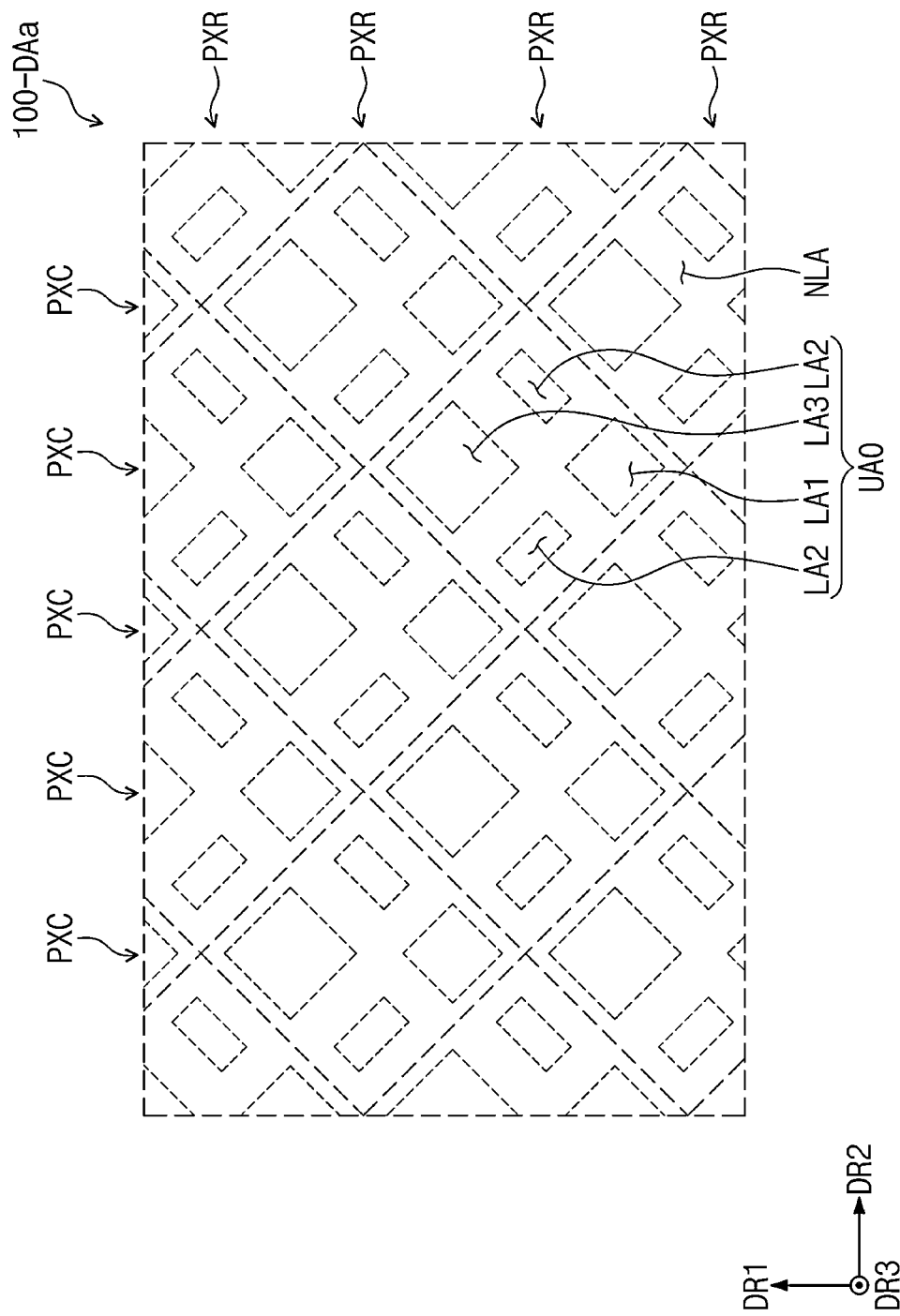

FIGS. 4A and 4B are enlarged plan views illustrating a portion of the display area of the display device according to embodiments of the present inventive concept.

Referring to FIGS. 4A and 4B, the display areas 100-DA and 100-DAa may include a plurality of emission areas LA1, LA2, and LA3, and a non-emission area NLA adjacent to the plurality of emission areas LA1, LA2, and LA3 (e.g., in the first and/or second directions DR1, DR2). The non-emission area NLA sets a boundary between the emission areas LA1, LA2, and LA3.

In an embodiment, the emission areas LA1, LA2, and LA3 may be disposed to one-to-one correspond to the pixels PX in FIG. 3. Each of the pixels PX may include the light emitting element, and the emission areas LA1, LA2, and LA3 may be areas on which light generated by the light emitting element is emitted. The emission areas LA1, LA2, and LA3 may be areas defined by a pixel defining layer PDL (see FIG. 5). An arrangement relationship between the emission areas LA1, LA2, and LA3 and the non-emission area NLA will be described later with reference to FIG. 5.

In an embodiment, the emission areas LA1, LA2, and LA3 may include a first emission area LA1 (e.g., first color emission area) having first color light, and a second emission area LA2 (e.g., second color light) having second color light, and a third emission area LA3 (e.g., third color emission area) having third color light. In an embodiment, the first color light may be red light, the second color light may be green light, and the third color light may be blue light.

In an embodiment, the areas of the first emission area LA1, the second emission area LA2, and the third emission area LA3 may be different from each other (e.g., in a plan view). However, embodiments of the present inventive concept are not necessarily limited thereto. In an embodiment, the first emission area LA1 may have the smallest surface area, and the third emission area LA3 may have the largest surface area. A surface area of each of the emission areas may be defined as a surface area on a plane defined by the first direction DR1 and the second direction DR2.

Each of the first to third emission areas LA1, LA2, and LA3 may have various shapes on a plane. For example, in an embodiment each of the first to third emission areas LA1, LA2, and LA3 may have a substantially polygonal shape such as a square or an octagon, a circular shape, or an oval shape. In FIGS. 4A and 4B, each of the first to third emission areas LA1, LA2, and LA3 is illustrated to have a rectangular shape. However, embodiments of the present inventive concept are not necessarily limited thereto, and the first to third emission areas LA1, LA2, and LA3 may have various shapes other than the square, and at least one of the first to third emission areas LA1, LA2, and LA3 may have a planar shape different from the remaining shapes. The shape of each of the first to third emission areas LA1, LA2, and LA3 may correspond to the shape of the light emitting opening PDL-OP (see FIG. 5)) of the pixel defining layer PDL (see FIG. 5).

In an embodiment illustrated in FIG. 4A, the first emission area LA1, the second emission area LA2, and the third emission area LA3 may define one emission unit UA. The emission unit UA may be a unit of repetitive arrangement of the emission areas arranged on the display area 100-DA. The display device DM (see FIG. 1) according to an embodiment may include a first emission unit UA1 and a second emission unit UA2.

Referring to FIG. 4A, in the first emission unit UA1 and the second emission unit UA2, the first emission area LA1 and the second emission area LA2 may overlap each other in the first direction DR1 and may be disposed to be spaced apart from each other in the first direction DR1. In the first emission unit UA1 and the second emission unit UA2, the third emission area LA3 may overlap each of the first emission area LA1 and the second emission area LA2 in the second direction DR2 and may be spaced apart from each of the first emission area LA1 and the second emission area LA2 in the second direction DR2.

In an embodiment, in the first emission unit UA1 and the second emission unit UA2, a position of the third emission area LA3 may be different from that of each of the first emission area LA1 and the second emission area LA2 in the first direction DR1.

In an embodiment, in the first emission unit UA1, the third emission area LA3 may be disposed relatively upward with respect to the first emission area LA1 and the second emission area LA2 in the first direction DR1. In the first emission unit UA1 according to an embodiment, the third emission area LA3 may be disposed to overlap the entire first emission area LA1 in the second direction DR2 and may be disposed to overlap only a portion of the second emission area LA2 in the second direction DR2.

In an embodiment, in the second emission unit UA2, the third emission area LA3 may be disposed relatively downward with respect to the first emission area LA1 and the second emission area LA2 in the first direction DR1. In the second emission unit UA2 according to an embodiment, the third emission area LA3 may be disposed to overlap the entire second emission area LA2 in the second direction DR2 and may be disposed to overlap only a portion of the first emission area LA1 in the second direction DR2.

In the display device according to an embodiment, the first emission unit UA1 and the second emission unit UA2 may be alternately arranged in the first direction DR1 and the second direction DR2, respectively.

The first emission unit UA1 and the second emission unit UA2 may be alternately disposed along the first direction DR1 within a pixel column PXC. In addition, the first emission unit UA1 and the second emission unit UA2 may be alternately disposed along the second direction DR2 within a pixel row PXR. Due to the arrangement of the first emission unit UA1 and the second emission unit UA2, the third emission area LA3 of the first emission unit UA1 and the third emission area LA3 of the second emission unit UA2 may be arranged according to certain rules.

A distance between the third emission areas LA3, which are adjacent to each other, may vary depending on the arrangement of the first emission unit UA1 and the second emission unit UA2 in the first direction DR1. As the first emission unit UA1 and the second emission unit UA2 are alternately disposed in the first direction DR1, a first portion PT1 at which the third emission area LA3 of the first emission unit UA1 and the third emission area LA3 of the second emission unit UA2 are spaced a first distance DT1 from each other (e.g., in the first direction DR1) and a second portion PT2 at which the third emission area LA3 of the first emission unit UA1 and the third emission area LA3 of the second emission unit UA2 are spaced a second distance DT1-X (e.g., in the first direction DR1), which is less than the first distance DT1, from each other may be alternately disposed. The first portion PT1 and the second portion PT2 may be alternately disposed in each of the first direction DR1 and the second direction DR2.

However, embodiments of the present inventive concept are not necessarily limited thereto, and unlike the illustrated drawings, the third emission area LA3 may be arranged to have the same interval from the emission units UA1 and UA2 adjacent to each other in the first direction DR1.

FIG. 4B is a plan view illustrating the display area of the display device according to an embodiment, which has an arrangement of the emission areas, which is different from that of FIG. 4A. Referring to FIG. 4B, in an embodiment one type of emission units UA0 may be disposed on the display area 100-DAa. In an embodiment, one emission unit UA0 may include a first emission area LA1 and a third emission area LA3, which are disposed to be spaced apart from each other in the first direction DR1, and two second emission areas LA2 disposed to be spaced apart from each other in the second direction DR2.

In an embodiment, in one emission unit UA0, four emission areas LA1, LA2, and LA3 may be arranged in a diamond shape. The emission units UA0 of the pixel rows PXR may be arranged along the second direction DR2. The emission units UA0 of the adjacent pixel rows PXR may be disposed to be offset with each other along the second direction DR2. The emission units UA0 of the adjacent pixel columns PXC may be disposed to be offset with each other along the first direction DR1.

The arrangement of the emission areas illustrated in FIGS. 4A and 4B may be merely an example, and the arrangement of the plurality of emission areas, the shape of the emission units, and the types of emission units are not necessarily limited to those illustrated in FIGS. 4A and 4B. The arrangement of the plurality of emission areas that emit light having different wavelength ranges may vary depending on display quality required for the display device, a size of the display device, and an intended use of the display device.

Figure 5:
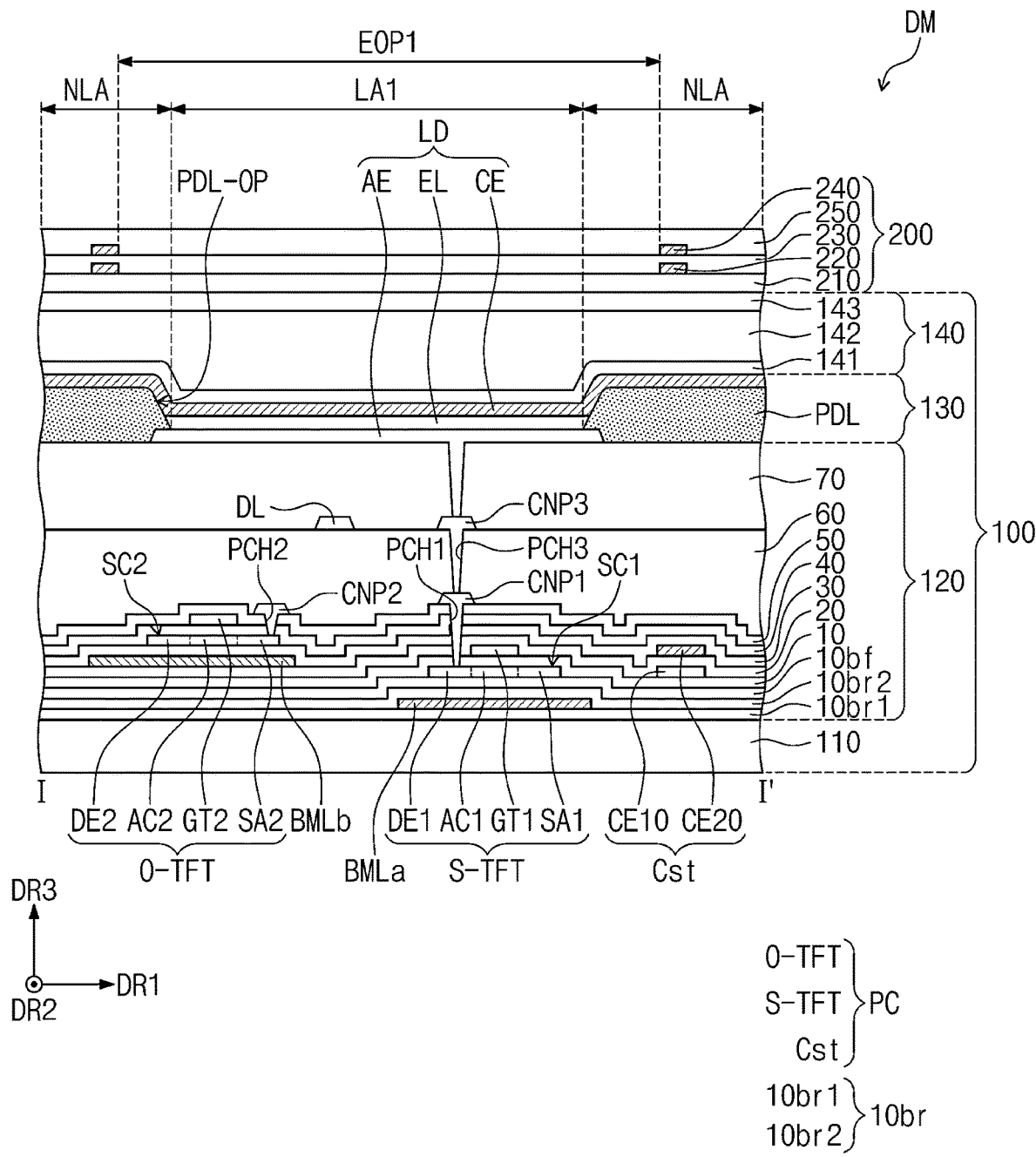
FIG. 5 is a cross-sectional view illustrating a portion of a display device according to an embodiment of the present inventive concept.

FIG. 5 is a cross-sectional view illustrating a portion of the display device DM according to an embodiment. FIG. 5 is a cross-sectional view of a portion taken along line I-I' of FIG. 4A.

In an embodiment, the display panel 100 may include a base layer 110, a circuit element layer 120, a display element layer 130 including a light emitting element LD, and an encapsulation layer 140 covering the light emitting element LD.

The circuit element layer 120 may include a pixel driving circuit PC that drives the light emitting element LD. The pixel driving circuit PC may include a plurality of pixel driving elements. The pixel driving circuit PC may include a plurality of transistors S-TFT and O-TFT and a capacitor Cst. In FIG. 5, a silicon transistor S-TFT and an oxide transistor O-TFT are illustrated as examples of the transistors. However, the pixel driving circuit PC illustrated in FIG. 5 is only an example, and the configuration of the pixel driving circuit PC is not necessarily limited thereto. For example, in some embodiments the pixel driving circuit PC may include only one type of transistor of the silicon transistor S-TFT or the oxide transistor O-TFT.

Referring to FIG. 5, the base layer 110 is illustrated as a single layer. The base layer 110 may include a synthetic resin such as polyimide. However, embodiments of the present inventive concept are not necessarily limited thereto. For example, in an embodiment the base layer 110 may have a multi-layered structure including a first synthetic resin layer, at least one inorganic layer, and a second synthetic resin layer.

The circuit element layer 120 may include a plurality of insulating layers, a plurality of semiconductor patterns, a plurality of conductive patterns, and connection patterns.

Referring to FIG. 5, the circuit element layer 120 may include a barrier layer 10*br* disposed on the base layer 110 (e.g., disposed directly thereon in the third direction DR3). The barrier layer 10*br* may prevent foreign substances from being introduced from the outside (e.g., the external environment). The barrier layer 10*br* may include at least one inorganic layer. For example, in an embodiment the barrier layer 10*br* may include a silicon oxide layer and a silicon nitride layer. Each of these may be provided in plurality, and the silicon oxide layers and silicon nitride layers may be alternately laminated (e.g., in the third direction DR3).

In an embodiment as shown in FIG. 5, the barrier layer 10*br* may include a lower barrier layer 10*br*1 and an upper barrier layer 10*br*2. A first shielding electrode BMLa may be disposed between the lower barrier layer 10*br*1 and the upper barrier layer 10*br*2 (e.g., in the third direction DR3). The first shielding electrode BMLa may be disposed to correspond to the silicon transistor S-TFT. The first shielding electrode BMLa may include a metal, such as molybdenum.

The first shielding electrode BMLa may receive a bias voltage. The first shielding electrode BMLa may receive a first power voltage. In an embodiment, the first shielding electrode BMLa may block an electrical potential due to polarization from affecting the silicon transistor S-TFT. The first shielding electrode BMLa may block external light from reaching the silicon transistor S-TFT. In an embodiment, the first shielding electrode BMLa may be a floating electrode that is electrically isolated from other electrodes or lines.

A buffer layer 10*bf* may be disposed on the barrier layer 10*br* (e.g., disposed directly thereon). The buffer layer 10*bf* may prevent metal atoms or impurities from being diffused into the base layer 110 to an upper first semiconductor pattern SC1. The buffer layer 10*bf* may include at least one inorganic layer. For example, in an embodiment the buffer layer 10*bf* may include a silicon oxide layer and a silicon nitride layer.

The first semiconductor pattern SC1 may be disposed on the buffer layer 10*bf* (e.g., disposed directly thereon). The first semiconductor pattern SC1 may include a silicon semiconductor. For example, in an embodiment the silicon semiconductor may include amorphous silicon, polycrystalline silicon, and the like. For example, the first semiconductor pattern SC1 may include low-temperature polysilicon.

The first semiconductor pattern SC1 may have different electrical properties depending on whether the first semiconductor pattern SC1 is doped. For example, in an embodiment the first semiconductor pattern SC1 may include a first region having high conductivity and a second region having low conductivity. The first region may be doped with an N-type dopant or a P-type dopant. The second region may be a non-doped region or may be a region doped at a concentration less than that of the first region. A source region SA1, a channel region AC1 (e.g., active region), and a drain region DE1 of the silicon transistor S-TFT may be formed from the first semiconductor pattern SC1. The source region SA1 and the drain region DE1 may extend in opposite directions from the channel region AC1 in a cross-section. A first insulating layer 10 may be disposed on the buffer layer 10*bf* (e.g., disposed directly thereon). The first insulating layer 10 may cover the first semiconductor pattern SC1. The first insulating layer 10 may be an inorganic layer. For example, in an embodiment the first insulating layer 10 may be a single-layered silicon oxide layer. The inorganic layer of the first insulating layer 10 as well as the circuit element layer 120, which will be described later, may have a single-layered or multi-layered structure and may include at least one of the above-described materials. However, embodiments of the present inventive concept are not necessarily limited thereto.

A gate GT1 of the silicon transistor S-TFT is disposed on the first insulating layer 10 (e.g., disposed directly thereon in the third direction DR3). The gate GT1 may be a portion of a metal pattern. The gate GT1 may overlap the channel region AC1 (e.g., in the third direction DR3). In a process of doping the first semiconductor pattern SC1, the gate GT1 may serve as a mask.

A first capacitor electrode CE10 of the storage capacitor Cst may be disposed on the first insulating layer 10 (e.g., disposed directly thereon in the third direction DR3). In some embodiments, the first capacitor electrode CE10 may have a shape that is integrated with the gate GT1.

The second insulating layer 20 may be disposed on (e.g., disposed directly thereon) the first insulating layer 10 to cover the gate GT1. In an embodiment, an upper electrode that overlaps the gate GT1 (e.g., in the third direction DR3) may be further disposed on the second insulating layer 20. A second capacitor electrode CE20 that overlaps the first capacitor electrode CE10 (e.g., in the third direction DR3) may be disposed on the second insulating layer 20 (e.g., disposed directly thereon in the third direction DR3). In an embodiment, the upper electrode may have a shape that is integrated with the second capacitor electrode CE20 on the plane.

A second shielding electrode BMLb may be disposed on the second insulating layer 20 (e.g., disposed directly thereon in the third direction DR3). The second shielding electrode BMLb may be disposed to correspond to the oxide transistor O-TFT. However, embodiments of the present inventive concept are not necessarily limited thereto. For example, in an embodiment, the second shielding electrode BMLb may be omitted. According to an embodiment, the first shielding electrode BMLa may extend up to a lower portion of the oxide transistor O-TFT to replace the second shielding electrode BMLb.

The third insulating layer 30 may be disposed on (e.g., disposed directly thereon) the second insulating layer 20. The second semiconductor pattern SC2 may be disposed on the third insulating layer 30 (e.g., disposed directly thereon in the third direction DR3). The second semiconductor pattern SC2 may include a channel region AC2 of the oxide transistor O-TFT. In an embodiment, the second semiconductor pattern SC2 may include a metal oxide semiconductor. In some embodiments, the second semiconductor pattern SC2 may include transparent conductive oxide (TCO) such as indium tin oxide (ITO), indium zinc oxide (IZO), indium gallium zinc oxide (IGZO), zinc oxide (ZnOx), or indium oxide ($In_2O_3$).

The metal oxide semiconductor may include a plurality of regions SA2, AC2, and DE2 divided depending on whether the transparent conductive oxide has been reduced. A region in which transparent conductive oxide is reduced (hereinafter, referred to as a reduction region) has a conductivity that is higher than that of a region in which the transparent conductive oxide is not reduced (hereinafter, referred to as a non-reduction region). The reduction region substantially serves as a source/drain of a transistor or a signal line. The non-reduction region substantially corresponds to a semiconductor region (e.g., a channel region) of the transistor. The fourth insulating layer 40 may be disposed on the third insulating layer 30 (e.g., disposed directly thereon in the third direction DR3). As illustrated in FIG. 5, the fourth insulating layer 40 may cover the second semiconductor pattern SC2. In an embodiment of the present inventive concept, the fourth insulating layer 40 may be an insulating pattern that overlaps the gate GT2 of the oxide transistor O-TFT (e.g., in the third direction DR3) and is exposed by the source region SA2 and drain region DE2 of the oxide transistor O-TFT.

The gate GT2 of the oxide transistor O-TFT may be disposed on the fourth insulating layer 40 (e.g., disposed directly thereon in the third direction DR3). The gate GT2 of the oxide transistor O-TFT may be a portion of the metal pattern. The gate GT2 of the oxide transistor O-TFT may overlap the channel region AC2 (e.g., in the third direction DR3). The fifth insulating layer 50 may be disposed on (e.g., disposed directly thereon) the fourth insulating layer 40, and the fifth insulating layer 50 may cover the gate GT2. In an embodiment, each of the first insulating layer 10 and the fifth insulating layer 50 may be an inorganic layer.

The first connection pattern CNP1 and the second connection pattern CNP2 may be disposed on the fifth insulating layer 50 (e.g., disposed directly thereon in the third direction DR3). In an embodiment, the first connection pattern CNP1 and the second connection pattern CNP2 are formed through the same process. Therefore, the first connection pattern CNP1 and the second connection pattern CNP2 may have the same material and the same laminated structure as each other. In an embodiment, the first connection pattern CNP1 may be connected to (e.g., directly connected thereto) the drain region DE1 of the silicon transistor S-TFT through a first pixel contact hole PCH1 passing through the first to fifth insulating layers 10, 20, 30, 40, and 50. The second connection pattern CNP2 may be connected to (e.g., directly connected thereto) the source region SA2 of the oxide transistor O-TFT through a second pixel contact hole PCH2 passing through the fourth and fifth insulating layers 40 and 50. However, a connection relationship between the first connection pattern CNP1 and the second connection pattern CNP2 with respect to the silicon transistor S-TFT and the oxide transistor O-TFT is not necessarily limited thereto.

The sixth insulating layer 60 may be disposed on the fifth insulating layer 50 (e.g., disposed directly thereon in the third direction DR3). The third connection pattern CNP3 may be disposed on the sixth insulating layer 60 (e.g., disposed directly thereon in the third direction DR3). In an embodiment, the third connection pattern CNP3 may be connected to (e.g., directly connected thereto) the first connection pattern CNP1 through a third pixel contact hole PCH3 passing through the sixth insulating layer 60. A data line DL may be disposed on the sixth insulating layer 60 (e.g., disposed directly thereon in the third direction DR3). The seventh insulating layer 70 may be disposed on (e.g., disposed directly thereon) the sixth insulating layer 60 and may cover the third connection pattern CNP3 and the data line DL. In an embodiment, the third connection pattern CNP3 and the data line DL are formed through the same process. Therefore, the third connection pattern CNP3 and the data line DL may have the same material and the same laminated structure as each other. In an embodiment, each of the sixth insulating layer 60 and the seventh insulating layer 70 may be an organic layer.

The display element layer 130 may be disposed on the circuit element layer 120 (e.g., disposed directly thereon in the third direction DR3). The display element layer 130 may include a light emitting element LD and a pixel defining layer PDL. In an embodiment, the light emitting element LD may include a first electrode AE, a second electrode CE facing the first electrode AE, and an emission layer EL disposed between the first electrode AE and the second electrode CE.

A light emitting opening PDL-OP exposing a portion of a top surface of the first electrode AE may be defined in the pixel defining layer PDL. An emission area LA1 may be defined to correspond to the light emitting opening PDL-OP.

The first electrode AE of the light emitting element LD may be disposed on the seventh insulating layer 70 (e.g., disposed directly thereon in the third direction DR3). The first electrode AE may be an anode or a cathode. In addition, the first electrode AE may be a pixel electrode. The first electrode AE may be a transmissive electrode, a transflective electrode, or a reflective electrode. In an embodiment, the first electrode AE may include Ag, Mg, Cu, Al, Pt, Pd, Au, Ni, Nd, Ir, Cr, Li, Ca, LiF/Ca, LiF/Al, Mo, Ti, W, or a compound or mixture thereof (e.g., a mixture of Ag and Mg). Alternatively, the first electrode AE may include the reflective layer or transflective layer, which is made of the above-described material, and a transparent conductive film including indium tin oxide (ITO), indium zinc oxide (IZO), zinc oxide (ZnO), or indium tin zinc oxide (ITZO). For example, the first electrode AE may include a three-layered structure of ITO/Ag/ITO. However, embodiments of the present inventive concept are not necessarily limited thereto. For example, in an embodiment the first electrode AE may include the above-described metal material, a combination of two or more metal materials selected from the above-described metal materials, or oxide of the above-described metal materials.

The second electrode CE may be a cathode or an anode. The second electrode CE may be a common electrode. For example, in an embodiment in which the first electrode AE is the anode, the second electrode CE may be the cathode, and in an embodiment in which the first electrode AE is the cathode, the second electrode CE may be the anode.

The second electrode CE may be a transmissive electrode, a transflective electrode, or a reflective electrode. In an embodiment in which the second electrode CE is the transmissive electrode, the second electrode CE may be made of transparent metal oxide, for example, indium tin oxide (ITO), indium zinc oxide (IZO), zinc oxide (ZnO), or indium tin zinc oxide (ITZO). In addition, the second electrode CE may include Ag, Mg, Cu, Al, Pt, Pd, Au, Ni, Nd, Ir, Cr, Li, Ca, LiF/Ca, LiF/Al, Mo, Ti, W, or a compound or mixture thereof (e.g., a mixture of Ag and Mg).

The emission layer EL may be a single layer or a light emitting structure in which a plurality of light emitting functional layers are laminated. The emission layer EL may include an organic light emitting material or an inorganic light emitting material. In an embodiment, the emission layer EL may emit color light having one of red, green, and blue colors. However, embodiments of the present inventive concept are not necessarily limited thereto, and the emission layer EL may emit one or more different color light other than red, green, and blue or may emit white light.

In FIG. 5 and the like, only the emission layer EL disposed between the first electrode AE and the second electrode CE is illustrated as the configuration of the light emitting element LD. However, in an embodiment the light emitting element LD may further include functional layer such as a hole transport region and an electron transport region. In an embodiment, the hole transport region may be disposed between the first electrode AE and the emission layer EL (e.g., in the third direction DR3), and the electron transport region may be disposed between the emission layer EL and the second electrode CE (e.g., in the third direction DR3). In an embodiment, the hole transport region may include a hole transport layer and may further include a hole injection layer. In addition, the electron transport region may include an electron transport layer and may further include an electron injection layer.

A pixel defining layer PDL may be disposed on the seventh insulating layer 70 (e.g., disposed directly thereon in the third direction DR3). The pixel defining layer PDL may has a single or multi-layered structure. The pixel define layer PDL may be made of a polymer resin. For example, in an embodiment the pixel define layer PDL may include a polyacrylate-based resin a polyimide-based resin. Also, the pixel define layer PDL may further include an inorganic material in addition to the polymer resin. The pixel define layer PDL may include a light absorbing material or may include a black coloring agent. A black component may include a black dye and a black pigment. In an embodiment, the black color agent may include carbon black, a metal such as chromium, or oxide thereof. However, embodiments of the present inventive concept are not necessarily limited thereto. The pixel define layer PDL including the black pigment or the black dye may realize a black pixel define layer.

Also, the pixel define layer PDL may be made of an inorganic material. For example, in an embodiment the pixel define layer PDL may be made of an inorganic material such as silicon nitride (SiNx), silicon oxide (SiOx), silicon oxynitride (SiOxNy), or the like.

The pixel defining layer PDL may cover a portion of the first electrode AE. For example, a light emitting opening PDL-OP exposing a portion of the first electrode AE may be defined in the pixel defining layer PDL. For example, in an embodiment, the light emitting opening PDL-OP may expose a central portion (e.g., in the first direction DR1) of the first electrode AE. An emission area LA1 may be defined to correspond to the light emitting opening PDL-OP. The non-emission area NLA may be a portion that overlaps the pixel defining layer PDL (e.g., in the third direction DR3). The distances DT1 and DT1-X between the emission areas in one direction, which are compared in FIG. 4A, may correspond to a width of the pixel defining layer, which separates the emission areas LA1, LA2, and LA3, in one direction.

In FIG. 5, one emission area LA1 corresponding to the first emission area LA1 of FIG. 4A is illustrated as an example. However, the cross-section corresponding to the second emission area LA2 (see FIG. 4A) and the third emission area LA3 (see FIG. 4A) may also be substantially the same as that of FIG. 5.

However, in an embodiment the second emission area LA2 (see FIG. 4A) and the third emission area LA3 (see FIG. 4A) may emit light having a wavelength range different from that of the first emission area LA1. For example, the first emission area LA1, the second emission area LA2 (see FIG. 4A), and the third emission area LA3 (see FIG. 4A) may include light emitting materials which emit different color light at the emission layer EL.

The encapsulation layer 140 may cover the light emitting element LD. In an embodiment, the encapsulation layer 140 may include an inorganic encapsulation layer 141, an organic encapsulation layer 142, and an inorganic encapsulation layer 143, which are sequentially laminated (e.g., in the third direction DR3), but the layers constituting the encapsulation layer 140 are not necessarily limited thereto. For example, the encapsulation layer 140 may be various different configurations including at least one inorganic encapsulation layer and one organic encapsulation layer. In an embodiment, the inorganic encapsulation layers 141 and 143 may include a silicon nitride layer, a silicon oxy nitride layer, a silicon oxide layer, a titanium oxide layer, or an aluminum oxide layer. Each of the inorganic encapsulation layers 141 and 143 may have a multi-layered structure. In an embodiment, the organic encapsulation layer 142 may include an acrylic-based organic layer. However, embodiments of the present inventive concept are not necessarily limited thereto.

An input sensor 200 may be disposed on the display panel 100. In an embodiment, the input sensor 200 may be directly disposed on the display panel 100 (e.g., in the third direction DR3).

The input sensor 200 may include a plurality of conductive patterns. The input sensor 200 may include at least one conductive layer (e.g., at least one sensor conductive layer) including a plurality of conductive patterns, and at least one insulating layer (e.g., at least one sensor insulating layer). In an embodiment, the input sensor 200 may include a first insulating layer 210 (e.g., a first sensor insulating layer), a first conductive layer 220 (e.g., a first sensor conductive layer), a second insulating layer 230 (e.g., a second sensor insulating layer or an interlayer insulating layer), a second conductive layer 240 (e.g., a second sensor conductive layer), and a third insulating layer 250 (e.g., a third sensor insulating layer). In FIG. 5, the plurality of conductive patterns provided in each of the first conductive layer 220 (e.g., the first sensor conductive layer) and the second conductive layer 240 (e.g., the second sensor conductive layer) are briefly illustrated.

In an embodiment, the first insulating layer 210 may be directly disposed on the display panel 100 (e.g., in the third direction DR3). The first insulating layer 210 may provide a base surface on which the sensing electrodes VSE1, VSE2, and HSE (see FIG. 8) and sensing lines SLV and SL-H (see FIG. 6) of the input sensor 200 are disposed. In an embodiment, the first insulating layer 210 may be disposed directly on the encapsulation layer 140 (e.g., in the third direction DR3), such as the inorganic encapsulation layer 143. However, embodiments of the present inventive concept are not necessarily limited thereto. For example, in some embodiments the first insulating layer 210 may be omitted, and the sensing electrodes VSE1, VSE2, and HSE and the sensing lines SLV and SL-H of the input sensor 200 may be directly disposed on the encapsulation layer 140 (e.g., in the third direction DR3).

In an embodiment, the first insulating layer 210 may be an inorganic layer including at least one of silicon nitride, silicon oxynitride, or silicon oxide. In addition, in an embodiment, the first insulating layer 210 may be an organic layer.

Each of the first conductive layer 220 and the second conductive layer 240 may have a single-layered structure or a multi-layered structure in which a plurality of layers are laminated in the third direction DR3. The first conductive layer 220 and the second conductive layer 240 may include conductive lines defining mesh-shaped electrodes. The conductive line of the first conductive layer 220 and the conductive line of the second conductive layer 240 may be or may not be connected to each other (e.g., directly connected to each other) through a contact hole passing through the second insulating layer 230 according to their positions.

In an embodiment, each of the first conductive layer 220 and the second conductive layer 240, each of which has a single layer structure, may include a metal layer or a transparent conductive layer. In an embodiment, the metal layer may include molybdenum, silver, titanium, copper, aluminum, or an alloy thereof. The transparent conductive layer may include transparent conductive oxide such as indium-tin oxide (ITO), indium-zinc oxide (IZO), zinc oxide (ZnOx), or indium zinc tin oxide (IZTO). In addition, the transparent conductive layer may include conductive polymers such as PEDOT, metal nanolines, graphene, and the like. However, embodiments of the present inventive concept are not necessarily limited thereto.

The first conductive layer 220 and the second conductive layer 240, each of which has a multi-layered structure, may include metal layers. The metal layers may have a three-layered structure of titanium/aluminum/titanium. In addition, in an embodiment the first conductive layer 220 and the second conductive layer 240, each of which has the multi-layered structure, may include copper in at least one metal layer. The conductive layer having the multi-layered structure may include at least one metal layer and at least one transparent conductive layer.

The second insulating layer 230 may be disposed between the first conductive layer 220 and the second conductive layer 240 (e.g., directly disposed therebetween in the third direction DR3). The third insulating layer 250 may cover the second conductive layer 240. However, embodiments of the present inventive concept are not necessarily limited thereto. For example, in an embodiment, the third insulating layer 250 may be omitted. Each of the second insulating layer 230 and the third insulating layer 250 may independently include an inorganic layer or an organic layer.

Each of the plurality of conductive patterns of the first conductive layer 220 and the plurality of conductive patterns of the second conductive layer 240 may be disposed to correspond to the non-emission area NLA. The plurality of conductive patterns of the first conductive layer 220 and the second conductive layer 240 may correspond to a mesh pattern MP (see FIG. 10), which will be described later. In addition, the first conductive layer 220 and the second conductive layer 240 may include sensing electrodes VSE1, VSE2, and HSE (see FIG. 8), which will be described later.

In the input sensor 200, a first insulating layer 210, a first conductive layer 220, a second insulating layer 230, a second conductive layer 240, and a third insulating layer 250 may be sequentially disposed. In an embodiment, the first conductive layer 220 and the second conductive layer 240 may be formed by providing and patterning a metal layer. For example, each of the first conductive layer 220 and the second conductive layer 240 may be formed through processes such as providing a metal layer using a sputtering method, providing photoresist for patterning the metal layer, patterning the metal layer using a dry etching method, and removing the photoresist in a strip process.

In an embodiment, each of the first insulating layer 210 and the third insulating layer 250 may be independently provided using a vapor deposition (CVD) or coating method. The second insulating layer 230 may be provided by the vapor deposition (CVD) or coating method. In an embodiment in which a contact hole for electrically connecting the first conductive layer 220 to the second conductive layer 240 is defined in the second insulating layer 230, photoresist may be provided on an insulating film provided by deposition or coating method, and thereafter, dry etching may be performed to pattern the second insulating layer 230.

Figure 6:
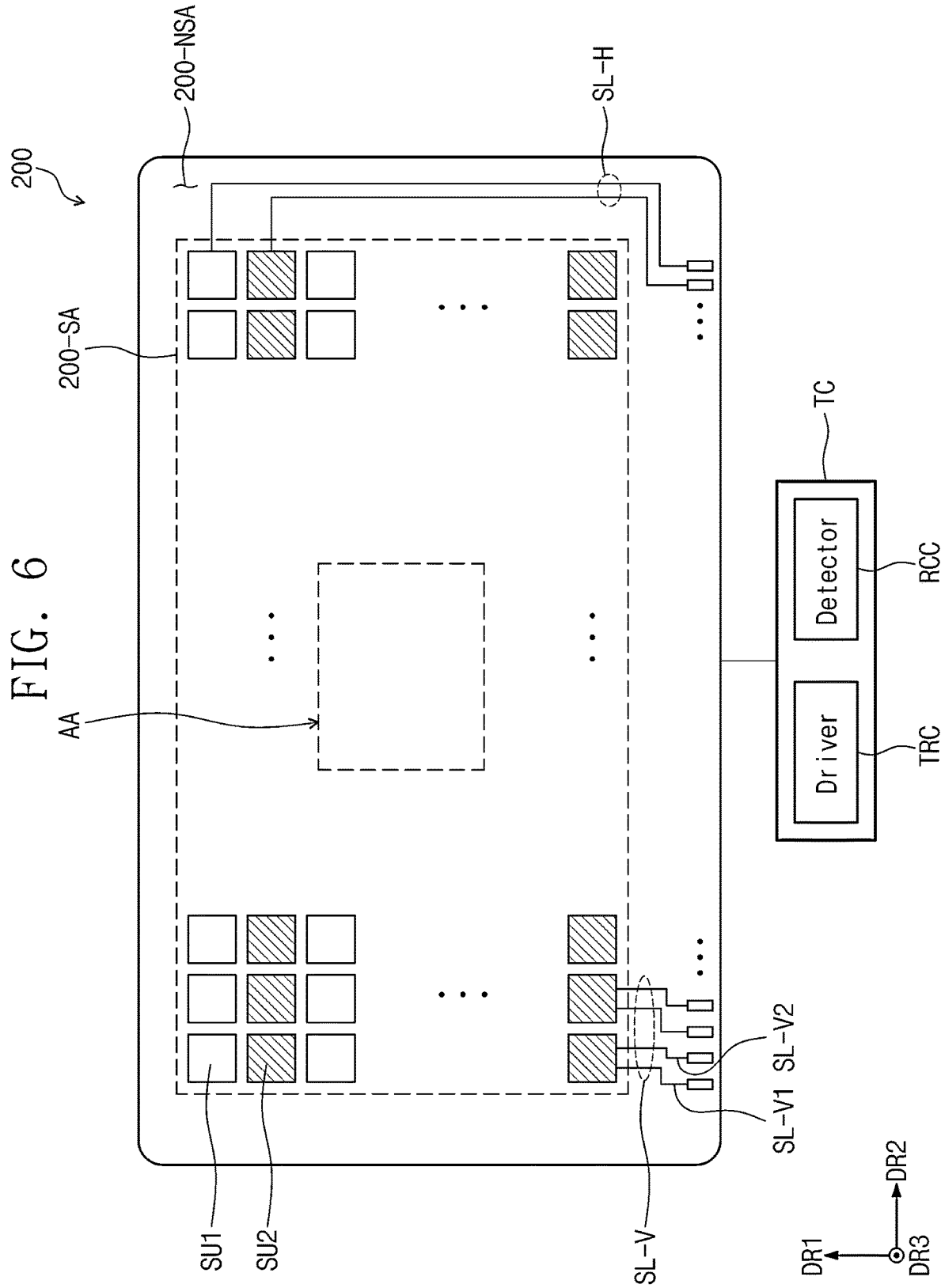
FIG. 6 is a plan view of an input sensor according to an embodiment of the present inventive concept.

However, the method for manufacturing each layer of the input sensor 200 is not necessarily limited to the above-described method, and any method may be used without limitation as long as methods for patterning two conductive layers 220 and 240 to form sensing electrodes VSE1, VSE2, and HSE (see FIG. 8), providing insulating layers 210, 230, and 250 to insulate or protect the two conductive layers 220 and 240 from each other, and the like are performed. FIG. 6 is a plan view of the input sensor 200 according to an embodiment.

Referring to FIG. 6, the input sensor 200 may include a sensing area 200-SA and a non-sensing area 200-NSA adjacent to the sensing area 200-SA (e.g., in the first and/or second directions DR1, DR2) and disposed outside the sensing area 200-SA. The sensing area 200-SA and the non-sensing area 200-NSA may correspond to the display area 100-DA and the non-display area 100-NDA illustrated in FIG. 3, respectively.

The input sensor 200 may include a plurality of sensing units SU1 and SU2. In an embodiment, the input sensor 200 may include a first sensing unit SU1 and a second sensing unit SU2, which are arranged alternately in the first direction DR1. The first sensing unit SU1 and the second sensing unit SU2 may include sensing patterns which are distinguished from each other. The plurality of first sensing units SU1 may be arranged in the second direction DR2, and the plurality of second sensing units SU2 may be arranged in the second direction DR2.

Each of the first sensing unit SU1 and the second sensing unit SU2 may include a plurality of sensing patterns. Each of the first sensing unit SU1 and the second sensing unit SU2 may include at least a portion of the first sensing electrode VSE1 (see FIG. 8), at least a portion of the second sensing electrode VSE2 (see FIG. 8), and a third sensing electrode HSE (see FIG. 8). The first sensing unit SU1 and the second sensing unit SU2 will be described in more detail later.

The input sensor 200 may include sensing lines SL-V and SL-H connected to the sensing units SU1 and SU2. The sensing lines SL-V and SL-H may be disposed on the non-sensing area 200-NSA. In an embodiment, the input sensor 200 may include a first sensing line SL-V connected to one side (e.g., a left side in the second direction DR2) of the sensing units SU1 and SU2 and a second sensing line SL-H connected to the other side (e.g., a right side in the second direction DR2) of the sensing units SU1 and SU2. The first sensing line SL-V and the second sensing line SL-H may be connected to each sensing unit SU1 and SU2. However, the present invention is not limited thereto, and multiple sensing lines of the same type may be connected to one sensing unit SU1 and SU2. Referring to FIG. 6, two first sensing lines SL-V1 and SL-V2 may be connected to one sensing unit SU1 and SU2.

In an embodiment, one of the first sensing line SL-V and the second sensing line SL-H may transmit a driving signal for sensing an external input from an external circuit to the corresponding sensing electrodes, and the other may output a sensing signal. Based on the sensing signal, a change in capacitance between the sensing electrodes included in the sensing units SU1 and SU2 may be measured. In an embodiment, the input sensor 200 may sense an external input in a mutual capacitance manner. However, embodiments of the present inventive concept are not necessarily limited thereto, and a self-cap type input sensor may be applied.

The sensing units SU1 and SU2 of the input sensor 200 may be connected to the sensor circuit TC. In an embodiment, the sensor circuit TC may include a driver TRC and a detector RCC. The driver TRC may provide a driving signal to the input sensor 200. In an embodiment, each of the first signal and the second signal may be a driving signal. The first signal and the second signal may be transmitted at the same time or at different times from each other. The driver TRC may provide a first signal to each of the first sensing electrodes and provide a second signal to each of the second sensing electrodes. In an embodiment, the driver TRC may output a difference between the first signal and the second signal as a driving signal. Thus, noise generation may be reduced to increase sensitivity of the input sensor 200.

The detector RCC may receive a detection signal from the input sensor 200. The detection signal may include location information of an external input provided to the input sensor 200. In an embodiment, each of the third signal and the fourth signal may be a detection signal. The third signal and the fourth signal may be transmitted at the same time or at different times from each other.

For example, in an embodiment in which the input sensor 200 is driven in a mutual capacitance manner, a third signal including a change in capacitance between the first sensing electrodes VSE1 (see FIG. 8) and the third sensing electrodes HSE (see FIG. 8) and a fourth signal including a change in capacitance between the second sensing electrode VSE2 (see FIG. 8) and the third sensing electrodes HSE (see FIG. 8) may be detected by the detector. The presence or absence of the external input and the location of the external input may be detected through the detected signals.

In an embodiment, the detector RCC may perform the detection based on an output signal obtained by subtracting information about the external input detected from the sensing units SU1 and SU2 forming one row from one of the third signal and the fourth signal from the other signal. The input sensor 200 according to an embodiment may be constituted by a first sensing electrode VSE1 (see FIG. 8) and a second sensing electrode VSE2 (see FIG. 8), which are arranged alternately in a row to detect a signal in which noise existing in the channel is reduced as a signal containing external input information, thereby increasing the sensitivity of the input sensor.

In an embodiment, an example in which the first and second signals are the driving signals, and the third and fourth signals are the output signals is described. However, embodiments of the present inventive concept are not necessarily limited thereto. In an embodiment, the first and second signals may be the output signals, and the third and fourth signals may be the driving signals.

Figure 7:
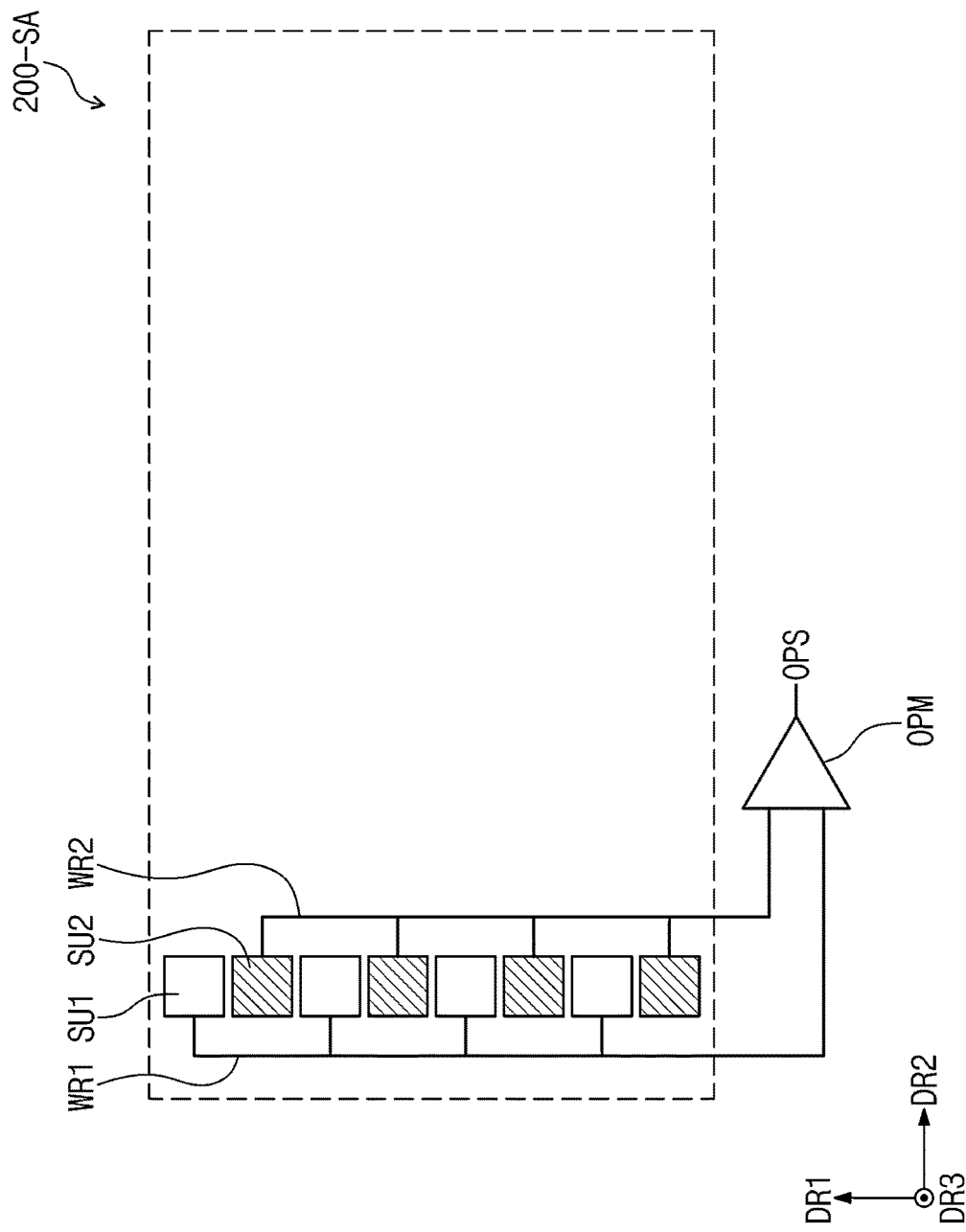
FIG. 7 is a schematic plan view illustrating a portion of the input sensor according to an embodiment of the present inventive concept.

FIG. 7 is a schematic plan view illustrating a portion of the input sensor according to an embodiment. FIG. 7 illustrates the first sensing unit SU1 and the second sensing unit SU2, which are arranged alternately in the first direction DR1 in one column.

FIG. 7 illustrates four first sensing units SU1 spaced apart from each other and arranged in the first direction DR1 and four second sensing units SU2 spaced apart from each other in the first direction DR1. In addition, in FIG. 7, the first sensing units SU1 may be arranged in odd-numbered rows, and the second sensing units SU2 may be arranged in even-numbered rows. However, embodiments of the present inventive concept are not necessarily limited thereto, and the number and arrangement order of the sensing units SU1 and SU2 disposed on the sensing area 200-SA may vary.

The first sensing patterns SP1-*a* (see FIG. 8) of the plurality of first sensing units SU1 arranged to be spaced apart from each other in the first direction DR1 may be electrically connected to each other. In addition, the first sensing patterns SP2-*a* (see FIG. 8) of the plurality of second sensing units SU2 may be electrically connected to each other.

FIG. 7 illustrates an example of a first trace line WR1 connected to the first sensing unit SU1 and a second trace line WR2 connected to the second sensing unit SU2. However, embodiments of the present inventive concept are not necessarily limited thereto. For example, in an embodiment the first trace line WR1 and the second trace line WR2 may disposed only at one side of the sensing units SU1 and SU2 or may be disposed to overlap the first sensing unit SU1 and the second sensing unit SU2.

In an embodiment, the first trace line WR1 may be connected to the third sensing pattern HSP (see FIG. 8) included in the first sensing unit SU1, and the second trace line WR2 may be connected to the third sensing pattern HSP (see FIG. 8) included in the second sensing unit SU2.

The first sensing unit SU1 and the second sensing unit SU2 may be connected to (e.g., electrically connected thereto) one output part OPM to output an output signal OPS. The output part OPM may be one of the components of the detector RCC (see FIG. 6) and may be a differential amplifier. For example, in an embodiment the output signal OPS may be a signal corresponding to a signal obtained by subtracting a signal for one of the first and second sensing units SU1 and SU2 from a signal for the other unit. As described above, the sensor circuit TC (see FIG. 6) may obtain touch information on the sensing area 200-SA through the output signal OPS.

Figure 8:
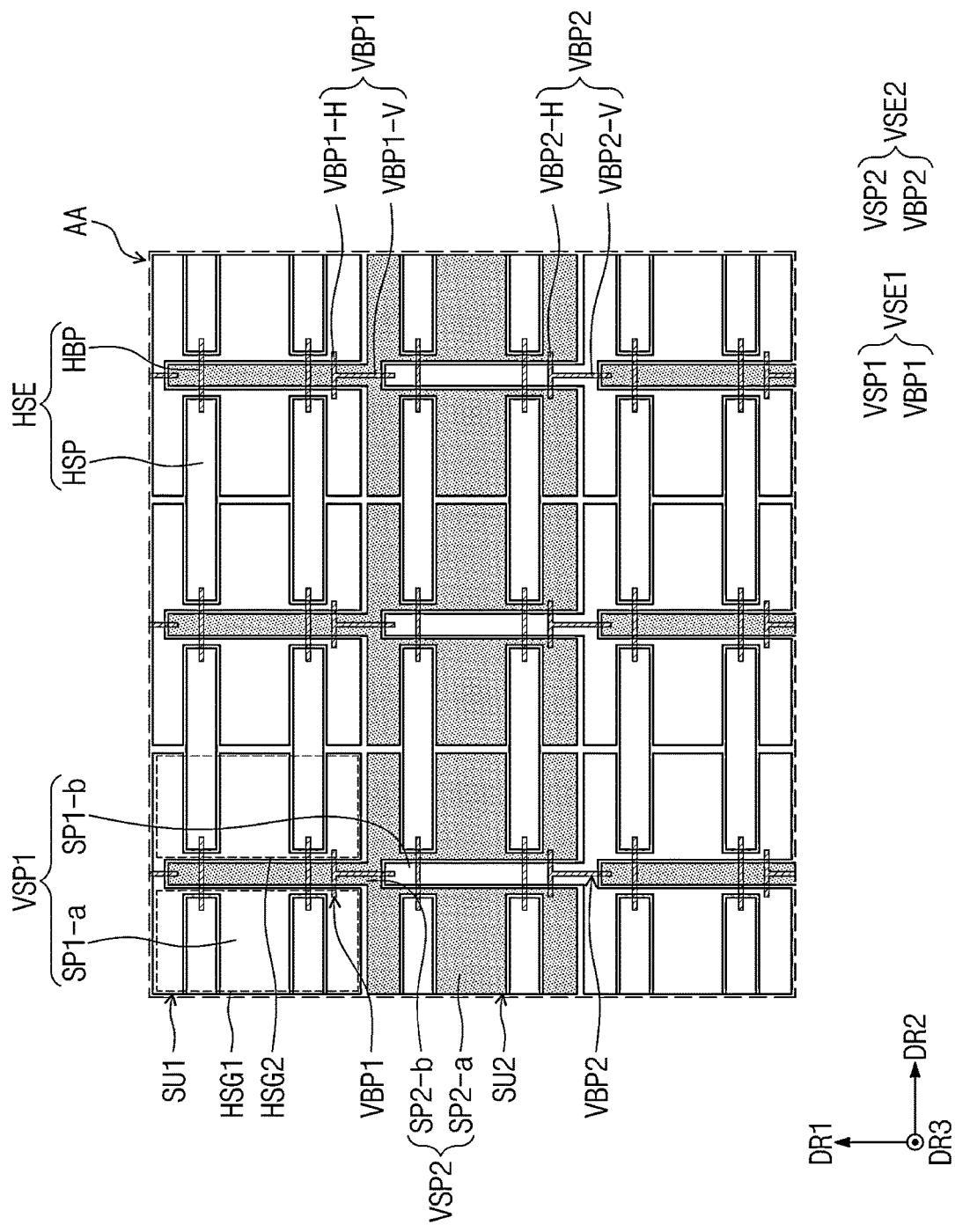
FIG. 8 is an enlarged plan view illustrating a portion of the input sensor according to an embodiment of the present inventive concept.

In an embodiment, each of the first sensing unit SU1 and the second sensing unit SU2 may include two different types of sensing patterns. Referring to FIGS. 7 and 8, in an embodiment, the first sensing unit SU1 may include a first sensing pattern SP1-*a* and a second sensing pattern SP1-*b*, and the second sensing unit SU2 may include a first sensing pattern SP2-*a* and a second sensing pattern SP2-*b*. The first sensing unit SU1 and the second sensing unit SU2 may be repeatedly disposed, including one pattern of the first sensing electrode VSE1 and one pattern of the second sensing electrode VSE2, respectively. The first sensing patterns SP1-*a* and SP2-*a* and the second sensing patterns SP1-*b* and SP2-*b* may be arranged to cross each other in the sensor units SU1 and SU2 and may be electrically connected to each other.

Figure 9A:
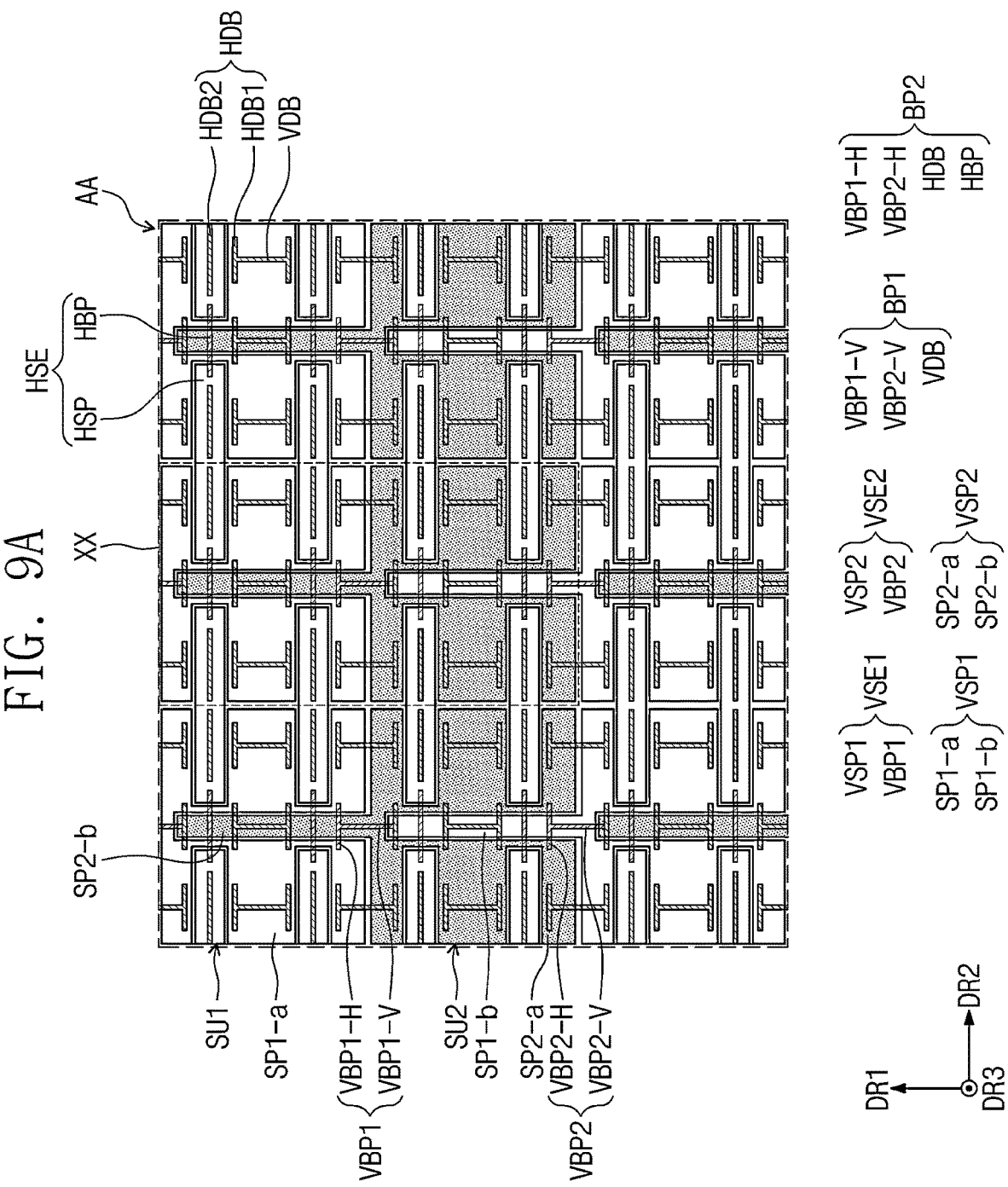
FIG. 9A is an enlarged plan view illustrating a portion of the input sensor according to an embodiment of the present inventive concept.
Figure 9B:
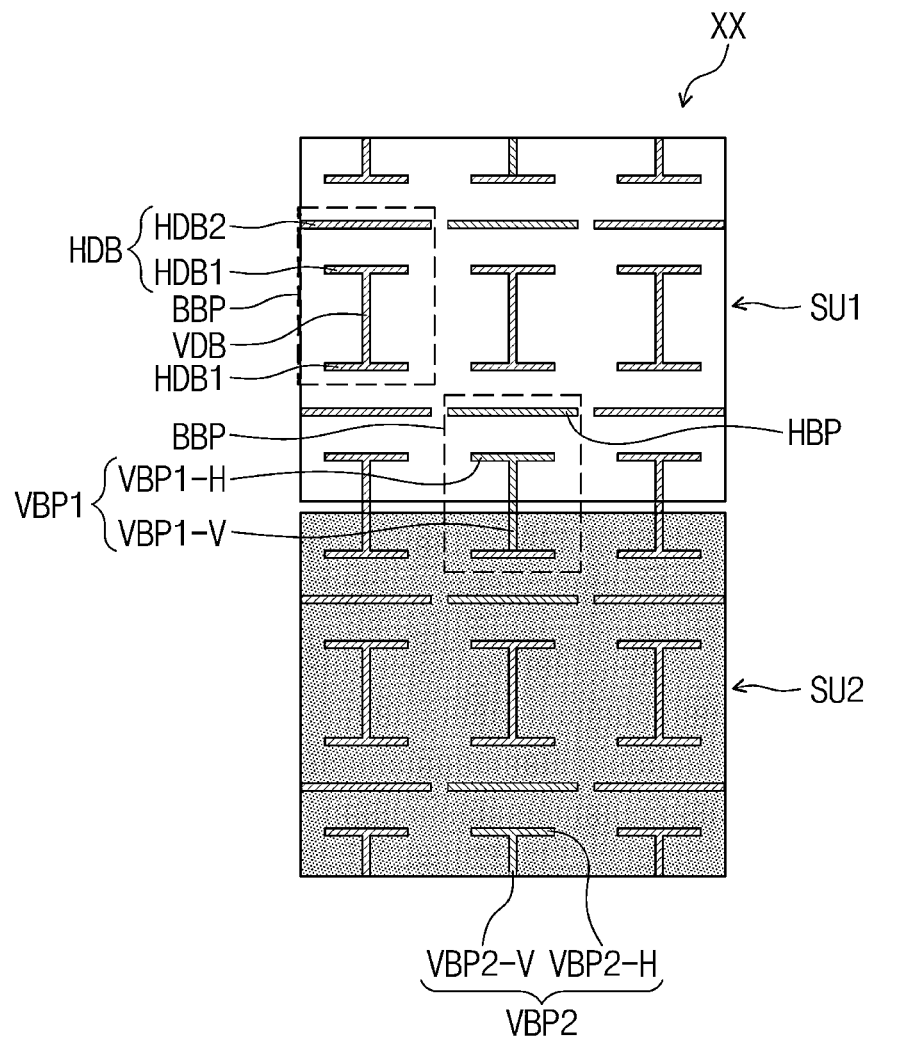
FIG. 9B is an enlarged plan view illustrating some configurations of the input sensor according to an embodiment of the present inventive concept.

FIGS. 8 and 9A are plan views illustrating a portion of the input sensor according to an embodiment. FIGS. 8 and 9A illustrate a portion corresponding to an area AA of FIG. 6. In FIG. 8, compared to FIG. 9A, a portion of a bridge pattern described later is omitted. FIG. 9B is an enlarged plan view illustrating only some configurations of the input sensor on a partial area of FIG. 9A.

Referring to FIGS. 6 and 8, in an embodiment the input sensor 200 may include a first sensing unit SU1 and a second sensing unit SU2. The first sensing unit SU1 and the second sensing unit SU2 may include first sensing patterns SP1-*a* and SP2-*a*, second sensing patterns SP1-*b* and SP2-*b*, and a third sensing pattern HSP, respectively. The first sensing unit SU1 and the second sensing unit SU2 including the first sensing patterns SP1-*a* and SP2-*a*, the second sensing patterns SP1-*b* and SP2-*b*, and the third sensing pattern HSP, respectively, may be alternately and repeatedly arranged in the first direction DR1. In addition, in the second direction DR2, the first sensing units SU1 may form one row, the second sensing units SU2 may form one row, and one row formed by the first sensing units SU1 and one row formed by the second sensing units SU2 may be alternately arranged in the first direction DR1.

The first sensing patterns SP1-*a* and SP2-*a*, the second sensing patterns SP1-*b* and SP2-*b*, and the third sensing pattern HSP, which are included in the first sensing unit SU1 and the second sensing unit SU2, respectively, may be conductive patterns that are insulated from each other. In an embodiment, each of the first sensing patterns SP1-*a* and SP2-*a*, the second sensing patterns SP1-*b* and SP2-*b*, and the third sensing patterns HSP may be disposed on the same layer as the second conductive layer 240 (see FIG. 5) of the above-described input sensor 200. For example, each of the first sensing patterns SP1-*a* and SP2-*a*, the second sensing patterns SP1-*b* and SP2-*b*, and the third sensing patterns HSP may be a conductive pattern corresponding to the configuration of the second conductive layer 240 (see FIG. 5) of the above-described input sensor 200.

Referring to FIG. 8, the input sensor 200 may include a plurality of bridges VBP1, VBP2, and HBP. Each of the plurality of bridges VBP1, VBP2, and HBP may electrically connect corresponding sensing patterns to each other. In an embodiment, the plurality of bridges VBP1, VBP2, and HBP illustrated in FIG. 8 may be conductive patterns constituting the sensing electrodes VSE1, VSE2, and HSE. For example, the plurality of bridges VBP1, VBP2, and HBP illustrated in FIG. 8 may correspond to real bridge patterns that are electrically connected. In an embodiment, each of the plurality of bridges VBP1, VBP2, and HBP may be disposed on the same layer as the first conductive layer 220 (see FIG. 5) of the input sensor described above. For example, each of the plurality of bridges VBP1, VBP2, and HBP may be a conductive pattern corresponding to the configuration of the first conductive layer 220 (see FIG. 5) of the input sensor described above.

In an embodiment, the sensing patterns and bridges including the first sensing patterns SP1-*a* and SP2-*a*, the second sensing patterns SP1-*b* and SP2-*b*, and the third sensing pattern HSP and the bridges VBP1, VBP2, and HBP may be disposed on different layers from each other. However, embodiments of the present inventive concept are not limited thereto, and at least one of the bridges VBP1, VBP2, or HBP may be disposed on the same layer as the sensing pattern, or at least one of the sensing patterns may be disposed on the same layer as the bridges VBP1, VBP2, and HBP.

In an embodiment, the plurality of bridges VBP1, VBP2, and HBP may be connected to the corresponding sensing patterns through contact holes passing through the second insulating layer (e.g., second sensor insulating layer 230 shown in FIG. 5). However, embodiments of the present inventive concept are not necessarily limited thereto.

In an embodiment, the first sensing patterns SP1-*a* and SP2-*a*, the second sensing patterns SP1-*b* and SP2-*b*, and the third sensing patterns HSP may have different shapes on a plane defined by the first direction DR1 and the second direction DR2. In an embodiment, each of the second sensing patterns SP1-*b* and SP2-*b* may have a bar shape extending longitudinally in the first direction DR1. In addition, the third sensing pattern HSP may have a bar shape extending longitudinally in the second direction DR2. Within one of the sensing units SU1 and SU2, the first sensing patterns SP1-*a* and SP2-*a* may not overlap (e.g., in a plan view) the second sensing patterns SP1-*b* and SP2-*b* and the third sensing pattern HSP and may have shapes that is filled into remaining portions of the sensing units SU1 and SU2, respectively. However, this is an example and embodiments of the present inventive concept are not necessarily limited to the shapes of the first sensing patterns SP1-*a* and SP2-*a*, the second sensing patterns SP1-*b* and SP2-*b*, and the third sensing patterns HSP.

In an embodiment illustrated in FIG. 8, each of the second sensing patterns SP1-*b* and SP2-*b* may have a shape extending from a center (e.g., a center in the second direction DR2) of each of the first sensing patterns SP1-*a* and SP2-*a* in the first direction DR1. The second sensing patterns SP1-*b* and SP2-*b* may be connected to the first sensing patterns SP1-*a* and SP2-*a* included in the sensing units SU1 and SU2 adjacent to each other. For example, the second sensing pattern SP2-*b* included in the first sensing unit SU1 may be physically or electrically connected to the first sensing pattern SP2-*a* of the second sensing unit SU2 adjacent in the first direction DR1. In addition, the second sensing pattern SP1-*b* included in the second sensing unit SU2 may be physically or electrically connected to the first sensing pattern SP1-*a* of the first sensing unit SU1 adjacent in the first direction DR1.

Referring to FIG. 8, in an embodiment, one side of the second sensing patterns SP1-*b* and SP2-*b* may be connected to be integrated with (e.g., integral with) the first sensing patterns SP1-*a* and SP2-*a* included in the adjacent sensing units SU1 and SU2. In addition, the other side of the second sensing patterns SP1-*b* and SP2-*b* may be electrically connected to the first sensing patterns SP1-*a* and SP2-*a* through the bridges VBP1 and VBP2. However, embodiments of the present inventive concept are not necessarily limited thereto, and the shapes of the second sensing patterns SP1-*b* and SP2-*b* may vary. For example, in an embodiment the second sensing patterns SP1-*b* and SP2-*b* and the first sensing patterns SP1-*a* and SP2-*a* included in the adjacent sensing units SU1 and SU2 may not be integrated with (e.g., integral with) each other, but may be electrically connected to each other.

In an embodiment, each of the plurality of third sensing patterns HSP may have a shape extending longitudinally in the second direction DR2. The plurality of third sensing patterns HSP included in one sensing unit SU1 or SU2 may be spaced apart from each other in the second direction DR2 with the second sensing patterns SP1-*b* and SP2-*b* therebetween. In an embodiment, the plurality of third sensing patterns HSP included in one sensing unit SU1 or SU2 may be divided into a first pattern group HSG1 and a second pattern group HSG2, which are divided with the second sensing patterns SP1-*b* and SP2-*b* therebetween (e.g., in the second direction DR2). The plurality of third sensing patterns HSP included in each pattern group HSG1 and HSG2 may be disposed to be spaced apart from each other in the first direction DR1.

In an embodiment illustrated in FIG. 8, at least one third sensing pattern HSP may be included in all of the sensing units SU1 and SU2 adjacent in the second direction DR2. For example, in an embodiment each of the sensing units SU1 and SU2 adjacent to each other in the second direction DR2 may include two third sensing patterns HSP. Referring to FIG. 8, one area (e.g., a first area) of the third sensing pattern HSP and the other area (e.g., a second area), which is the remaining area extending from the one area in the second direction DR2, may be disposed to be included in each of two first sensing units SU1 adjacent to each other in the second direction DR2. In addition, in an embodiment one area (e.g., a first area) of the third sensing pattern HSP and the other area (e.g., a second area), which is the remaining area extending from the one area in the second direction DR2, may be disposed to be included in each of two second sensing units SU2 adjacent to each other in the second direction DR2. However, embodiments of the present inventive concept are not necessarily limited thereto. For example, in an embodiment the third sensing pattern HSP having the bar shape extending in the second direction DR2 may not be included in each of the plurality of sensing units, but may be included in only one of the plurality of sensing units SU1 or SU2.

The input sensor 200 of an embodiment may include a first sensing electrode VSE1, a second sensing electrode VSE2, and a third sensing electrode HSE, which are distinguished from each other. The plurality of first sensing electrodes VSE1 electrically connected to each other may be arranged in the first direction DR1. The first sensing electrodes VSE1 arranged in the first direction DR1 to form one column may be repeatedly arranged in the second direction DR2. In addition, in an embodiment, the plurality of second sensing electrodes VSE2 electrically connected to each other may be arranged in the first direction DR1. The second sensing electrodes VSE2 arranged in the first direction DR1 to form one column may be repeatedly arranged in the second direction DR2. In an embodiment, each of the first sensing electrodes VSE1 and the second sensing electrodes VSE2 arranged in the first direction DR1 may referred to as a column electrode. In an embodiment, a portion of the first sensing electrode VSE1 and a portion of the second sensing electrode VSE2 may be arranged to overlap each other in the second direction DR2.

In an embodiment, each of the first sensing electrodes VSE1 may include a first sensing part VSP1 and a first-1 bridge VBP1 connecting adjacent first sensing parts VSP1 to each other. The first sensing part VSP1 may include a first sensing pattern SP1-*a* and a second sensing pattern SP1-*b*. The first-1 bridge VBP1 may be a portion that connects sides of the first sensing pattern SP1-*a* and the adjacent second sensing pattern SP1-*b* to each other.

In an embodiment, the first sensing pattern SP1-*a* of the first sensing part VSP1 may be referred to as a first-1 sensing pattern, and the second sensing pattern SP1-*b* of the first sensing part VSP1 may be referred to as a first-2 sensing pattern. In addition, the first-1 bridge VBP1 included in the first sensing electrode VSE1 may be referred to as a first bridge.

The first-1 bridge VBP1 may electrically connect the sides of the first-1 sensing pattern SP1-*a* and the first-2 sensing pattern SP1-*b* to each other. In an embodiment, the first-1 bridge VBP1 may be T-shaped. In FIG. 8 and the like, although an example in which one first-1 bridge VBP1 electrically connecting two adjacent first sensing parts VSP1 is shown, the number of first-1 bridges VBP1 is not necessarily limited thereto, and the adjacent first sensing parts VSP1 may be electrically connected to each other by a plurality of first-1 bridges VBP1.

In an embodiment, each of the second sensing electrodes VSE2 may include a second sensing part VSP2 and a second-1 bridge VBP2 connecting adjacent second sensing parts VSP2 to each other. In an embodiment, the second sensing part VSP2 may include a first sensing pattern SP2-*a* and a second sensing pattern SP2-*b*. The second-1 bridge VBP2 may be a portion that connects sides of the first sensing pattern SP2-*a* and the adjacent second sensing pattern SP2-*b* to each other.

In an embodiment, the first sensing pattern SP2-*a* of the second sensing part VSP2 may be referred to as a second-1 sensing pattern, and the second sensing pattern SP2-*b* of the second sensing part VSP2 may be referred to as a second-2 sensing pattern. In addition, the second-1 bridge VBP2 included in the second sensing electrode VSE2 may also be referred to as a first bridge.

The second-1 bridge VBP2 may electrically connect the sides of the second-1 sensing pattern SP2-*a* and the second-2 sensing pattern SP2-*b* to each other. In an embodiment, the second-1 bridge VBP2 may be T-shaped. In FIG. 8 and the like, although an example in which one second-1 bridge VBP2 electrically connecting two adjacent second sensing parts VSP2 is shown, the number of second-1 bridges VBP2 is not necessarily limited thereto, and the adjacent second sensing parts VSP2 may be electrically connected to each other by a plurality of second-1 bridges VBP2.

The first-1 sensing pattern SP1-*a* and the second-1 sensing pattern SP2-*a* may be arranged alternately in the first direction DR1, and the first-2 sensing pattern SP1-*b* and the second-2 sensing pattern SP2-*b* may be arranged alternately in the first direction DR1. In addition, the first-1 sensing pattern SP1-*a* and the second-2 sensing pattern SP2-*b* may be disposed to overlap each other in the second direction DR2, and the second-1 sensing pattern SP2-*a* and the first-2 sensing pattern SP1-*b* may be disposed to overlap each other in the second direction DR2.

In an embodiment, the input sensor 200 may include sensing electrodes VSE1 and VSE2 in two divided column directions. Each of the first sensing electrode VSE1 and the second sensing electrode VSE2 may be a column electrode disposed to extend in the first direction DR1. The first sensing electrode VSE1 and the second sensing electrode VSE2 may operate by receiving different driving signals.

In an embodiment, on the plane defined by the first direction DR1 and the second direction DR2, the first-1 sensing pattern SP1-*a* and the second-1 sensing pattern SP2-*a* may have the same shape as each other, and the first-2 sensing pattern SP1-*b* and the second-2 sensing pattern SP2-*b* may have the same shape as each other. In an embodiment, the first-1 sensing pattern SP1-*a* and the second-2 sensing pattern SP2-*b* may constitute the first sensing unit SU1, and the second-1 sensing pattern SP2-*a* and the first-2 sensing pattern SP1-*b* may constitute the second sensing unit SU2.

In addition, in an embodiment, the first-1 bridge VBP1 and the second-1 bridge VBP2 may have the same shape as each other on the plane. For example, each of the first-1 bridge VBP1 and the second-1 bridge VBP2 may correspond to a first bridge connecting two same types of sensing parts arranged in the first direction DR1 to each other.

In an embodiment, the first-1 bridge VBP1 may include a first portion VBP1-V extending longitudinally in the first direction DR1 and a second portion VBP1-H connected to an end of the first portion VBP1-V and extending longitudinally in the second direction DR2. In an embodiment, the first portion VBP1-V and the second portion VBP1-H of the first-1 bridge VBP1 may be integrated with each other (e.g., integral with each other).

In addition, in an embodiment the second-1 bridge VBP2 may include a first portion VBP2-V extending longitudinally in the first direction DR1 and a second portion VBP2-H connected to an end of the first portion VBP2-V and extending longitudinally in the second direction DR2. In an embodiment, the first portion VBP2-V and the second portion VBP2-H of the second-1 bridge VBP2 may be integrated with each other (e.g., integral with each other).

In an embodiment, in each of the first-1 bridge VBP1 and the second-1 bridge VBP2, the first portions VBP1-V and VBP2-V and the second portions VBP1-H and VBP2-H may be independently provided in plurality.

Referring to FIGS. 6 and 8, the input sensor 200 includes a plurality of third sensing electrodes HSE. The plurality of third sensing electrodes HSE electrically connected to each other may be arranged in the second direction DR2. The third sensing electrodes HSE arranged in the second direction DR2 to form one row may be repeatedly arranged in the first direction DR1. In an embodiment, the third sensing electrodes HSE may be arranged in the second direction DR2 and may be referred to as row electrodes.

In an embodiment, the third sensing electrodes HSE may include a third sensing pattern HSP and a second bridge HBP connecting adjacent third sensing patterns HSP to each other. The third sensing pattern HSP may also be referred to as a third sensing part. The second bridge HBP may be a portion that extends longitudinally in the second direction DR2 to connect the third sensing patterns HSP adjacent in the second direction DR2 to each other.

The second bridge HBP may have a different shape on a plane than the first bridge VBP1 and VBP2. For example, in an embodiment the second bridge HBP may be a bar-shaped conductive pattern extending longitudinally in the second direction DR2.

In addition, in an embodiment, an arrangement interval of the second bridges HBP in the first direction DR1 may be different from an arrangement interval of the first bridges VBP1 and VBP2. In an embodiment, the plurality of second bridges HBP may be arranged to be spaced apart from each other in the first direction DR1 in one sensing unit SU1 or SU2. In comparison, in an embodiment one first bridge VBP1 or VBP2 overlapping the second bridges HBP in the first direction DR1 may be disposed to correspond to one sensing unit SU1 or SU2. Referring to FIG. 8, one first bridge VBP1 or VBP2 may be included between the first sensing unit SU1 and the adjacent second sensing unit SU2, and a plurality of second bridges HBP may be arranged between the first bridges VBP1 and VBP2 spaced apart from each other in the first direction DR1.

For example, the input sensor 200 according to an embodiment may include the first bridges VBP1 and VBP2 and the second bridge HBP, which are included in the first sensing unit SU1 and the second sensing unit SU2, respectively, and the first bridges VBP1 and VBP2 and the second bridge HBP may correspond to the conductive patterns having different shapes on the plane, and the first bridges VBP1 and VBP2 and the second bridge HBP may be arranged at different intervals in the first direction DR1. In an embodiment, the first bridges VBP1 and VBP2 and the second bridge HBP may be uniformly distributed and arranged throughout the sensing area 200-SA of the input sensor 200.

FIG. 9A is an enlarged plan view illustrating a portion of the input sensor according to an embodiment. FIG. 9B is an enlarged view of an area XX of FIG. 9A.

FIG. 9A additionally illustrates the bridge patterns in FIG. 8. The bridge patterns additionally illustrated in FIG. 9A compared to FIG. 8 may be dummy bridge patterns that are floated and electrically insulated from the sensing electrodes VSE1, VSE2, and HSE. In FIG. 9B, some components in FIG. 9A will be omitted, and only the bridge patterns are illustrated for convenience of explanation.

Referring to FIGS. 6, 9A, and 9B, the input sensor 200 may include a first sensing unit SU1, a second sensing unit SU2, and a plurality of bridges groups BBP, which are arranged alternately in the first direction DR1, In an embodiment, each of the plurality of bridge groups BBP may include at least one first bridge pattern BP1 and at least one second bridge pattern BP2. The first bridge pattern BP1 may have a first shape extending longitudinally in the first direction DR1, and the second bridge pattern BP2 may have a second shape extending longitudinally in the second direction DR2.

The first bridge pattern BP1 may have a bar shape extending in the first direction DR1. In an embodiment, the first bridge pattern BP1 may be a real bridge pattern or a dummy bridge pattern. In an embodiment, the first bridge pattern BP1 may be the first portions VBP1-V and VBP2-V of the first bridges VBP1 and VBP2 or the first dummy bridge VDB insulated (e.g., electrically insulated or floated) from the first to third sensing patterns. In an embodiment, each of the first portions VBP1-V and VBP2-V of the first bridges VBP1 and VBP2 and the first dummy bridge VDB may have a bar shape extending longitudinally in the first direction DR1.

In an embodiment, the first dummy bridge VDB may have the same shape as the first portions VBP1-V and VBP2-V. In addition, lengths of the first dummy bridge VDB and the first portions VBP1-V and VBP2-V in the first direction DR1 may be the same as each other.

In an embodiment, the first dummy bridge VDB may include sub-dummy bridges having different lengths in the first direction DR1. In this embodiment, at least one of the sub-dummy bridges may have the same shape and size as the first portions VBP1-V and VBP2-V, and each of the remaining sub-dummy bridges may have a length different from that of each of the first portions VBP1-V and VBP2-V.

The second bridge pattern BP2 may have a bar shape extending longitudinally in the second direction DR2. In an embodiment, the second bridge pattern BP2 may be a real bridge pattern or a dummy bridge pattern. In an embodiment, the second bridge pattern BP2 may be the second bridge HBP, which electrically connects adjacent third sensing patterns HSP to each other, the second portions VBP1-H and VBP2-H of the first bridges VBP1 and VBP2, or a second dummy bridge HDB insulated (e.g., electrically insulated or floated) from the first to third sensing patterns. In an embodiment, each of the second bridge HBP, the second portions VBP1-H and VBP2-H of the first bridges VBP1 and VBP2, and the second dummy bridge HDB may have a bar shape extending longitudinally in the second direction DR2.

In an embodiment illustrated in FIGS. 9A and 9B, the second dummy bridge HDB may include a second-1 dummy bridge HDB1 and a second-2 dummy bridge HDB2. Each of the second-1 dummy bridge HDB1 and the second-2 dummy bridge HDB2 may have a bar shape extending longitudinally in the second direction DR2. The second-1 dummy bridge HDB1 and the second-2 dummy bridge HDB2 may have different lengths from each other in the second direction DR2.

In an embodiment, the second-1 dummy bridge HDB1 may have the same shape on the plane as the second portions VBP1-H and VBP2-H, and the second-2 dummy bridge HDB2 may have the same shape on the plane as the second bridge HBP. For example, lengths of the second-1 dummy bridge HDB1 and the second portions VBP1-H and VBP2-H in the second direction DR2 may be substantially the same as each other, and lengths of the second-2 dummy bridge HDB2 and the second bridge HBP in the second direction DR2 may be substantially the same as each other.

In an embodiment, a first dummy bridge pattern having the same shape as the first bridges VBP1 and VBP2 may be provided by combining the first dummy bridge VDB and the second dummy bridge HDB. In an embodiment illustrated in FIGS. 9A and 9B, the first dummy bridge pattern may be constituted by a first dummy bridge VDB and a second-1 dummy bridge HDB1. The second dummy bridge pattern having the same shape as the second bridge HBP may be provided as a second-2 dummy bridge HDB2.

In an embodiment, in the input sensor 200, the plurality of bridge groups BBP may be uniformly distributed and arranged. The bridge group BBP may have a specific pattern shape (e.g., a specific one pattern shape). In an embodiment, the bridge group BBP may include at least one real bridge pattern and at least one dummy bridge pattern or may be provided as only a plurality of dummy bridge patterns. The bridge group BBP including the plurality of bridges may be referred to as one bridge.

In an embodiment illustrated in FIGS. 9A and 9B, one bridge group BBP may be constituted by one first bridge pattern BP1 and three second bridge patterns BP2. For example, in an embodiment, one bridge group BBP may be constituted by one first bridge pattern BP1 and two types of second bridge patterns BP2 having different lengths from each other.

In an embodiment, one first bridge pattern BP1, the second bridge pattern BP2 disposed at each of both ends of the first bridge pattern BP1 spaced apart from each other in the first direction DR1, and a different type of second bridge pattern BP2 spaced apart from the second bridge pattern BP2 disposed on one end of the first bridge pattern BP1 may constitute one bridge group BBP. In an embodiment illustrated in FIGS. 9A and 9B, at least one of the bridge groups BBP may be constituted by two second-1 dummy bridges HDB1, one first dummy bridge VDB disposed between the second-1 dummy bridges HDB1 (e.g., in the first direction DR1), and a second-2 dummy bridge HDB2 spaced apart from the first dummy bridge VDB (e.g., in the first direction DR1). In addition, at least one of the bridge groups BBP may be constituted by one first bridge VBP1 or VBP2, one second-1 dummy bridge HDB1, and one second bridge HBP, or at least one of the bridge groups BBP may be constituted by two second-1 dummy bridges HDB1, one first dummy bridge VDB disposed between the second-1 dummy bridges HDB1 (e.g., in the first direction DR1), and a second bridge HBP spaced apart from the first dummy bridge VDB (e.g., in the first direction DR1).

Figure 9C:
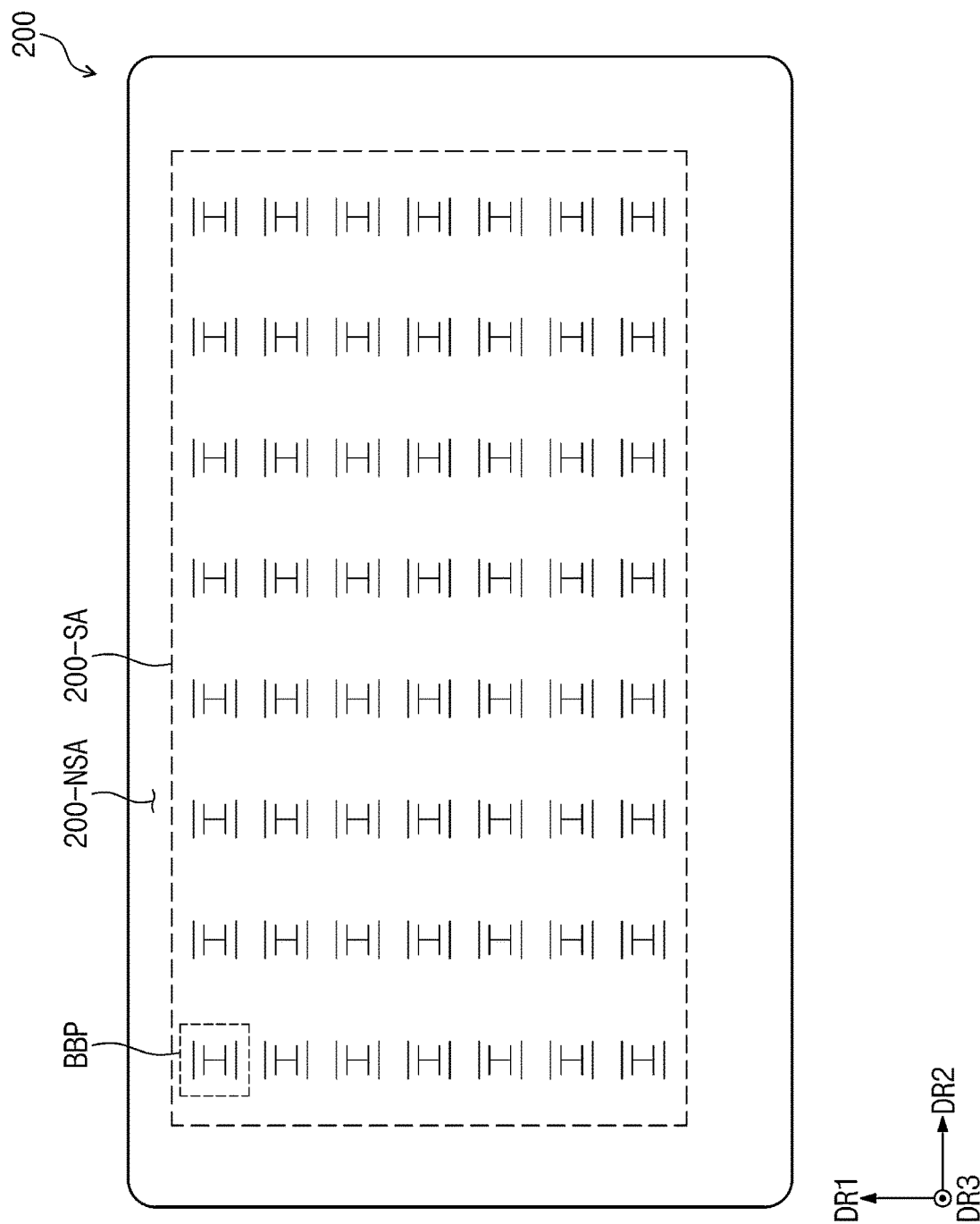
FIG. 9C is a plan view of the input sensor including some configurations according to an embodiment of the present inventive concept.

FIG. 9C is a plan view of the input sensor according to an embodiment. In FIG. 9C, only an arrangement of the bridge groups BBP is briefly illustrated. Referring to FIG. 9C, in the input sensor 200 according to an embodiment, the bridge groups BBP may be uniformly arranged throughout the sensing area 200-SA. In an embodiment, as described above, each of the bridge groups BBP may include at least one real bridge pattern and at least one dummy bridge pattern or may be provided as only a plurality of dummy bridge patterns.

The plurality of dummy bridge patterns may be provided to reduce external visibility caused by the real bridge patterns having different shapes and arrangement intervals. The display device according to an embodiment may include the bridge group BBP including different bridge patterns in the input sensor 200, and the plurality of bridge groups BBP may be distributed throughout the sensing area 200-SA and arranged to be spaced apart at a predetermined interval from each other so that visibility of a specific pattern is reduced to achieve excellent display quality.

Figure 10:
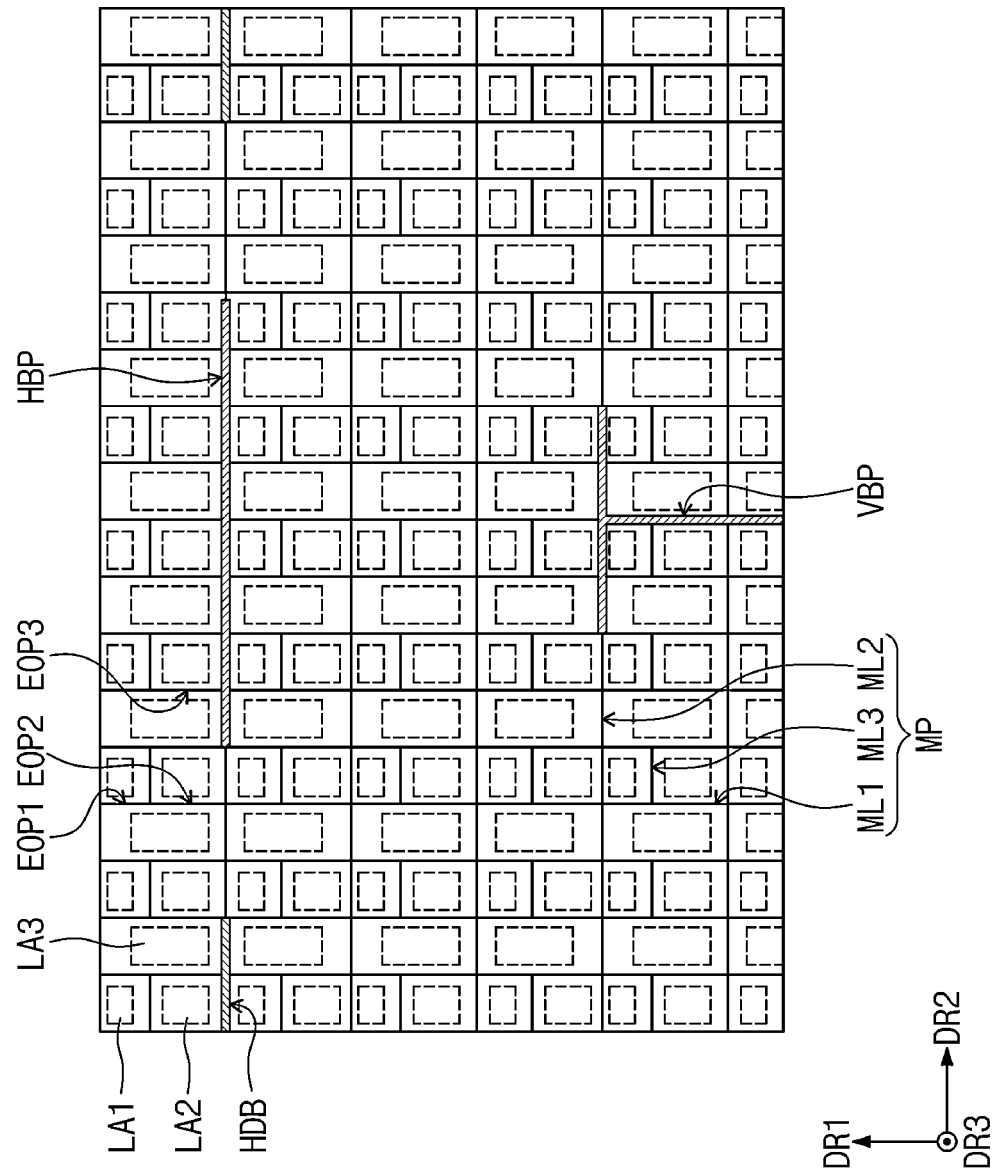
FIG. 10 is a schematic plan view illustrating a partial area of the display device according to an embodiment of the present inventive concept.

FIG. 10 is a schematic plan view illustrating a portion of the display device according to an embodiment. FIG. 10 briefly illustrates only the emission areas LA1, LA2, and LA3 of the display panel and some configurations of the input sensor for convenience of explanation. FIG. 10 illustrates an example of the display device having the arrangement of the emission areas LA1, LA2, and LA3 illustrated in FIG. 4A.

Referring to FIGS. 8, 9A, and 10, the input sensor includes a plurality of sensing patterns SP1-a, SP1-b, SP2-a, SP2-b, and HSP, and each of the sensing patterns may include a mesh pattern MP. The mesh pattern MP may include a plurality of mesh lines ML1, ML2, and ML3 defining a plurality of opening areas EOP1, EOP2, and EOP3.

In an embodiment, the mesh lines may include a first mesh line ML1 extending longitudinally in the first direction DR1 and a second mesh line ML2 extending longitudinally in the second direction DR2. In addition, the plurality of mesh patterns may further include a third mesh line ML3 extending longitudinally in the second direction DR2. In an embodiment, the third mesh line ML3 may be disposed between two adjacent second mesh lines ML2 (e.g., in the first direction DR1). The third mesh line ML3 may be disposed between the first emission area LA1 (see FIG. 4A) and the second emission area LA2 (see FIG. 4A) in the first direction DR1. In an embodiment, the first mesh line ML1, the second mesh line ML2, and the third mesh line ML3 may be connected to each other and have an integrated shape.

In an embodiment, each of the first mesh lines ML1 may extend in the first direction DR1, and the first mesh lines ML1 may be arranged to be spaced apart from each other in the second direction DR2. Each of the second mesh lines ML2 may extend in the second direction DR2, and the second mesh lines ML2 may be arranged to be spaced apart from each other in the first direction DR1. The second mesh lines ML2 may cross the first mesh lines ML1 on the plane and may have an integrated shape. In addition, each of the third mesh lines ML3 may extend in the second direction DR2, and the third mesh lines ML3 may be arranged in the first direction DR1 and the second direction DR2. The third mesh lines ML3 and the second mesh lines ML2 may be alternately disposed in the first direction DR1.

In an embodiment, the mesh pattern MP may include first to third opening areas EOP1, EOP2, and EOP3 defined by first to third mesh lines ML1, ML2, and ML3. In an embodiment illustrated in FIG. 10, each of the first opening area EOP1 and the second opening area EOP2 may be defined by being surrounded by the first to third mesh lines ML1, ML2, and ML3, and the third opening area EOP3 may be defined by being surrounded by the first mesh line ML1 and the second mesh line ML2. The areas in which the first to third opening areas EOP1, EOP2, and EOP3 are defined may be areas that overlap the first to third emission areas LA1, LA2, and LA3 (see FIG. 4A), respectively (e.g., in a plan view).

In an embodiment, the first to third opening areas EOP1, EOP2, and EOP3 may have different surface areas on the plane from each other. However, embodiments of the present inventive concept are not necessarily limited thereto, and the surface areas of the first to third opening areas EOP1, EOP2, and EOP3 on the plane may be changed variously in consideration of the surface areas and shapes of the emission areas LA1, LA2, and LA3.

In addition, embodiments of the present inventive concept are not necessarily limited to the shape of the mesh pattern MP illustrated in FIG. 10. For example, in some embodiments the arrangements and shapes of the first to third mesh lines ML1, ML2, and ML3 and the first to third opening areas EOP1, EOP2, and EOP3 within the mesh pattern MP may be variously changed, such as according to the arrangements and shapes of the pixel PX (see FIG. 3) of the display panel 100 (see FIG. 3).

The first to third mesh lines ML1, ML2, and ML3 may be conductive patterns. In an embodiment, the first to third mesh lines ML1, ML2, and ML3 constituting the sensing pattern may be portions corresponding to the second conductive layer 240 (see FIG. 5). In an embodiment, the bridge patterns HBP, VBP, and HDB may be disposed to overlap the mesh lines ML1, ML2, and ML3 (e.g., in a plan view). In FIG. 10, only some of the first bridge VBP, the second bridge HBP, and the second dummy bridge HDB is illustrated, but the bridge patterns constituting the bridge group BBP described with reference to FIGS. 8 to 9C, etc. may be disposed to overlap the mesh lines ML1, ML2, and ML3.

Hereinafter, the input sensor according to an embodiment will be described with reference to FIGS. 11A to 19B. In the description of FIGS. 11A to 19B, etc., contents that overlap the content explained with reference to FIGS. 1 to 10, etc. may not be described again, and the differences will be mainly explained for economy of explanation.

Figure 11A:
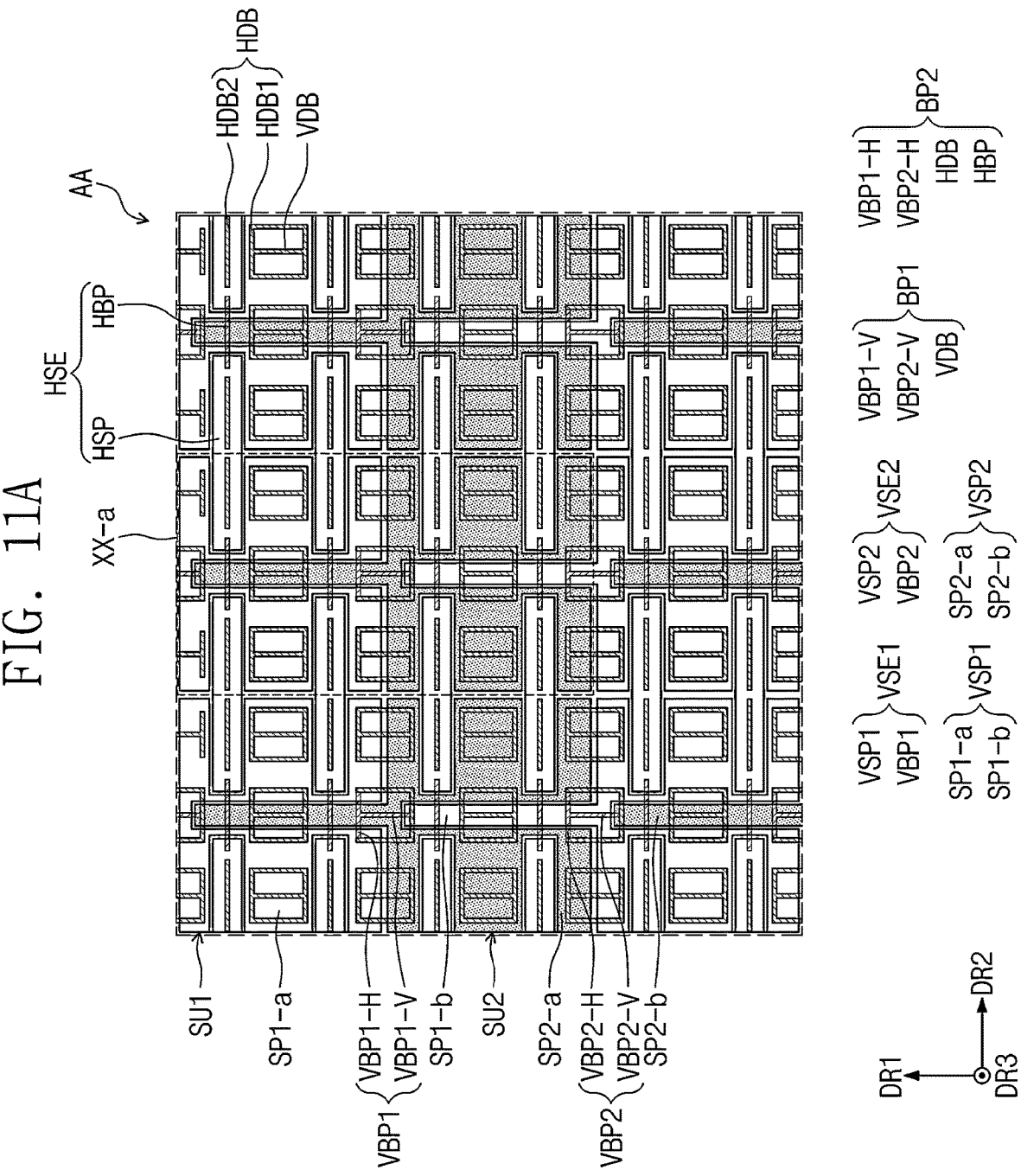
FIG. 11A is an enlarged plan view illustrating a portion of the input sensor according to an embodiment of the present inventive concept.
Figure 11B:
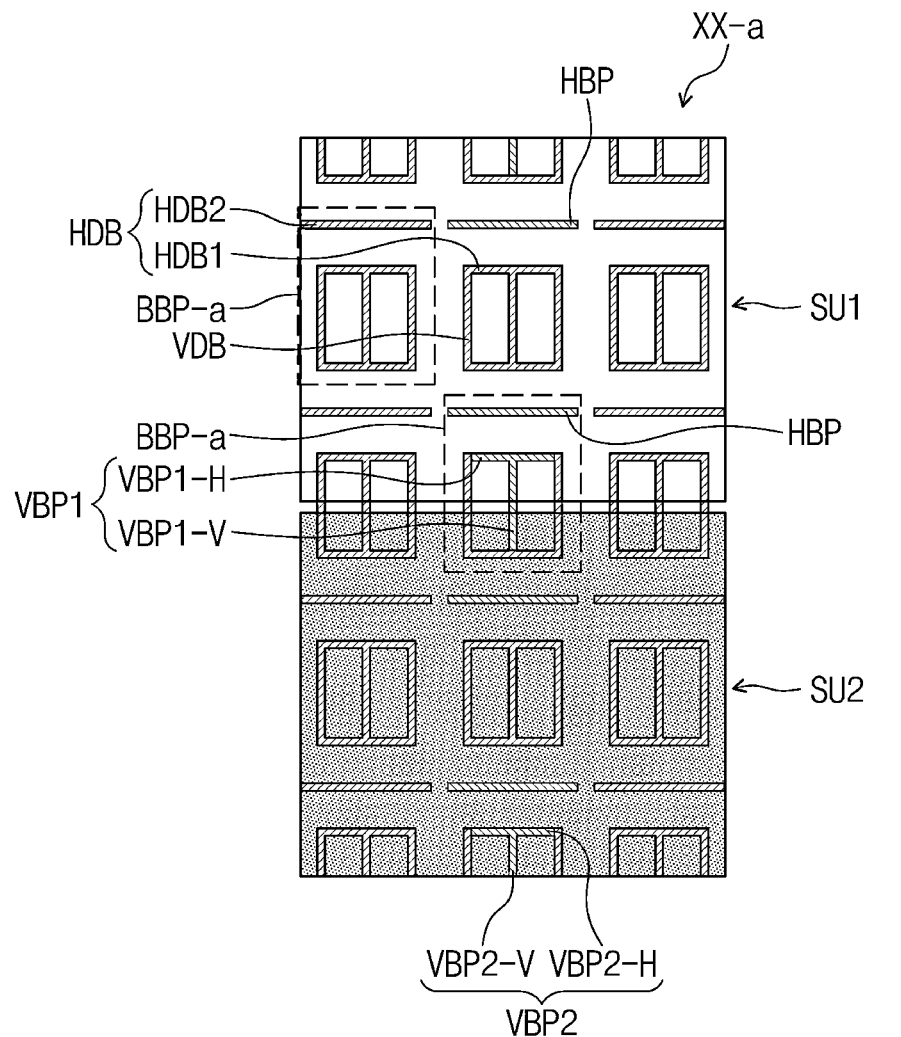
FIG. 11B is an enlarged plan view illustrating some configurations of the input sensor according to an embodiment of the present inventive concept.
Figure 12A:
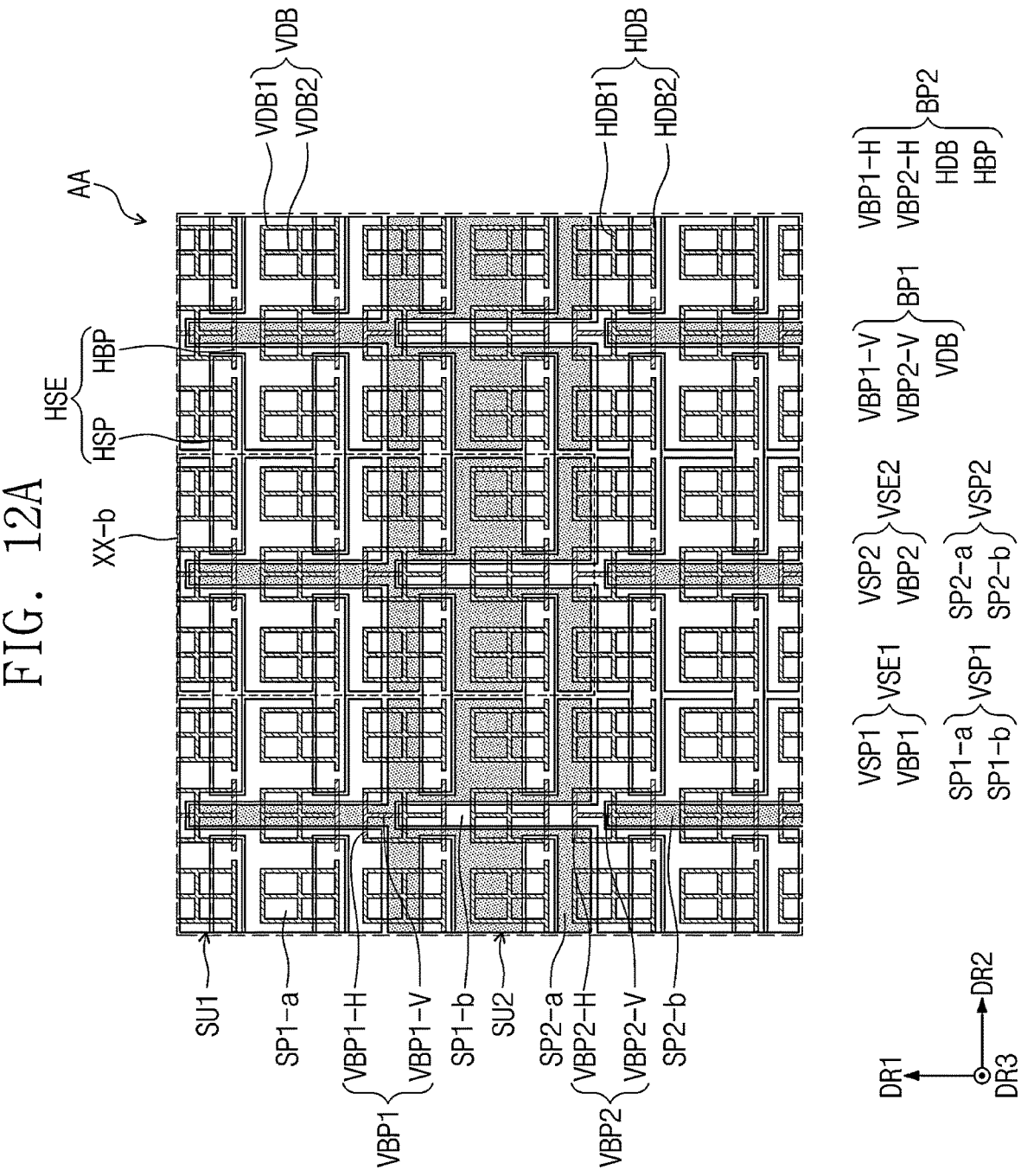
FIG. 12A is an enlarged plan view illustrating a portion of the input sensor according to an embodiment of the present inventive concept.
Figure 12B:
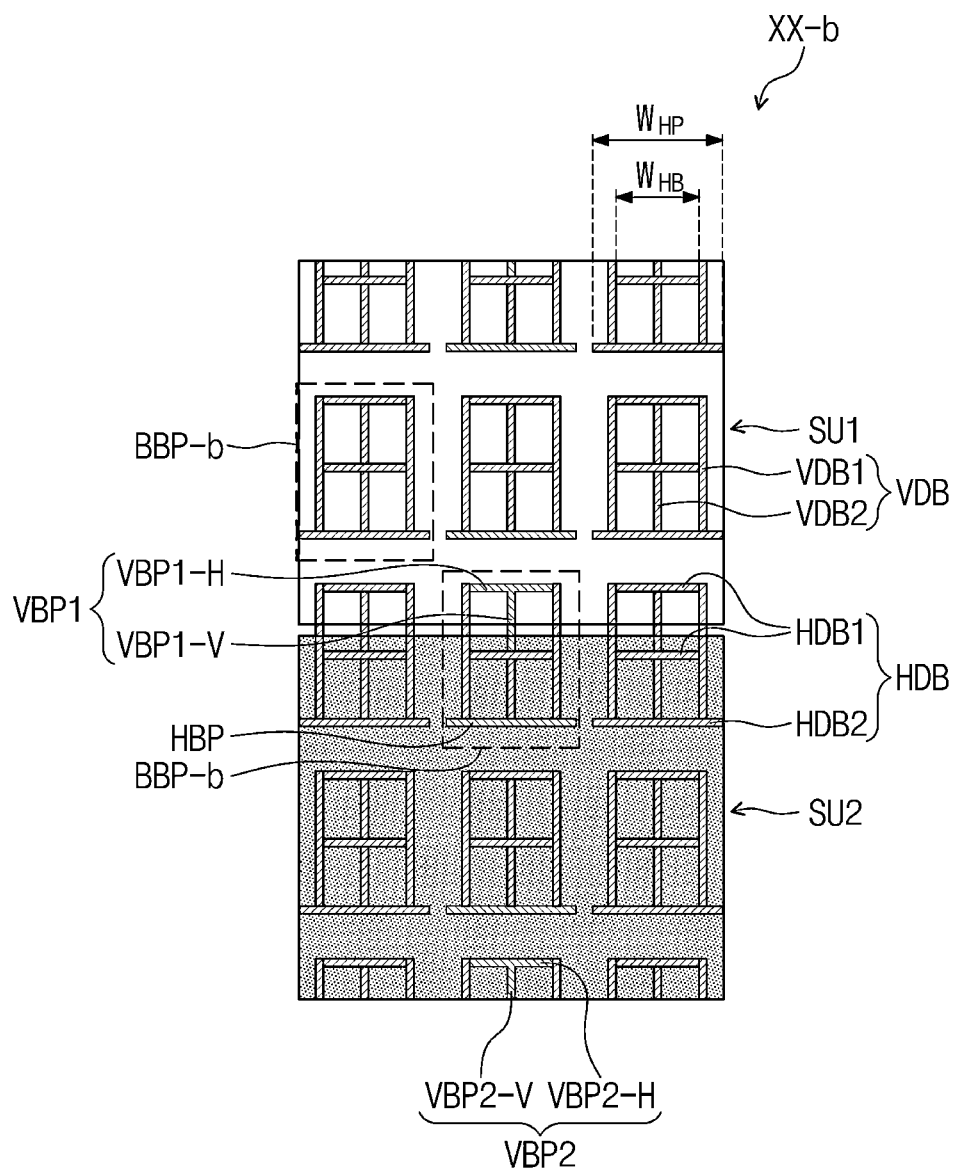
FIG. 12B is an enlarged plan view illustrating some configurations of the input sensor according to an embodiment of the present inventive concept.

In the drawings described below, FIGS. 11A to 12B correspond to an embodiment including the sensing electrode having the type illustrated in FIG. 8. FIGS. 11A and 12A illustrate a portion corresponding to area AA of FIG. 6. FIGS. 11A and 12A further illustrate additional bridge patterns in addition to the real bridge pattern illustrated in FIG. 8. The bridge patterns additionally illustrated in FIGS. 11A and 12A compared FIG. 8 may be dummy bridge patterns that are electrically floated and insulated from the sensing electrodes VSE1, VSE2, and HSE. In FIG. 11B, some components in FIG. 11A are omitted, and only the bridge patterns in the XX-a area are illustrated. In FIG. 12B, some components in FIG. 12A are omitted, and only the bridge patterns in the XX-b area are illustrated to be reflected.

In an embodiment, each of the plurality of bridge groups BBP-a and BBP-b illustrated in FIGS. 11A to 12B may include at least one first bridge pattern BP1 having a bar shape extending longitudinally in the first direction DR1, and at least one second bridge pattern BP2 having a bar shape extending longitudinally in the second direction DR2.

Referring to FIGS. 11A and 11B, in an embodiment, the first bridge pattern BP1 may be the first portions VBP1-V and VBP2-V of the first bridges VBP1 and VBP2 or the first dummy bridge VDB insulated (e.g., electrically insulated or floated) from the first to third sensing patterns. In addition, the second bridge pattern BP2 may be the second bridge HBP, the second portions VBP1-H and VBP2-H of the first bridges VBP1 and VBP2, or the second dummy bridge HDB insulated (e.g., electrically insulated or floated) from the first to third sensing patterns. The second dummy bridge HDB may include a second-1 dummy bridge HDB1 and a second-2 dummy bridge HDB2, which have different lengths in the second direction DR2 from each other.

In an embodiment illustrated in FIGS. 11A and 11B, one bridge group BBP-a may be constituted by three first bridge patterns BP1 and three second bridge patterns BP2. For example, in an embodiment, one bridge group BBP-a may be constituted by three first bridge patterns BP1 having the same length as each other and two types of second bridge patterns BP2 having different lengths in the second direction DR2.

In the three first bridge patterns BP1, second bridge patterns BP2 spaced apart from each other in the first direction DR1 and disposed on one end and the other end (e.g., first and second ends) of the first bridge patterns BP1, respectively, and a different type of second bridge pattern BP2 spaced apart from the second bridge pattern BP2 disposed on one end of the first bridge pattern BP1 may constitute one bridge group BBP-a. In an embodiment illustrated in FIGS. 11A and 11B, at least one of the bridge groups BBP-a may be constituted by two second-1 dummy bridges HDB1, three first dummy bridges VDB disposed between the second-1 dummy bridges HDB1 (e.g., in the first direction DR1), and a second-2 dummy bridge HDB2 spaced apart from the first dummy bridge VDB (e.g., in the first direction DR1). In addition, in an embodiment at least one of the bridge groups BBP-a may be constituted by one first bridge VBP1 or VBP2, one second-1 dummy bridge HDB1, one second bridge HBP, and two first dummy bridges VDB, or at least one of the bridge groups BBP-a may be constituted by two second-1 dummy bridges HDB1, three first dummy bridges VDB disposed between the second-1 dummy bridges HDB1 (e.g., in the first direction DR1), and a second bridge HBP spaced apart from the first dummy bridge VDB (e.g., in the first direction DR1).

Referring to FIGS. 12A and 12B, in an embodiment, the first bridge pattern BP1 may be the first portions VBP1-V and VBP2-V of the first bridges VBP1 and VBP2 or the first dummy bridge VDB insulated (e.g., electrically insulated or floated) from the first to third sensing patterns. In addition, the second bridge pattern BP2 may be the second bridge HBP, the second portions VBP1-H and VBP2-H of the first bridges VBP1 and VBP2, or the second dummy bridge HDB insulated (e.g., electrically insulated or floated) from the first to third sensing patterns. In an embodiment, the first dummy bridge VDB may include a first-1 dummy bridge VDB1 and a first-2 dummy bridge VDB2, which have different lengths in the first direction DR1 from each other. At least one of the first-1 dummy bridge VDB1 and the first-2 dummy bridge VDB2 may be referred to as a third dummy bridge. In addition, the second dummy bridge HDB may include a second-1 dummy bridge HDB1 and a second-2 dummy bridge HDB2, which have different lengths in the second direction DR2 from each other. At least one of the second-1 dummy bridge HDB1 and the second-2 dummy bridge HDB2 may be referred to as a fourth dummy bridge.

In an embodiment, a length $W_{HB}$ of the second-1 dummy bridge HDB1 in the second direction DR2 may be less than a length $W_{HP}$ of the second-2 dummy bridge HDB2 in the second direction DR2. In an embodiment, the length $W_{HB}$ of the second-1 dummy bridge HDB1 in the second direction DR2 may correspond to the second portions VBP1-H and VBP2-H of the first bridge, and the length $W_{HP}$ of the second-2 dummy bridge HDB2 in the second direction DR2 may correspond to the length of the second bridge HBP. In an embodiment, the length of the first-2 dummy bridge VDB2 in the first direction DR1 may correspond to the first portions VBP1-V and VBP2-V of the first bridge.

In an embodiment illustrated in FIGS. 12A and 12B, one bridge group BBP-b may be constituted by four first bridge patterns BP1 and three second bridge patterns BP2. For example, in an embodiment, one bridge group BBP-b may be constituted by two or more types of first bridge patterns BP1 having different lengths from each other and two or more types of second bridge patterns BP2 having different lengths from each other.

In an embodiment illustrated in FIGS. 12A and 12B, at least one of the bridge groups BBP-b may be constituted by two second-1 dummy bridges HDB1, two first-1 dummy bridges VDB1, two first-2 dummy bridges VDB2, and one second-2 dummy bridge HDB2. In addition, at least one of the bridge groups BBP-b may be constituted by one first bridge VBP1 or VBP2, one second-1 dummy bridge HDB1, one second bridge HBP, two first-1 dummy bridge VDB1, and one first-2 dummy bridge VDB2, or at least one of the bridge group BBP-b may be constituted by two second-1 dummy bridges HDB1, two first-1 dummy bridges VDB1, two first-2 dummy bridges VDB2, and one second bridge HBP.

The configuration of the bridge groups BBP, BBP-a, and BBP-b illustrated in FIGS. 9A, 11A, 12A, etc. is an example that may be applied in an embodiment in which the sensing electrodes has the configuration of the sensing electrode illustrated in FIG. 8. In the input sensor according to an embodiment having the configuration of the sensing electrode illustrated in FIG. 8, the bridge groups may include at least one first bridge pattern BP1 having a shape extending longitudinally in the first direction DR1 and at least one second bridge pattern BP2 having a shape extending longitudinally in the second direction DR2 in addition to the form shown in FIGS. 9A, 11A, 12A, etc., and may be applied without limitation as long as the bridge groups are distributed and arranged throughout the sensing area.

Figure 13:
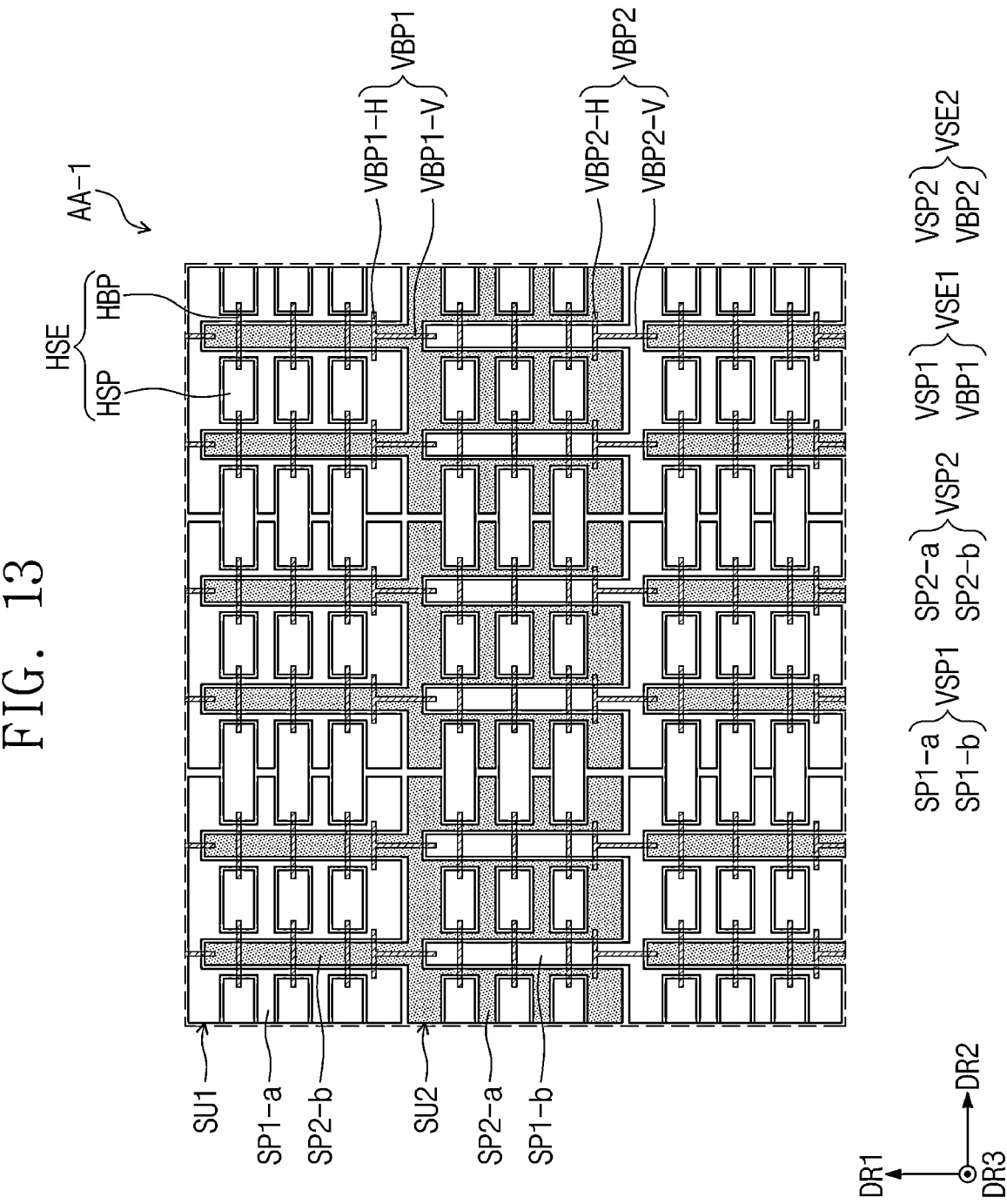
FIG. 13 is an enlarged plan view illustrating a portion of the input sensor according to an embodiment of the present inventive concept.
Figure 14A:
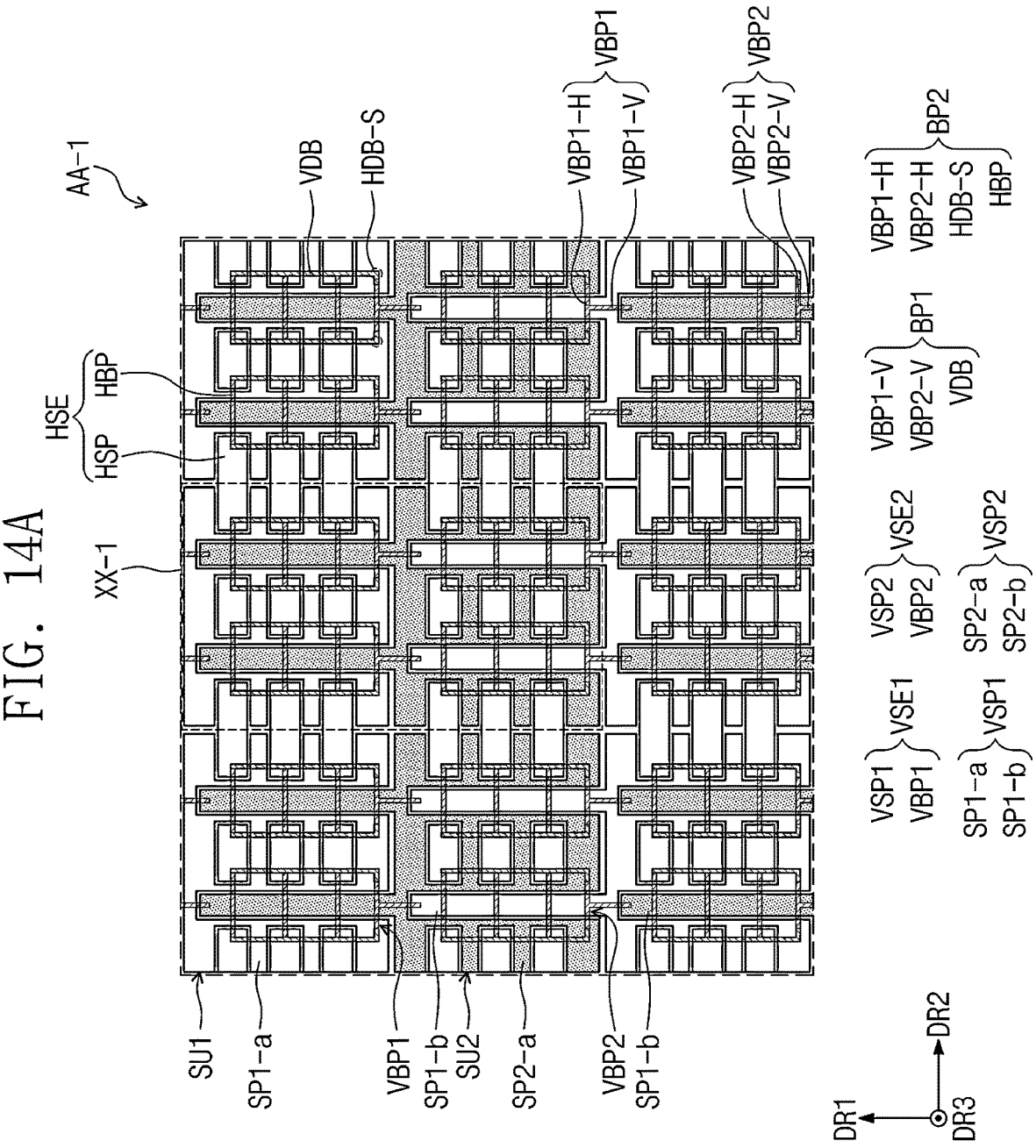
FIG. 14A is an enlarged plan view illustrating a portion of the input sensor according to an embodiment of the present inventive concept.
Figure 14B:
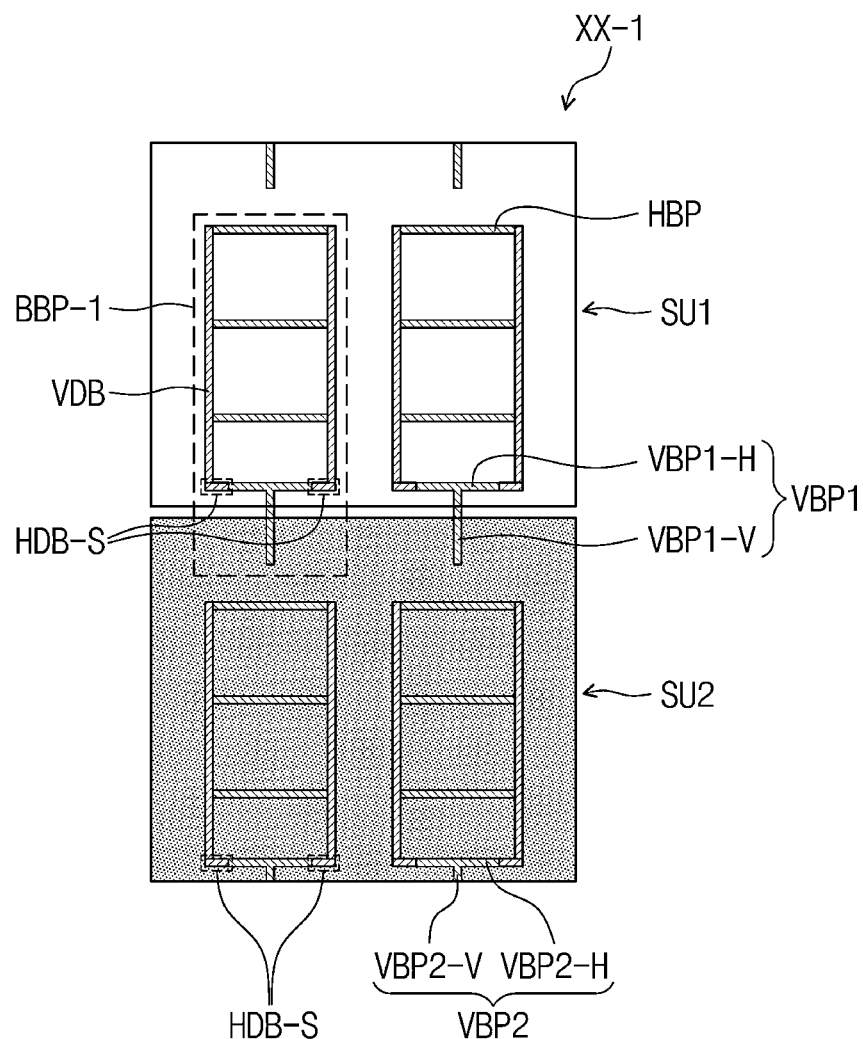
FIG. 14B is an enlarged plan view illustrating some configurations of the input sensor according to an embodiment of the present inventive concept.
Figure 15A:
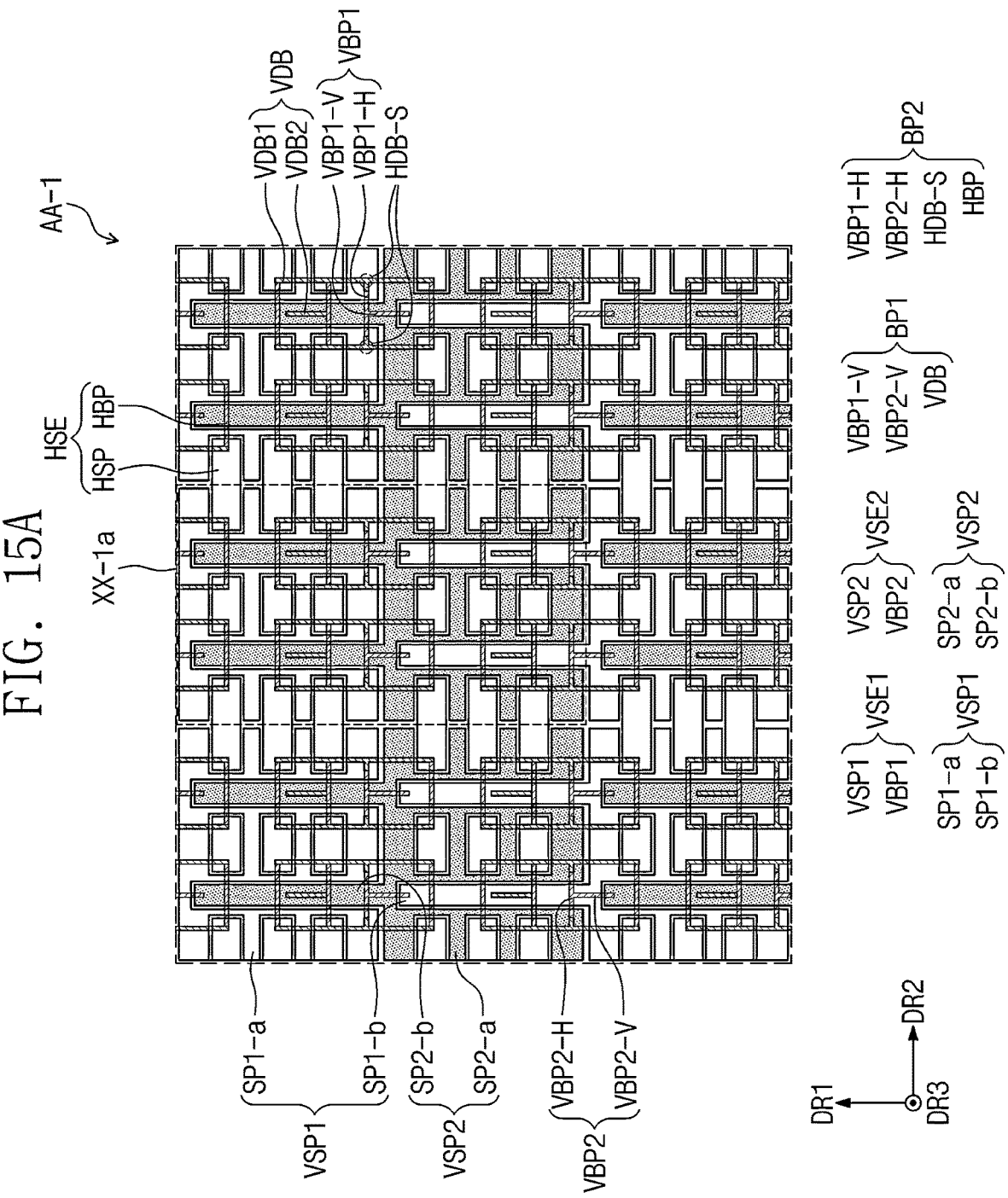
FIG. 15A is an enlarged plan view illustrating a portion of the input sensor according to an embodiment of the present inventive concept.
Figure 15B:
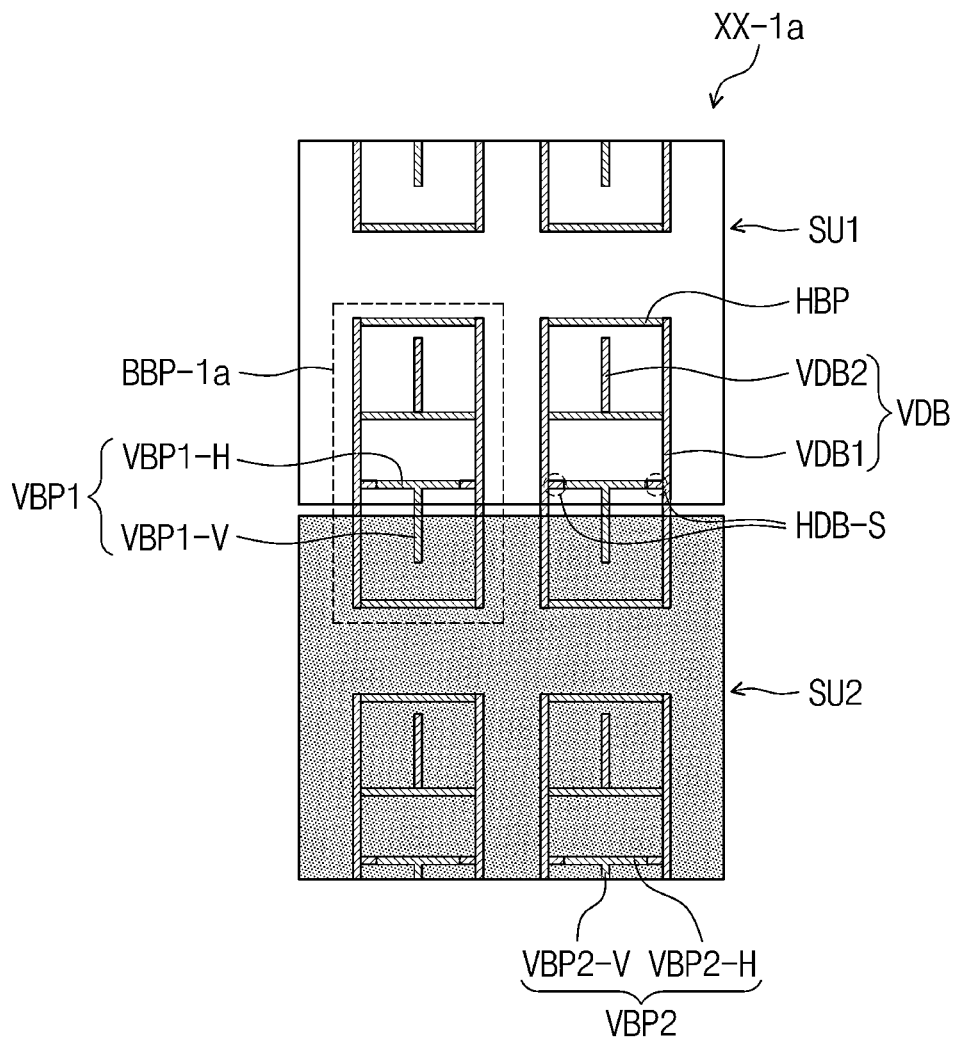
FIG. 15B is an enlarged plan view illustrating some configurations of the input sensor according to an embodiment of the present inventive concept.

FIGS. 13 and 14A are plan views illustrating a portion of the input sensor according to an embodiment. FIGS. 13, 14A, 15A, and 16A illustrate an area AA-1 corresponding to the area AA of FIG. 6. In FIG. 13, compared to FIGS. 14A, 15A, and 16A, a portion of the bridge pattern is omitted. FIG. 14B is an enlarged plan view illustrating some configurations of the input sensor according to an embodiment, FIG. 15B is an enlarged plan view illustrating some configurations of the input sensor according to an embodiment, and FIG. 16B is an enlarged plan view illustrating some configurations of the input sensor according to an embodiment.

Referring to FIGS. 6 and 13, the input sensor 200 may include a first sensing unit SU1 and a second sensing unit SU2. The first sensing unit SU1 and the second sensing unit SU2 may include first sensing patterns SP1-*a* and SP2-*a*, second sensing patterns SP1-*b* and SP2-*b*, and a third sensing pattern HSP, respectively. FIG. 13 illustrates an example in which there is a difference in number of second sensing patterns SP1-*b* and SP2-*b* and third sensing patterns HSP included in each sensing units SU1 and SU2 compared to an embodiment illustrated in FIG. 8.

In an embodiment illustrated in FIG. 13, one unit sensing unit SU1 and SU2 may include one first sensing pattern SP1-*a* and SP2-*a*, two second sensing patterns SP1-*b* and SP2-*b*, and a plurality of third sensing patterns HSP disposed with the two second sensing patterns SP1-*b* and SP2-*b* therebetween (e.g., in the second direction DR2). In an embodiment, each group of third sensing patterns HSP spaced apart from each other with the second sensing patterns SP1-*b* and SP2-*b* therebetween may include three sensing patterns HSP spaced apart from each other in the first direction DR1. However, embodiments of the present inventive concept are not necessarily limited thereto.

Two first bridges VBP1 and VBP2 may be disposed between the first and second sensing units SU1 and SU2 that are adjacent to each other in the first direction DR1. Each of the two first bridges VBP1 and VBP2 may overlap a plurality of second bridges HBP included in one sensing unit SU1 or SU2 in the first direction DR1. In an embodiment, three second bridges HBP may be disposed between two first bridges VBP1 and VBP2 adjacent to each other in the first direction DR1.

In an embodiment, the first bridges VBP1 and VBP2 may include first portions VBP1-V and VBP2-V having shapes extending longitudinally in the first direction DR1 and second portions VBP1-H and VBP2-H connected to the first portions VBP1-V and VBP2-V and integrated with the first portions VBP1-V and VBP2-V. Each of the second portions VBP1-H and VBP2-H may have a shape extending longitudinally in the second direction DR2.

In an embodiment, the second bridge HBP may have a bar shape extending in the second direction DR2. In an embodiment, the first bridge VBP1 and VBP2 constituted by the first portions VBP1-V and VBP2-V and the second portions VBP1-H and VBP2-H and the bar-shaped second bridge HBP may have different shapes from each other on the plane. In addition, the first bridges VBP1 and VBP2 and the second bridge HBP may be arranged at different intervals in the first direction DR1.

In FIG. 13, each of the first sensing electrodes VSE1 and the second sensing electrodes VSE2 may correspond to a column electrode extending in the first direction DR1, and the third sensing electrodes HSE may correspond to row electrodes extending in the second direction DR2.

In an embodiment illustrated in FIG. 13, each of the first sensing electrodes VSE1 may include a first sensing part VSP1 and a first-1 bridge VBP1 connecting the first sensing parts VSP1 to each other. In an embodiment, the first sensing part VSP1 may include a first sensing pattern SP1-*a* and a second sensing pattern SP1-*b*. In addition, each of the second sensing electrodes VSE2 may include a second sensing part VSP2 and a second-1 bridge VBP2 connecting the second sensing parts VSP2 to each other. In an embodiment, the second sensing part VSP2 may include a first sensing pattern SP2-*a* and a second sensing pattern SP2-*b*. The third sensing electrodes HSE may include a third sensing pattern HSP and a second bridge HBP connecting the third sensing patterns HSP to each other.

Figure 16A:
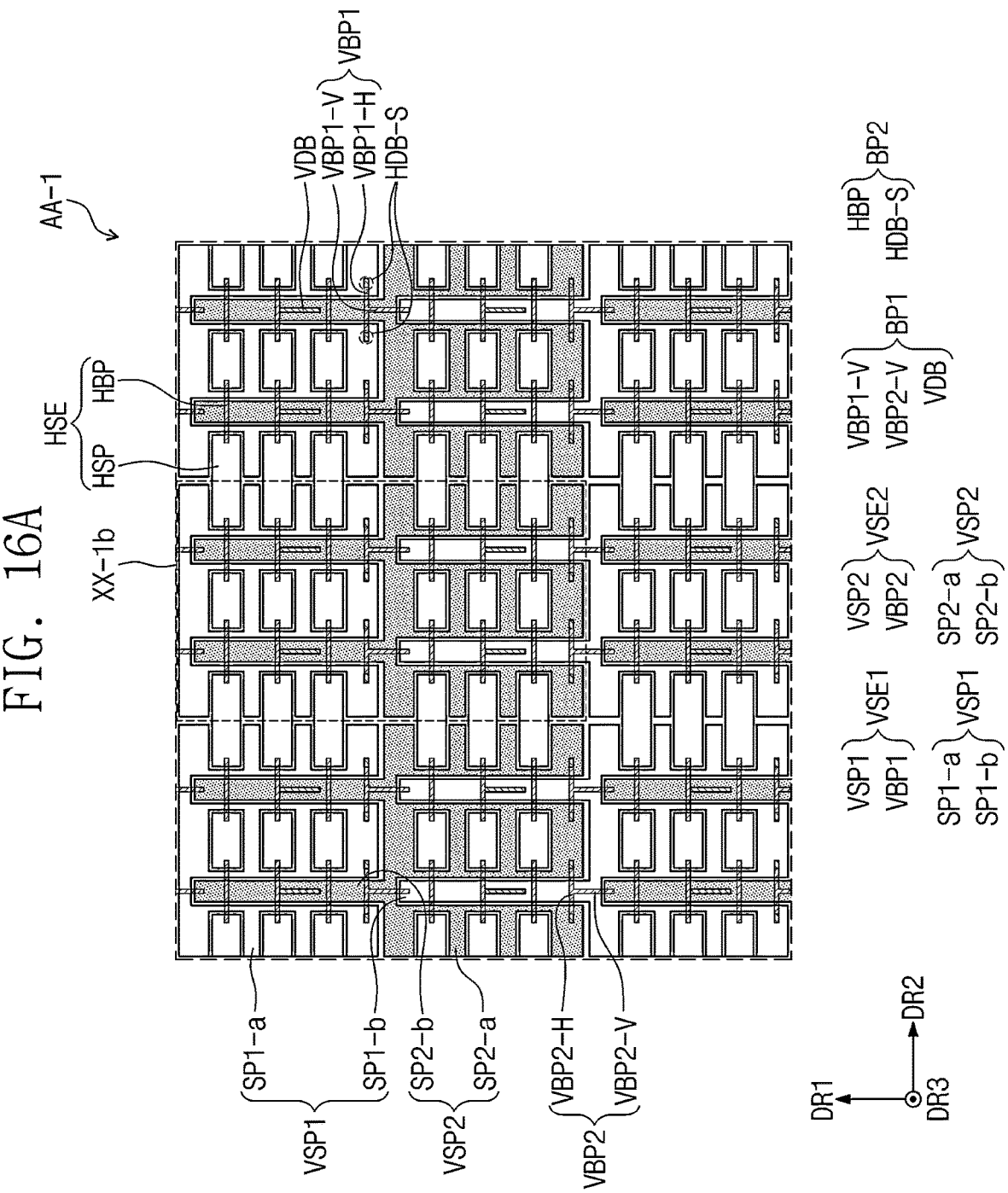
FIG. 16A is an enlarged plan view illustrating a portion of the input sensor according to an embodiment of the present inventive concept.
Figure 16B:
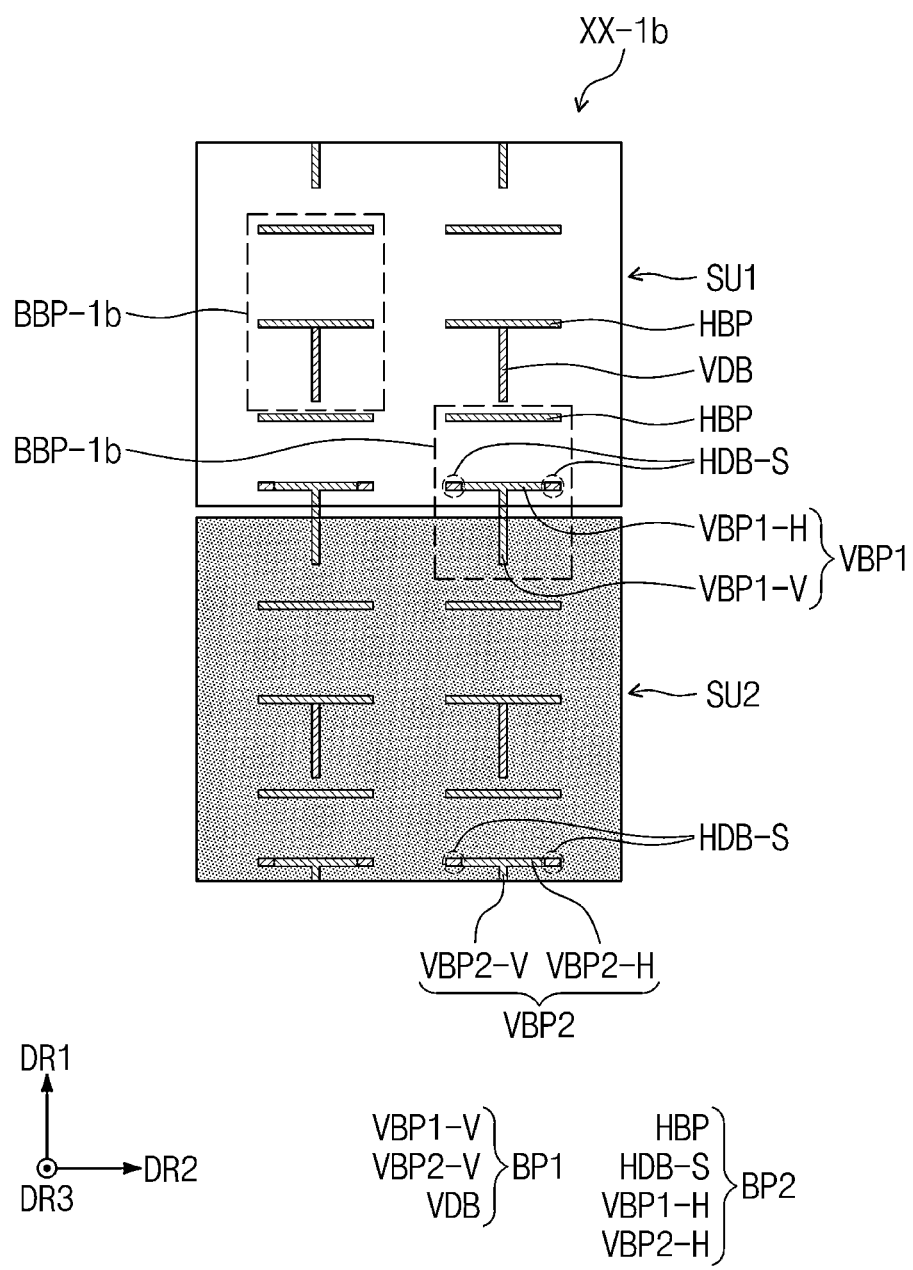
FIG. 16B is an enlarged plan view illustrating some configurations of the input sensor according to an embodiment of the present inventive concept.

In FIGS. 14A, 15B, and 16C, additional bridge patterns are illustrated in FIG. 13. The bridge patterns additionally illustrated in FIGS. 14A, 15A, and 16A compared to FIG. 13 may be dummy bridge patterns that are floated and insulated from the sensing electrodes VSE1, VSE2, and HSE. In FIG. 14B, some components in FIG. 14A are omitted, and only the bridge patterns in the XX-1 area are illustrated. In FIG. 15B, some components in FIG. 15A are omitted, and only the bridge patterns in the XX-1a area are illustrated. In FIG. 16B, some components in FIG. 16A are omitted, and only the bridge patterns in the XX-1*b* area are illustrated.

In an embodiment, each of the plurality of bridge groups BBP-1, BBP-la, and BBP-1*b* illustrated in FIGS. 14A to 16B may include at least one first bridge pattern BP1 having a bar shape extending longitudinally in the first direction DR1, and at least one second bridge pattern BP2 having a bar shape extending longitudinally in the second direction DR2.

Referring to FIGS. 14A and 14B, in an embodiment, the first bridge pattern BP1 may be the first portions VBP1-V and VBP2-V of the first bridges VBP1 and VBP2 or the first dummy bridge VDB insulated (e.g., electrically insulated or floated) from the first to third sensing patterns. In addition, the second bridge pattern BP2 may be the second bridge HBP, the second portions VBP1-H and VBP2-H of the first bridges VBP1 and VBP2, or the second dummy bridge HDB-S insulated (e.g., electrically insulated or floated) from the first to third sensing patterns. In an embodiment, the second dummy bridge HDB-S may be an edge dummy pattern extending longitudinally from the ends of the second portions VBP1-H and VBP2-H in the second direction DR2.

In an embodiment illustrated in FIGS. 14A and 14B, one bridge group BBP-1 may be constituted by three first bridge patterns BP1 and five second bridge patterns BP2. For example, in an embodiment, one bridge group BBP-1 may be constituted by two different types of first bridge patterns BP1 having different lengths from each other in the first direction DR1 and three types of second bridge patterns BP2 having different lengths in the second direction DR2.

In an embodiment, one bridge group BBP-1 may be constituted by first portions VBP1-V and VBP2-V of the first bridge, second portions VBP1-H and VBP2-H of the first bridge, a second dummy bridge HDB-S connected to (e.g., directly connected thereto) both ends of the second portions VBP1-H and VBP2-H, and three second bridges HBP arranged to be spaced apart from each other in the first direction DR1. The plurality of bridge groups BBP-1 may be uniformly distributed and arranged throughout the sensing area.

Referring to FIGS. 15A and 15B, in an embodiment, the first bridge pattern BP1 may be the first portions VBP1-V and VBP2-V of the first bridges VBP1 and VBP2 or the first dummy bridge VDB insulated (e.g., electrically insulated or floated) from the first to third sensing patterns. In addition, in an embodiment the second bridge pattern BP2 may be the second bridge HBP, the second portions VBP1-H and VBP2-H of the first bridges VBP1 and VBP2, or the second dummy bridge HDB-S insulated (e.g., electrically insulated or floated) from the first to third sensing patterns. In an embodiment, the first dummy bridge VDB may include a first-1 dummy bridge VDB1 and a first-2 dummy bridge VDB2, which have different lengths in the first direction DR1 from each other. At least one of the first-1 dummy bridge VDB1 and the first-2 dummy bridge VDB2 may be referred to as a third dummy bridge. The second dummy bridge HDB-S may be an edge dummy pattern extending from the ends of the second portions VBP1-H and VBP2-H in the second direction DR2. The second dummy bridge HDB-S may also be referred to as a fourth dummy bridge.

In an embodiment illustrated in FIGS. 15A and 15B, one bridge group BBP-la may be constituted by four first bridge patterns BP1 and five second bridge patterns BP2. For example, in an embodiment, one bridge group BBP-la may be constituted by three types of first bridge patterns BP1, which are distinguished from each other, and three types of second bridge patterns BP2 having different lengths from each other in the second direction DR2.

In an embodiment, one bridge group BBP-la may be constituted by first portions VBP1-V and VBP2-V of the first bridge, second portions VBP1-H, VBP2-H of the first bridge, a second dummy bridge HDB-S connected to (e.g., directly connected thereto) both ends of the second portions VBP1-H and VBP2-H, three second bridges HBP arranged to be spaced apart from each other in the first direction DR1, a first-1 dummy bridge VDB1 having a shape extending longitudinally in the first direction DR1 and spaced apart in the second direction DR2, and first-2 dummy bridge VDB2 disposed between first-1 dummy bridges VDB1 spaced apart in the second direction DR2. The plurality of bridge groups BBP-la may be uniformly distributed and arranged throughout the sensing area.

Referring to FIGS. 16A and 16B, in an embodiment, the first bridge pattern BP1 may be the first portions VBP1-V and VBP2-V of the first bridges VBP1 and VBP2 or the first dummy bridge VDB insulated from (e.g., electrically insulated or floated from) the first to third sensing patterns. In addition, in an embodiment the second bridge pattern BP2 may be the second bridge HBP, the second portions VBP1-H and VBP2-H of the first bridges VBP1 and VBP2, or the second dummy bridge HDB-S insulated from the first to third sensing patterns. In an embodiment, the second dummy bridge HDB-S may be an edge dummy pattern extending longitudinally from the ends of the second portions VBP1-H and VBP2-H in the second direction DR2.

In an embodiment illustrated in FIGS. 16A and 16B, one bridge group BBP-1b may be constituted by one first bridge pattern BP1 and two second bridge patterns BP2, or one bridge group BBP-1b may be constituted by one bridge pattern BP1 and three second bridge patterns BP2.

In an embodiment, at least one bridge group BBP-1b may be constituted by first portions VBP1-V and VBP2-V of the first bridge, second portions VBP1-H and VBP2-H of the first bridge, a second dummy bridge HDB-S connected to (e.g., directly connected thereto) both ends of the second portions VBP1-H and VBP2-H, and second bridges HBP arranged to be spaced apart from the second portions VBP1-H and VBP2-H in the first direction DR1. In addition, in an embodiment at least one bridge group BBP-1b may be constituted by a first dummy bridge VDB and two second bridges HBP arranged to be spaced apart from each other in the first direction DR1. In the bridge group BBP-1b, the sum of lengths of the second portions VBP1-H and VBP2-H of the first bridge and the second dummy bridges HDB-S respectively connected to (e.g., directly connected thereto) both ends of the second portions VBP1-H and VBP2-H in the second direction DR2 may be substantially equal to the length of the second bridge HBP in the second direction DR2. The plurality of bridge groups BBP-1b may be uniformly distributed and arranged throughout the sensing area.

The configuration of the bridge groups BBP-1, BBP-la, and BBP-1b illustrated in FIGS. 14A, 15A, 16A, etc. is an example that may be applied in an embodiment in which the sensing electrodes has the configuration of the sensing electrode illustrated in FIG. 13. In the input sensor according to an embodiment having the configuration of the sensing electrode illustrated in FIG. 13, the bridge groups may include at least one first bridge pattern BP1 having a shape extending longitudinally in the first direction DR1 and at least one second bridge pattern BP2 having a shape extending longitudinally in the second direction DR2 in addition to the form shown in FIGS. 14A, 15A, 16A, etc., and may be applied without limitation as long as the bridge groups are distributed and arranged throughout the sensing area.

Figure 17:
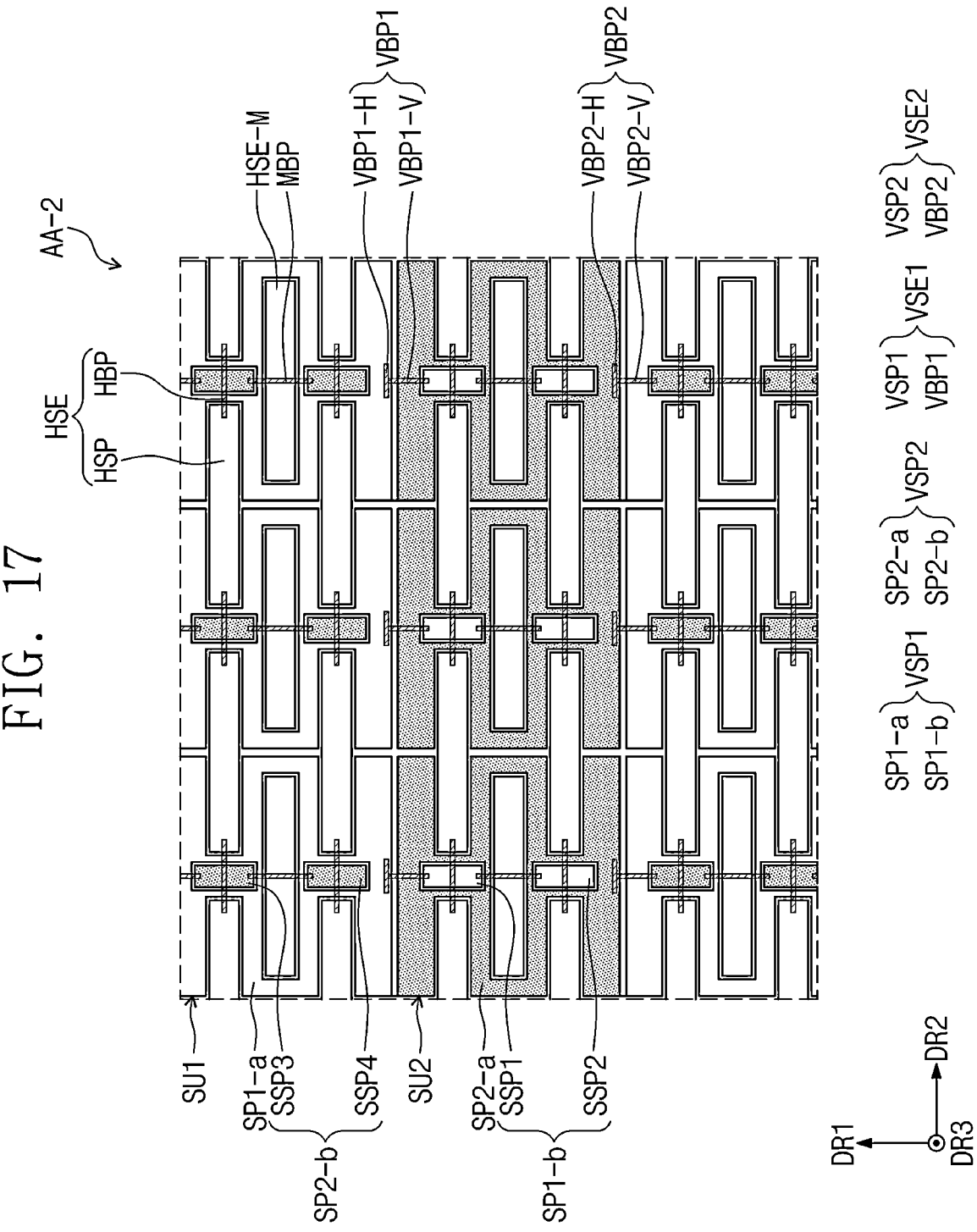
FIG. 17 is an enlarged plan view illustrating a portion of the input sensor according to an embodiment of the present inventive concept.
Figure 18A:
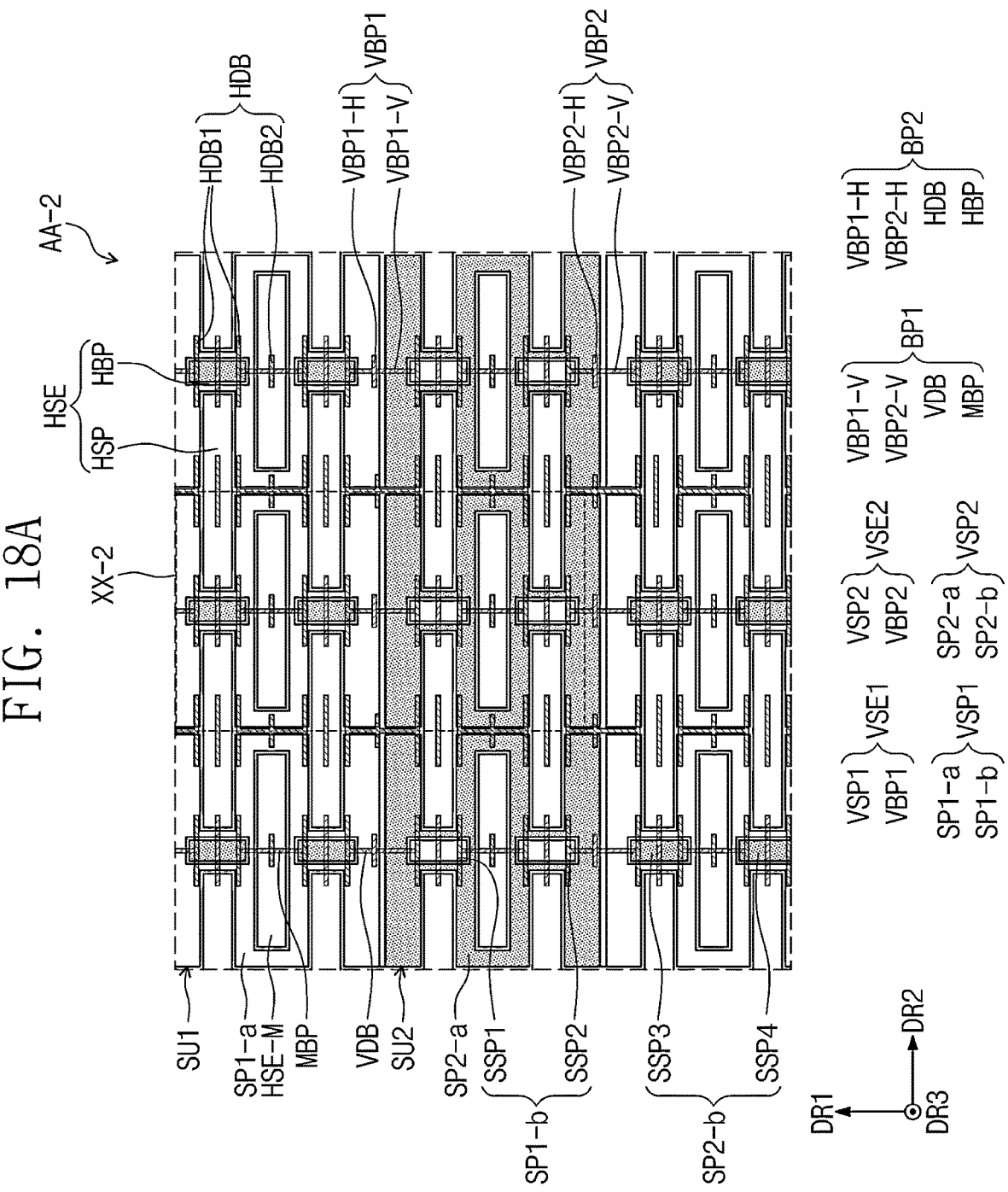
FIG. 18A is an enlarged plan view illustrating a portion of the input sensor according to an embodiment of the present inventive concept.
Figure 18B:
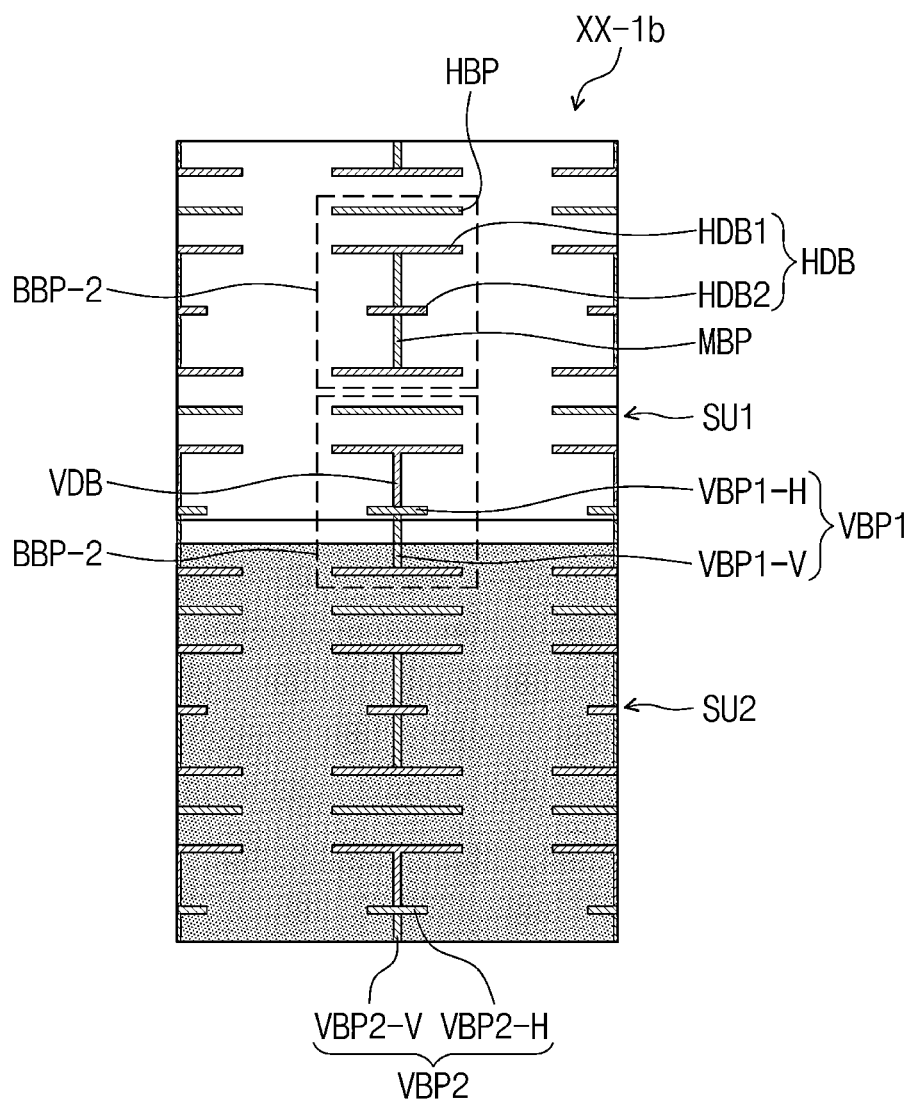
FIG. 18B is an enlarged plan view illustrating some configurations of the input sensor according to an embodiment of the present inventive concept.
Figure 19A:
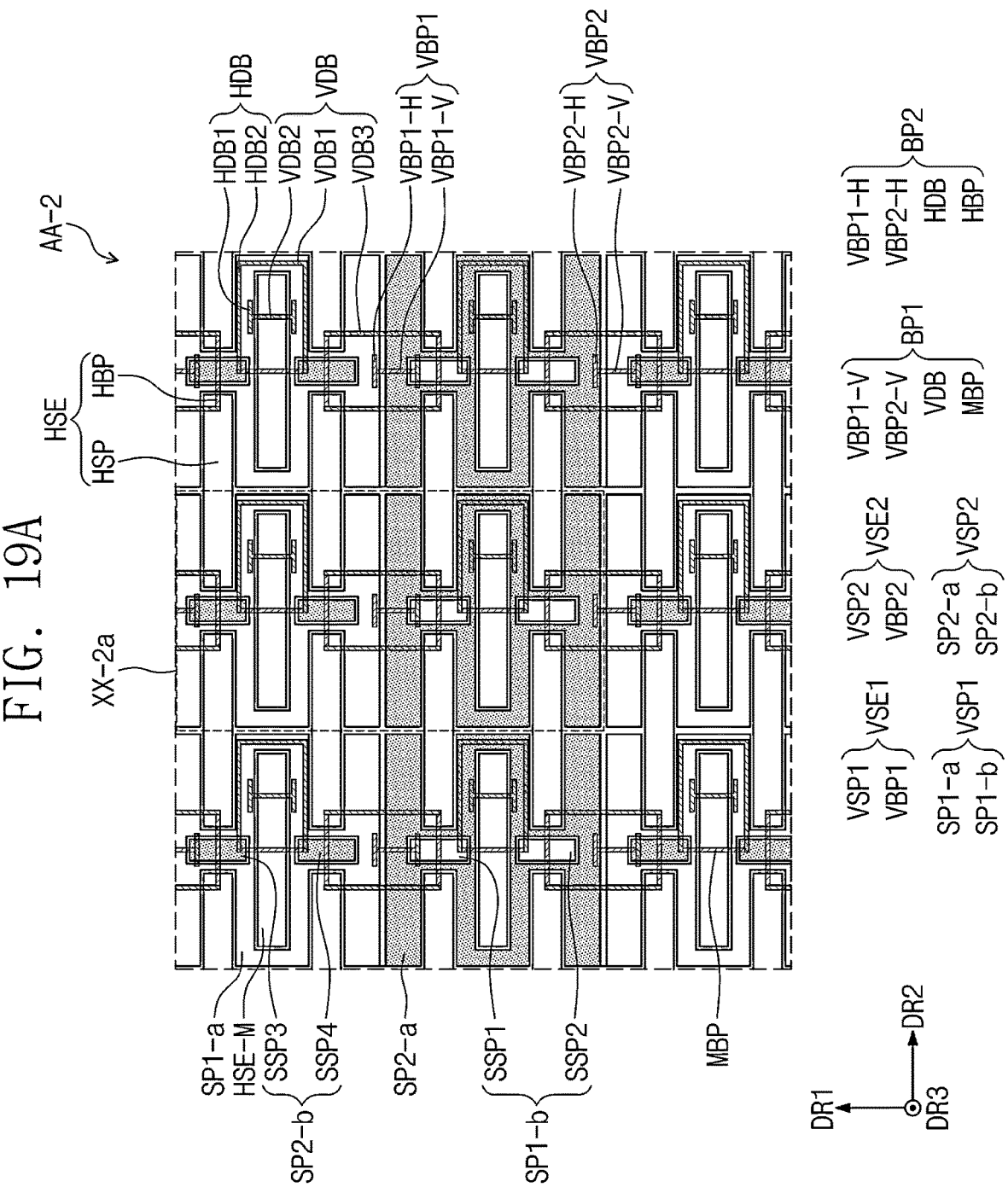
FIG. 19A is an enlarged plan view illustrating a portion of the input sensor according to an embodiment of the present inventive concept.
Figure 19B:
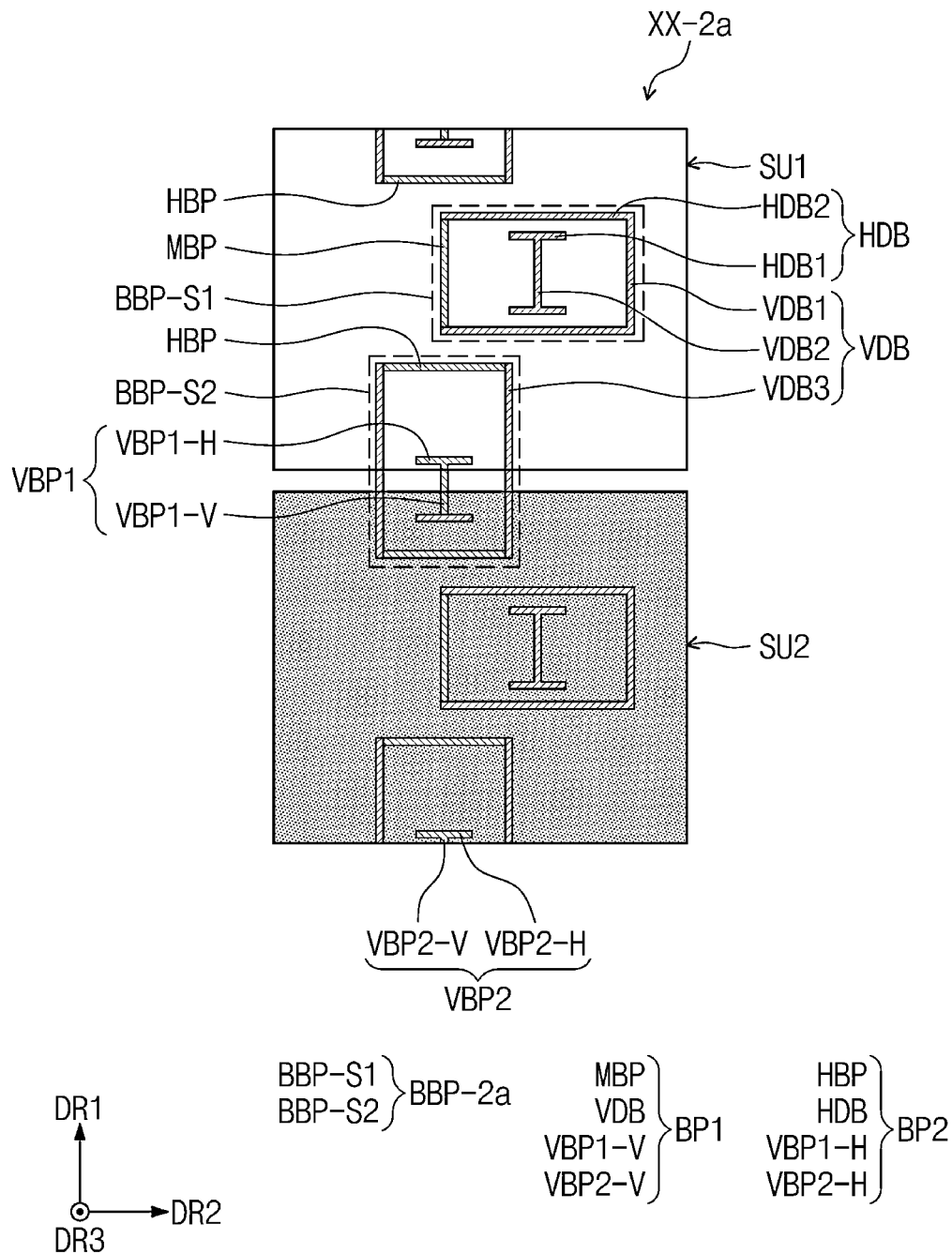
FIG. 19B is an enlarged plan view illustrating some configurations of the input sensor according to an embodiment of the present inventive concept.

FIGS. 17 and 19B are plan views illustrating a portion of the input sensor according to an embodiment. FIGS. 17, 18A, and 19A illustrate an area AA-2 corresponding to the area AA of FIG. 6. In FIG. 17, compared to FIGS. 18A and 19A, a portion of the bridge pattern is omitted. FIG. 18B is an enlarged view illustrating only some configurations of the input sensor in a partial area of FIG. 18A, and FIG. 19B is an enlarged view illustrating only some configurations of the input sensor in a partial area of FIG. 19A.

In FIGS. 18A and 19A, additional bridge patterns are illustrated in FIG. 17. The bridge patterns additionally illustrated in FIGS. 18A and 19A compared FIG. 17 may be dummy bridge patterns that are floated and electrically insulated from the sensing electrodes VSE1, VSE2, HSE, and HSE-M. In FIG. 18B, some components in FIG. 18A are omitted, and only the bridge patterns in the XX-2 area are illustrated for convenience of explanation. In FIG. 19B, some components in FIG. 19A are omitted, and only the bridge patterns in the XX-2a area are illustrated for convenience of explanation.

Referring to FIGS. 6 and 17, the input sensor 200 may include a first sensing unit SU1 and a second sensing unit SU2. In an embodiment, the first sensing unit SU1 and the second sensing unit SU2 may include first sensing patterns SP1-a and SP2-a, second sensing patterns SP1-b and SP2-b, and a third sensing pattern HSP, respectively. Referring to FIG. 17, each of the first sensing unit SU1 and the second sensing unit SU2 may further include a fourth sensing pattern HSE-M. In addition, the second sensing patterns SP1-b and SP2-b included in each of the first sensing unit SU1 and the second sensing unit SU2 may include first sub-patterns SSP1 and SSP3 and second sub-patterns SSP2 and SSP4, which are spaced apart from each other in the first direction DR1, respectively.

In an embodiment, the first sub-patterns SSP1 and SSP3 and the second sub-patterns SSP2 and SSP4 may be spaced apart from each other in the first direction DR1 with the fourth sensing pattern HSE-M therebetween. The fourth sensing pattern HSE-M may have a shape extending longitudinally in the second direction DR2. In addition, compared to the input sensor of the embodiment illustrated in FIGS. 8 and 13, the input sensor of the embodiment illustrated in FIG. 17 may further include a third bridge MBP in each of the first sensing unit SU1 and the second sensing unit SU2. The third bridge MBP may electrically connect the first sub-patterns SSP1 and SSP3 to the second sub-patterns SSP2 and SSP4. In an embodiment, the third bridge MBP may have a bar shape extending longitudinally in the first direction DR1. The third bridge MBP may be classified as the first bridge pattern BP1. In an embodiment, the third bridge MBP may be a conductive pattern and may be disposed on the same layer as the first conductive layer 220 (see FIG. 5). For example, the third bridge MBP may be a conductive pattern included in the first conductive layer 220 (see FIG. 5).

One first bridge VBP1 or VBP2 may be disposed between the first and second sensing units SU1 and SU2 that are adjacent to each other in the first direction DR1. The first bridges VBP1 and VBP2 may overlap the second bridge HBP in the first direction DR1. In addition, the first bridges VBP1 and VBP2, the second bridge HBP, and the third bridge MBP may overlap each other in the first direction DR1. Each of the second bridges HBP may be disposed between two first bridges VBP1 and VBP2 adjacent to each other in the first direction DR1. In addition, one third bridge MBP may be disposed between the second bridges HBP spaced apart from each other in the first direction DR1 within one sensing unit SU1 or SU2.

In an embodiment, the first bridges VBP1 and VBP2 may include first portions VBP1-V and VBP2-V having shapes extending longitudinally in the first direction DR1 and second portions VBP1-H and VBP2-H connected to the first portions VBP1-V and VBP2-V and integrated with the first portions VBP1-V and VBP2-V. Each of the second portions VBP1-H and VBP2-H may have a shape extending longitudinally in the second direction DR2.

The third bridge MBP may have a shape extending longitudinally in the first direction DR1, and lengths of the first portions VBP1-V and VBP2-V in the first direction DR1 may be the same as or different from each other. In an embodiment, the first bridge VBP1 and VBP2 constituted by the first portions VBP1-V and VBP2-V and the second portions VBP1-H and VBP2-H and the bar-shaped third bridge MBP extending in the first direction DR1 may have different shapes on the plane.

In an embodiment, the second bridge HBP may have a bar shape extending longitudinally in the second direction DR2. In an embodiment, the first bridge VBP1 and VBP2 constituted by the first portions VBP1-V and VBP2-V and the second portions VBP1-H and VBP2-H and the bar-shaped second bridge HBP may have different shapes on the plane.

For example, in an embodiment, the first bridges VBP1 and VBP2, the second bridge HBP, and the third bridge MBP may have different shapes on the plane. The first bridges VBP1 and VBP2 and the second bridge HBP may be arranged at different intervals in the first direction DR1. In addition, the third bridge MBP and the second bridge HBP may be arranged at different intervals in the first direction DR1.

In FIG. 17, each of the first sensing electrodes VSE1 and the second sensing electrodes VSE2 may correspond to a column electrode extending in the first direction DR1, and the third sensing electrodes HSE may correspond to row electrodes extending in the second direction DR2.

In an embodiment illustrated in FIG. 17, each of the first sensing electrodes VSE1 may include a first sensing part VSP1 and a first-1 bridge VBP1 connecting the first sensing parts VSP1 to each other. The first sensing part VSP1 may include a first sensing pattern SP1-$a$ and a second sensing pattern SP1-$b$. In addition, each of the second sensing electrodes VSE2 may include a second sensing part VSP2 and a second-1 bridge VBP2 connecting the second sensing parts VSP2 to each other. The second sensing part VSP2 may include a first sensing pattern SP2-$a$ and a second sensing pattern SP2-$b$. The third sensing electrodes HSE may include a third sensing pattern HSP and a second bridge HBP connecting the third sensing patterns HSP to each other. In an embodiment illustrated in FIG. 17, each of the second sensing patterns SP1-$b$ and SP2-$b$ may be constituted by two sub-patterns spaced apart from each other (e.g., in the first direction DR1).

In an embodiment illustrated in FIG. 17, the fourth sensing pattern HSE-M may be referred to as a fourth sensing electrode. The fourth sensing patterns HSE-M arranged in the second direction DR2 may be electrically connected to each other.

Each of the plurality of bridge groups BBP-2 and BBP-2$a$ illustrated in FIGS. 18A to 19B may include at least one first bridge pattern BP1 having a bar shape extending longitudinally in the first direction DR1, and at least one second bridge pattern BP2 having a bar shape extending longitudinally in the second direction DR2.

Referring to FIGS. 18A and 18B, in an embodiment, the first bridge pattern BP1 may be the first portions VBP1-V and VBP2-V of the first bridges VBP1 and VBP2, the third bridge MBP connecting the first sub-patterns SSP1 and SSP3 to the second sub-patterns SSP2 and SSP4, or the first dummy bridge VDB insulated from (e.g., electrically insulated or floated from) the first to third sensing patterns. In addition, in an embodiment the second bridge pattern BP2 may be the second bridge HBP, the second portions VBP1-H and VBP2-H of the first bridges VBP1 and VBP2, or the second dummy bridge HDB insulated from (e.g., electrically insulated or floated from) the first to third sensing patterns. In an embodiment, the second dummy bridge HDB may include a second-1 dummy bridge HDB1 and a second-2 dummy bridge HDB2, which have different lengths in the second direction DR2 from each other. In an embodiment, at least one of the first dummy bridges VDB may be referred to as a third dummy bridge, and at least one of the second dummy bridges HDB may be referred to as a fourth dummy bridge.

In an embodiment illustrated in FIGS. 18A and 18B, one bridge group BBP-2 may be constituted by one first bridge pattern BP1 and four second bridge patterns BP2, or one bridge group BBP-2 may be constituted by two first bridge patterns BP1 and four second bridge patterns BP2.

In an embodiment, at least one bridge group BBP-2 may be constituted by first portions VBP1-V and VBP2-V of the first bridge, second portions VBP1-H and VBP2-H, two second-1 dummy bridges HDB1 spaced apart from each other in the first direction DR1, one second bridge HBP, and one first dummy bridge VDB. In addition, at least one bridge group BBP-2 may be constituted by a third bridge MBP, two second-1 dummy bridges HDB1 spaced apart from each other in the first direction DR1, one second-2 dummy bridge HDB2 disposed between two second-1 dummy bridges HDB1 (e.g., in the first direction DR1), and one second bridge HBP, or at least one bridge group BBP-2 maybe constituted by two second-1 dummy bridges HDB1 spaced apart from each other in the first direction DR1, one second-2 dummy bridge HDB2 disposed between the two second-1 dummy bridges HDB1, two first dummy bridges VDB disposed between the two second-1 dummy bridges HDB1 (e.g., in the first direction DR1), and one second bridge HBP. A plurality of bridge groups BBP-2 having different bridge pattern shapes or a specific pattern shape may be uniformly distributed and arranged throughout the sensing area.

Referring to FIGS. 19A and 19B, in an embodiment, the first bridge pattern BP1 may be the first portions VBP1-V and VBP2-V of the first bridges VBP1 and VBP2, the third bridge MBP connecting the first sub-patterns SSP1 and SSP3 to the second sub-patterns SSP2 and SSP4, or the first dummy bridge VDB insulated from (e.g., electrically insulated or floated from) the first to third sensing patterns. In addition, in an embodiment the second bridge pattern BP2 may be the second bridge HBP, the second portions VBP1-H and VBP2-H of the first bridges VBP1 and VBP2, or the second dummy bridge HDB insulated from (e.g., electrically insulated or floated from) the first to third sensing patterns. In an embodiment, the first dummy bridge VDB may include a first-1 dummy bridge VDB1, a first-2 dummy bridge VDB2, and a first-3 dummy bridge VDB3, which have different lengths from each other in the first direction DR1. In addition, in an embodiment, the second dummy bridge HDB may include a second-1 dummy bridge HDB1 and a second-2 dummy bridge HDB2, which have different lengths from each other in the second direction DR2.

In an embodiment illustrated in FIGS. 19A and 19B, the bridge group BBP-2a may include a first sub-bridge group BBP-S1 and a second sub-bridge group BBP-S2, which have different patterns from each other. In an embodiment, each of the first sub-bridge group BBP-S1 and the second sub-bridge group BBP-S2 may be constituted by three first bridge patterns BP1 and four second bridge patterns BP2.

In an embodiment, at least one first sub-bridge group BBP-S1 may include two second-1 dummy bridges HDB1 spaced apart from each other in the first direction DR1, two second-2 dummy bridges HDB2 spaced apart from each other in the first direction DR1 with the two second-1 dummy bridges HDB1 therebetween, one first-2 dummy bridge VDB2 disposed between the two second-1 dummy bridges HDB1 (e.g., in the first direction DR1), and two first-1 dummy bridges VDB1 disposed between the two second-2 dummy bridges HDB2 spaced apart from each other in the first direction DR1.

In addition, in an embodiment at least one second sub-bridge group BBP-S2 may include first bridges VBP1 and VBP2 constituted by first portions VBP1-V and VBP2-V and second portions VBP1-H and VBP2-H, two second bridges HBP spaced apart from each other in the first direction DR1 with the first bridges VBP1 and VBP2 therebetween, two first-3 dummy bridges VDB3 disposed between the two second bridges HBP (e.g., in the first direction DR1), and one second-1 dummy bridge HDB1 disposed between the two second bridges HBP.

The first sub-bridge group BBP-S1 and the second sub-bridge group BBP-S2, which have different bridge patterns, may be uniformly distributed and arranged throughout the sensing area.

The configuration of the bridge groups BBP-2 and BBP-2a illustrated in FIGS. 18A, 19A, etc. is an example that may be applied in an embodiment in which the sensing electrodes has the configuration of the sensing electrode illustrated in FIG. 17. In the input sensor according to an embodiment having the configuration of the sensing electrode illustrated in FIG. 17, the bridge groups may include at least one first bridge pattern BP1 having a shape extending longitudinally in the first direction DR1 and at least one second bridge pattern BP2 having a shape extending longitudinally in the second direction DR2 in addition to the form shown in FIGS. 18A, 19A, etc., and may be applied without limitation as long as the bridge groups are distributed and arranged throughout the sensing area.

The display device according to an embodiment may include the plurality of sensing patterns in the input sensor, the two or more types of real bridges having different shapes that electrically connect the sensing patterns to each other, and two or more dummy bridges that implement shapes of the real bridges. In addition, the input sensor according to an embodiment may be constituted by at least one real bridge and the dummy bridge, or may include the plurality of bridge groups provided as only of the dummy bridges. The display device according to an embodiment includes the input sensor in which the plurality of bridge groups are uniformly distributed throughout the sensing area to reduce the visibility in which a specific pattern is visible from the outside, thereby providing increased display quality.

The display device according to the embodiment may include the plurality of bridge groups distributed and disposed throughout the sensing area of the input sensor to reduce the external visibility of the pattern of the conductive layer at the specific position, thereby providing increased display quality.

In addition, the display device and the electronic apparatus according to an embodiment may include the input sensor in which, the bridge groups including two or more types of bridge patterns having the different shapes and the different repetition intervals are uniformly arranged, to reduce the external visibility of the conductive pattern.

It will be apparent to those skilled in the art that various modifications and deviations can be made in the present inventive concept. Thus, it is intended that the present inventive concept covers the modifications and deviations thereof.

Therefore, the technical scope of the present inventive concept is not limited to the contents described in the detailed description of the specification.

What is claimed is:

1. A display device comprising:
    a display panel; and
    an input sensor disposed on the display panel, the input sensor comprising a first sensing unit and a second sensing unit that are alternately arranged in a first direction, and a plurality of bridge groups,
    wherein each of the first sensing unit and second sensing unit comprises:
        a first sensing pattern;
        a second sensing pattern having a shape extending from a center of the first sensing pattern in the first direction; and
        a plurality of third sensing patterns spaced apart from each other in a second direction crossing the first direction with the second sensing pattern therebetween,
    wherein each of the plurality of bridge groups comprises at least one first bridge pattern having a first shape extending longitudinally in the first direction and at least one second bridge pattern having a second shape extending longitudinally in the second direction,
        wherein the first bridge pattern comprises a first portion of a first bridge electrically connecting the first sensing pattern to the second sensing pattern or a first dummy bridge electrically insulated from the first to third sensing patterns, and
        the second bridge pattern comprises a second bridge electrically connecting the plurality of third sensing patterns to each other, a second portion of the first bridge directly connected to the first portion, or a second dummy bridge electrically insulated from the plurality of first to third sensing patterns.

2. The display device of claim 1, wherein:
    the display panel comprises a display area comprising a plurality of emission areas and a non-display area disposed outside the display area;
    the input sensor comprises a sensing area overlapping the display area and a non-sensing area disposed outside the sensing area; and
    the plurality of bridge groups are uniformly arranged throughout the sensing area.

3. The display device of claim 2, wherein each of the first to third sensing patterns comprises a plurality of mesh lines having a plurality of opening areas that respectively overlap the plurality of emission areas.

4. The display device of claim 3, wherein each of the first bridge pattern and the second bridge pattern overlaps the plurality of mesh lines.

5. The display device of claim 1, wherein the first bridge electrically connects the first sensing pattern of the first sensing unit to the second sensing pattern of the second sensing unit or electrically connects the first sensing pattern of the second sensing unit to the second sensing pattern of the first sensing unit.

6. The display device of claim 5, wherein:
the first portion of the first bridge overlaps the first sensing pattern, and the second portion of the first bridge extends from the first portion and is integral with the first portion; and
the second portion is disposed to connect the first sensing unit to the second sensing unit.

7. The display device of claim 5, wherein the first bridge overlaps the second bridge in the first direction.

8. The display device of claim 1, wherein each of the plurality of bridge groups comprises:
a plurality of first bridge patterns; and
at least one second bridge pattern connecting adjacent first bridge patterns of the plurality of first bridge patterns to each other.

9. The display device of claim 1, wherein:
each of the plurality of bridge groups comprises a plurality of first bridge patterns; and
at least one of the plurality of first bridge patterns in each of the plurality of bridge groups has a length different from that of another first bridge pattern in the first direction.

10. The display device of claim 1, wherein:
each of the plurality of bridge groups comprises a plurality of second bridge patterns; and
at least one of the plurality of second bridge patterns in each of the plurality of bridge groups has a length different from that of another second bridge pattern in the second direction.

11. The display device of claim 1, wherein the second dummy bridge comprises an edge dummy pattern extending from an edge of the second portion of the first bridge in the second direction and electrically insulated from the first to third sensing patterns.

12. The display device of claim 1, wherein:
the second sensing pattern of the first sensing unit and the first sensing pattern of the second sensing unit are directly connected to each other and are integral with each other; or
the first sensing pattern of the first sensing unit and the second sensing pattern of the second sensing unit are directly connected to each other and are integral with each other.

13. The display device of claim 1, wherein, in each of the first sensing unit and the second sensing unit,
the second sensing pattern includes a plurality of second sensing patterns, and the plurality of second sensing patterns are disposed to be spaced apart from each other in the second direction; and
a plurality of first bridges are disposed between the first sensing unit and the second sensing unit adjacent to each other in the first direction, and each of the plurality of first bridges overlaps the second sensing patterns on a plane in the first direction.

14. The display device of claim 1, wherein, in each of the first sensing unit and the second sensing unit,
each of the plurality of third sensing patterns comprises a first pattern group and a second pattern group that are divided by the second sensing pattern; and
the plurality of third sensing patterns in the first pattern group and the second pattern group are spaced apart from each other in the first direction.

15. The display device of claim 14, wherein, in each of the first sensing unit and the second sensing unit,
the second bridge includes a plurality of second bridges; and
each of the plurality of second bridges electrically connects each of the plurality of third sensing patterns in the first pattern group to each of the plurality of third sensing patterns in the second pattern group in the second direction.

16. The display device of claim 15, wherein:
the first bridge includes a plurality of first bridges;
each of the plurality of first bridges is disposed between the first sensing unit and the second sensing unit that are alternately arranged in the first direction; and
the plurality of second bridges are disposed between adjacent first bridges of the plurality of first bridges overlapping each other in the first direction.

17. The display device of claim 1, wherein, in each of the first sensing unit and the second sensing unit,
the second sensing pattern comprises a first sub-pattern and a second sub-pattern that are spaced apart from each other in the first direction; and
each of the first sensing unit and the second sensing unit further comprises a fourth sensing pattern disposed between the first sub-pattern and the second sub-pattern and extending longitudinally in the second direction.

18. The display device of claim 17, wherein the plurality of bridge groups further comprises at least one of a third bridge electrically connecting the first sub-pattern to the second sub-pattern or a third dummy bridge having a same shape as the third bridge and electrically insulated from the first to third sensing patterns.

19. The display device of claim 1, wherein the input sensor is directly disposed on the display panel,
the input sensor comprises a first sensor conductive layer, a second sensor conductive layer disposed on the first sensor conductive layer, and an interlayer insulating layer disposed between the first sensor conductive layer and the second sensor conductive layer;
the first bridge pattern and the second bridge pattern are disposed on a same layer as the first sensor conductive layer; and
the first sensing pattern, the second sensing pattern, and the plurality of third sensing patterns are disposed on a same layer as the second sensor conductive layer.

20. A display device comprising:
a display panel; and
an input sensor disposed on the display panel, the input sensor comprising a plurality of first sensing electrodes arranged in a first direction, a plurality of second sensing electrodes arranged in the first direction, a plurality of third sensing electrodes arranged in a second direction crossing the first direction, and a plurality of dummy bridges electrically insulated from the plurality of first to third sensing electrodes,
wherein each of the plurality of first sensing electrodes comprises a first-1 sensing pattern, a first-2 sensing pattern having a shape different from that of the first-1 sensing pattern, and a first-1 bridge electrically connecting the first-1 sensing pattern to the first-2 sensing pattern,
each of the plurality of second sensing electrodes comprises a second-1 sensing pattern, a second-2 sensing pattern having a shape different from that of the second-1 sensing pattern, and a second-1 bridge electrically connecting the second-1 sensing pattern to the second-2 sensing pattern, each of the plurality of third sensing electrodes comprises a third sensing pattern extending longitudinally in the second direction, and a second bridge extending longitudinally in the second direction and electrically connected to the third sensing pattern, and the plurality of dummy bridges comprises a first dummy bridge pattern having a same shape as the first-1 bridge or the second-1 bridge, and a second dummy bridge pattern having a same shape as the second bridge, wherein, in the input sensor, at least one of the first-1 bridge, the second-1 bridge, the second bridge, the first dummy bridge pattern, or the second dummy bridge pattern constitutes a plurality of bridge groups having a specific one pattern shape, and on a plane, the plurality of bridge groups are arranged to be spaced apart from each other in the input sensor.

21. The display device of claim 20, wherein the specific one pattern shape of the plurality of bridge groups comprises:
    at least one first bridge pattern having a bar shape extending longitudinally in the first direction; and
    at least one second bridge pattern having a bar shape extending longitudinally in the second direction.

22. The display device of claim 21, wherein the first bridge pattern is a first portion extending longitudinally from the first-1 bridge, the second-1 bridge, or the first dummy bridge pattern in the first direction, and
    the second bridge pattern is a second portion extending longitudinally from the first-1 bridge, the second-1 bridge, or the first dummy bridge pattern in the second direction.

23. The display device of claim 22, wherein the plurality of dummy bridges further comprises a third dummy bridge having a bar shape extending longitudinally in the first direction and a fourth dummy bridge having a bar shape extending longitudinally in the second direction,
    wherein the third dummy bridge corresponds to the first bridge pattern, and
    the fourth dummy bridge corresponds to the second bridge pattern.

24. The display device of claim 20, wherein:
    the first-1 sensing pattern and the second-1 sensing pattern are alternately arranged in the first direction, and the first-2 sensing pattern and the second-2 sensing pattern are alternately arranged in the first direction; and
    the first-1 sensing pattern and the second-2 sensing pattern overlap each other in the second direction, and the second-1 sensing pattern and the first-2 sensing pattern overlap each other in the second direction.

25. The display device of claim 20, wherein, on the plane, the first-1 sensing pattern and the second-1 sensing pattern have a same shape as each other, and the first-2 sensing pattern and the second-2 sensing pattern have a same shape as each other.

26. An electronic apparatus comprising:
    a display panel comprising a base layer, a circuit element layer disposed on the base layer, a display element layer disposed on the circuit element layer and comprising a light emitting element, and an encapsulation layer disposed on the display element layer; and
    an input sensor disposed on the display panel, the input sensor comprising a plurality of first sensing electrodes arranged in a first direction, a plurality of second sensing electrodes arranged in the first direction, a plurality of third sensing electrodes arranged in a second direction crossing the first direction, and a plurality of dummy bridges electrically insulated from the plurality of first to third sensing electrodes, wherein each of the plurality of first sensing electrodes comprises a first-1 sensing pattern, a first-2 sensing pattern having a shape different from that of the first-1 sensing pattern, and a first-1 bridge electrically connecting the first-1 sensing pattern to the first-2 sensing pattern, each of the plurality of second sensing electrodes comprises a second-1 sensing pattern, a second-2 sensing pattern having a shape different from that of the second-1 sensing pattern, and a second-1 bridge electrically connecting the second-1 sensing pattern to the second-2 sensing pattern, each of the plurality of third sensing electrodes comprises a third sensing pattern extending longitudinally in the second direction, and a second bridge extending longitudinally in the second direction and electrically connected to the third sensing pattern, and the plurality of dummy bridges comprises a first dummy bridge pattern having a same shape as the first-1 bridge or the second-1 bridge, and a second dummy bridge pattern having a same shape as the second bridge, wherein, in the input sensor, at least one of the first-1 bridge, the second-1 bridge, the second bridge, the first dummy bridge pattern, or the second dummy bridge pattern constitutes a plurality of bridge groups having a specific one pattern shape, and on a plane, the plurality of bridge groups are arranged to be spaced apart from each other in the input sensor.

27. The electronic apparatus of claim 26, wherein the specific one pattern shape of the plurality of bridge groups comprises:
    at least one first bridge pattern having a bar shape extending longitudinally in the first direction; and
    at least one second bridge pattern having a bar shape extending longitudinally in the second direction.

28. The electronic apparatus of claim 27, wherein the first bridge pattern is a first portion extending longitudinally from the first-1 bridge, the second-1 bridge, or the first dummy bridge pattern in the first direction, and
    the second bridge pattern is a second portion extending longitudinally from the first-1 bridge, the second-1 bridge, or the first dummy bridge pattern in the second direction.

29. The electronic apparatus of claim 28, wherein the plurality of dummy bridges further comprise a third dummy bridge having a bar shape extending longitudinally in the first direction and a fourth dummy bridge having a bar shape extending longitudinally in the second direction,
    wherein the third dummy bridge corresponds to the first bridge pattern, and
    the fourth dummy bridge corresponds to the second bridge pattern.

30. The electronic apparatus of claim 26, wherein:
    the first-1 sensing pattern and the second-1 sensing pattern are alternately arranged in the first direction, and the first-2 sensing pattern and the second-2 sensing pattern are alternately arranged in the first direction; and
    the first-1 sensing pattern and the second-2 sensing pattern overlap each other in the second direction, and the second-1 sensing pattern and the first-2 sensing pattern overlap each other in the second direction.

31. The electronic apparatus of claim 26, wherein, on the plane, the first-1 sensing pattern and the second-1 sensing pattern have a same shape as each other, and the first-2 sensing pattern and the second-2 sensing pattern have a same shape as each other.

\* \* \* \* \*